US006760483B1

(12) United States Patent
Elichai et al.

(10) Patent No.: US 6,760,483 B1
(45) Date of Patent: Jul. 6, 2004

(54) METHOD AND APPARATUS FOR IMAGE ANALYSIS AND PROCESSING BY IDENTIFICATION OF CHARACTERISTIC LINES AND CORRESPONDING PARAMETERS

(75) Inventors: Yoram Elichai, Lehavim (IL); Yosef Yomdin, Rehovot (IL)

(73) Assignee: Vimatix (BVI) Ltd., Tortola (VG)

( * ) Notice: Subject to any disclaimer, the term of this patent is extended or adjusted under 35 U.S.C. 154(b) by 286 days.

(21) Appl. No.: 09/716,279

(22) Filed: Nov. 21, 2000

Related U.S. Application Data

(60) Provisional application No. 60/239,912, filed on Oct. 13, 2000.

(51) Int. Cl.$^7$ .................................................. G06K 9/36
(52) U.S. Cl. ........................ 382/241; 382/233; 382/298
(58) Field of Search ................................ 382/162, 167, 382/173, 199, 203, 215, 232, 233, 241–243, 248, 254, 275–276, 286, 288, 298, 299–300; 345/418–419, 423, 586, 588; 348/384.1, 390.1; 375/240.08, 240.09

(56) References Cited

U.S. PATENT DOCUMENTS

| 5,410,643 | A | 4/1995 | Yomdin et al. ............. 345/420 |
| 5,510,838 | A | 4/1996 | Yomdin et al. .......... 348/384.1 |
| 5,960,118 | A | 9/1999 | Briskin et al. ............. 382/243 |
| 6,008,820 | A | 12/1999 | Chauvin et al. ............ 345/502 |
| 6,121,975 | A | 9/2000 | Mungenast et al. ......... 345/588 |
| 6,181,816 | B1 | 1/2001 | Adams, Jr. et al. ......... 382/162 |

OTHER PUBLICATIONS

Amini, "Model Analysis of Red Blood Cell Flow Through Diverging and Converging Microvascular Bifurcations," The George Washington University, 1994.

Y. Yomdin et al., "Normal Forms Representation: A Technology for Image Compression", Proceedings SPIE–The International Society for Optical Engineering, vol. 1903, Feb. 3–4, 1993, pp. 204–214.

Y. Yomdin et al., "Normal Forms Representations," SPIE vol. 1903 Images and Video Processing (1993).

M. Briskin et al., "How Can Singularity Theory Help in Image Processing?".

A. Blake et al., "Active Contours" Springer–Verlag, London (1998); ISBN 3–540–76217–5, Chapters 2 and 5 (pp. 25–37 and 97–113).

J. Foley, et al., "Computer Graphics: Principles and Practice" Addison–Wesley Publishing Co. New York (1997) (2d ed., Jul. 1997), Chapter 17 (pp. 815–853).

R. Gonzales et al., "Digital Image Processing" Addison–Wesley Publishing Co. New York (1992) Chapters 7.1–7.3.4 (pp. 413–453).

J. Elder et al., "Image Editing in the Contour Domain," 1998 IEEE (pp. 374–381).

*Primary Examiner*—Daniel Mariam
(74) *Attorney, Agent, or Firm*—Fenster & Company

(57) ABSTRACT

A method and apparatus is provided for analyzing and processing images by identification of characteristic lines and corresponding parameters. More particularly, the method and apparatus transforms an image into mathematical models derived from the characteristic lines and parameters, based on repetitive image patterns. The parameters include central lines, signatures, cross-sections, characteristic strips, margins, end areas, fitting transformations and fitting sequences. Each of the parameters associated with the identified characteristic lines are representable by mathematical models, which accurately approximate the geometric and brightness (or color) attributes of the respective characteristic lines.

34 Claims, 41 Drawing Sheets

High Level Procedure

*Automatic Identification Procedure*

Adjacency
Detection

Adjacency Detection

*Construct Uniform Characteristic Lines*

Aggregation Procedure

General Plotting Procedure

*General Plotting Procedure*

Multi-Scale Identification

*High Level Procedure*

Fig. 32 — A graph H of a characteritic line of fig. 8

METHOD AND APPARATUS FOR IMAGE ANALYSIS AND PROCESSING BY IDENTIFICATION OF CHARACTERISTIC LINES AND CORRESPONDING PARAMETERS

This application claims the benefit of U.S. Provisional Application No. 60/239,912, filed Oct. 13, 2000, the contents of which are expressly incorporated by reference herein in its entirety.

BACKGROUND OF THE INVENTION

1. Field of the Invention

The present invention relates to the field of image representation. More particularly, the present invention relates to a method of identifying visual attributes of an image and transforming them into mathematical models.

2. Background Information

Analysis and processing of digital images plays an important role in nearly all disciplines of modem economics. From medical imaging to industrial quality control and diagnostics to entertainment and advertising, efficient image analysis, representation and processing is the primary component of the overall imaging system performance.

Some conventional methods of image analysis rely on extracting specific lines from the original images (referred to as "edges"), which separate distinct image areas of different brightness (or color). These specific lines may also be referred to as "ridges," which are narrow strips, visually separated from the background by their brightness or color. Use of edge and ridge technology is described, for example, in relevant sections of A. Blake and M. Isard, "Active Contours" (1998); J. Foley, et al., "Computer Graphics: Principles and Practice" (1997); and R. Gonzales and P. Wintz, "Digital Image Processing" (1987).

Generally speaking, the importance of such "line-shaped" image patterns, both for human visual perception and efficient automated image analysis, processing and representation, is well recognized in the field. However, the existing methods provide only partial information on the geometric and brightness structures relating to the line-shaped patterns. This partial information is insufficient for adequate image analysis of patterns. As applied to accurate image reproduction and representation, the conventional methods based on edge/ridge partitions are inadequate, especially with respect to high resolution images of the real world.

There are two main reasons for the general failure of conventional methods. First, the edges and ridges are detected only as geometric lines on the image. They are formed by original pixels (or by pixels in a finer grid), or they are approximated by splines. Such limited geometric representation does not simultaneously capture brightness or color patterns along the detected lines. Without the brightness or color pattern information, visually authentic capturing and reconstruction of line-shaped "image forms" is not possible. Therefore, use of the conventional methodology in applications requiring realistic human visual perception of the image or high resolution analysis of medical, industrial and other commercially significant images is extremely limited.

The inadequate treatment of brightness patterns along line-shaped image forms results from difficulties associated with capturing such information. For example, whether or not a consistent brightness pattern exists along a given line is unpredictable. Typically, from a global perspective, both brightness and geometric shapes vary along any one line to such a large extent that direct comparison between any two distinct points on the line is virtually impossible. Furthermore, even for a line having somewhat uniform brightness and geometric characteristics, empirical determination of the corresponding brightness pattern is not possible by the conventional methods, because it requires explicit comparison of brightness data at different points along the line.

Second, edges and ridges as captured by conventional methods form only part of the visually significant line-shaped image patterns. Human visual experience demonstrates that much more complicated patterns than simply edges and ridges are perceived in line-shaped image forms. Conventional methods cannot recognize these more complicated forms.

In U.S. Pat. No. 5,510,838, to YOMDIN, et al., a method is disclosed for image representation by four types of models: edges, ridges, hills and background. Distinctive types of brightness profiles associated with the edge and ridge models are disclosed therein. However, the method of U.S. Pat. No. 5,510,838 presents a number of practical disadvantages. For example, the edge and ridge detection (and, in particular, detection of corresponding brightness profiles) is treated as an integral part of overall image representation. Consequently, isolated application of edge and ridge detection is difficult. Also, the method disclosed in U.S. Pat. No. 5,510,838 requires that the original image be subdivided into an artificial grid of cells, each having a size of 6 to 48 pixels. The cells in these grids must be processed independently. Such subdivision contradicts the global nature of edges and ridges, reduces the visual quality of the resulting model-based image and renders many image analysis and processing applications virtually impossible.

U.S. Pat. No. 5,510,838 has additional practical problems, common to conventional image representation methods. First, the shape of the brightness profiles is determined a priori, and permits only limited adjustment to the actual image pattern. Second, the method cannot be used for empirical determination of actual, more complicated brightness profiles present on the image. Also, the resolution of the detection method is generally limited due to the use of second degree polynomial approximations on 4×4 pixel windows.

Some of these problems are addressed in U.S. Pat. No. 5,960,118, to BRISKIN, et al. For example, an extended variety of brightness profiles is disclosed in this document. Also, the resolution of the detection method is improved by incorporating 3×3 pixel windows in the original polynomial approximation. The patent also describes a limited method for empirical profile detection, dependant on the assumption that the profile is constant along the subject line (which is not the case for most brightness profiles). Furthermore, U.S. Pat. No. 5,960,118 still does not allow for application of edge and ridge detection separately from the full image representation process. U.S. Pat. No. 5,960,118 also does not eliminate the necessity of subdividing images into cells.

SUMMARY OF THE INVENTION

In view of the above, the present invention through one or more of its various aspects and/or embodiments is presented to accomplish one or more objectives and advantages, such as those noted.

The present invention overcomes the shortcomings of the existing techniques of image analysis and processing based on edge and ridge detection. It provides a method for identification of general characteristic lines on an image, as well as the signatures and fitting transformations corresponding to each characteristic line. The signatures simultaneously capture the brightness (or color) pattern along detected lines and the fitting transformations consolidate similar brightness and geometric patterns, while maintaining visual integrity of the overall image.

The present invention describes a method for empirical determination of an actual brightness cross-section along any given line. The present invention also provides an efficient representation of characteristic lines by mathematical models. The method enables a number of image analysis implementations, including visual quality inspections, pattern detections and sensor calibrations, based on the analysis of characteristic lines and their signatures. Furthermore, all types of characteristic lines are accurately captured.

All aspects of the invention include steps that are implementable by a computing device, without input from a user (i.e., automatic), or by a computing device in combination with an interface device, with input from the user (i.e., interactive). The invention also includes any combination of automatic and interactive implementations.

An aspect of the invention provides for representing an image by identifying one or more characteristic lines of the image, each characteristic line being a line along which a visual pattern repeats itself. A central line, which corresponds to and approximates the shape of the characteristic line, is determined. A cross-section, consisting of one or more geometric and one or more brightness parameters, at each point along the central line is also determined. Then, a basis cross-section representative of the characteristic line is determined and transformed to the cross-sections of the points along the central line. A characteristic line model representing the characteristic line of the image is assembled from the central line, the basis cross-section and the transformed cross-sections. The characteristic line model is stored, transmitted or processed further, depending on the implementation. The image may be a digital or analog image.

In another aspect of the invention, an image is represented by identifying one or more characteristic lines of the image, each characteristic line being a line along which a visual pattern repeats itself. A central line corresponding to the characteristic line and approximating the shape of the characteristic line shape is determined. Visual patterns along the central line are then identified. A basis signature representative of the characteristic line is determined and this basis signature is transformed to approximate a repetition of the visual pattern along the central line. A characteristic line model representing the characteristic line is assembled, consisting of the central line, the basis signature and the transformation of the basis signature. The characteristic line model is stored, transmitted or processed further, depending on the implementation.

According to still another aspect of the invention, an image is represented by first detecting edges on the image and adjacencies among the detected edges. The common adjacencies among the edges are interpreted as characteristic lines. A central line corresponding to each of the characteristic lines is then determined, the central line approximating the shape of the characteristic line and consisting of a number of points. Cross-sections corresponding to each of the points along each central line is detected. Each cross-section consists of at least one geometric parameter and at least one brightness parameter.

This process can also be implemented by detecting ridges and their associated adjacencies on the image, in addition to edges. The common adjacencies among the ridges are interpreted as characteristic lines. A central line corresponding to each of the characteristic lines is determined, the central line approximating the shape of the characteristic line and consisting of a number of points. Cross-sections corresponding to each of the points along each central line is detected. Each cross-section consists of one or more geometric parameters and one or more brightness parameters.

The image representation is further accomplished according to an aspect of the invention by subdividing each of the detected edges into spline segments. Each spline segment is evaluated, identifying adjacent spline segments. At least one adjacency interval on edge components is identified, which corresponds to the detected edges.

In an aspect of the invention, the adjacent spline segments are identified by first scanning all of the spline segments. For each one of the spline segments, adjacent spline segments are identified according to the following criteria: Adjacent spline segments contain at least one point that is less than or equal to a predetermined distance from the one spline segment and have a direction that forms an angle with the direction of the one spline segment which is less than or equal to a predetermined value. An adjacent spline segment also contains a midpoint that, when joined by an adjacency pointer with the midpoint of the one spline segment, results in an adjacency pointer having a direction that forms an angle with the direction of each of the joined spline segments which differs from (e.g.) 90 degrees by less than or equal to a predetermined value. The comparison is repeated for each of the scanned spline segments until they all have a corresponding set of adjacent spline segments.

According to another aspect of the invention, an image is represented by detecting edges on the image and subdividing the edges into corresponding spline segments. Each of the spline segments is evaluated and the adjacent spline segments are identified. The midpoint of each evaluated spline segment is then connected by an adjacency pointer with the midpoint of each of its corresponding adjacent spline segments, creating adjacency couples. Adjacency intervals of the image are identified as continuous chains of the adjacent couples. A central point of each adjacency pointer within each adjacency couple is identified and the central points are joined within each adjacency interval to form a central line corresponding to a characteristic line.

Once each central line is formed, the cross-sections corresponding to the points along the central line are detected. The cross-sections consist of at least one geometric parameter and at least one brightness parameter. A basis cross-section representative of the associated characteristic line is determined. The basis cross-section is transformed to the cross-sections of the points on the central line and a corresponding fitting path is determined. A characteristic line model representing the characteristic line is assembled, the characteristic line model consisting of at least the data representing the central line, the basis cross-section and the fitting path. The characteristic line model may then be stored, transmitted or processed.

In one aspect of the invention, adjacent spline segments corresponding to each of the evaluated spline segments are identified by first scanning all of the spline segments and identifying for each scanned spline segment the other spline segments that meet predetermined criteria. In particular, for spline segments to be considered adjacent to another of the spline segments, such a spline segment should contain at least one point that is less than or equal to a predetermined distance from the other spline segment and should have a direction that forms an angle with a direction of the other spline segment less than or equal to a predetermined value. Furthermore, the spline segment should contain a midpoint that, when joined by an adjacency pointer with a midpoint of the other spline segment, results in an adjacency pointer having a direction that forms an angle with the direction of each of the joined spline segments which differs from (e.g.) by 90 degrees less than or equal to a predetermined value. This comparison is repeated for each of the scanned spline segments.

In other aspects of the invention, the cross-sections are detected in alternative ways. One way is to identify scanning points at equal intervals along the central line of a characteristic line and project a line segment orthogonal to the central line at each of the scanning points. Characteristic points are identified on the orthogonal line segment at each point where the orthogonal line segment intersects the margin of the edges forming the characteristic line. An image brightness is sampled at each of the characteristic points on the orthogonal line segment. The cross-section of each orthogonal line segment is then approximated by a cross-section of the edges corresponding to the sampled image brightness.

In an alternative embodiment, the cross-sections are detected by subdividing the central line into subpieces, each having a predetermined length. Pixels located within a characteristic strip corresponding to each of the subpieces are identified. These pixels are defined at least according to their respective distances from the central line and brightness parameters. A cross-section at each of the subpieces is then derived based on the defined pixels.

The cross-sections are further refined by forming a quadratic difference between each derived cross-section and the cross-section derived from the next subpiece. The quadratic differences with respect to the parameters of a fitting transformation associated with the cross-section are minimized. A minimized fitting transformation of each derived cross-section and the cross-section derived from the next one of the subpieces is identified. Multiple fitting transformations are composed from these minimized fitting transformations and interpolated along the corresponding line segment. A fitting path is derived from the interpolated fitting transformations and each of the pixels are redefined according to its distance from the central line corrected according to the fitting path and one of its brightness or color parameter corrected according to the fitting path. A corrected cross-section is then derived at each of the subpieces based on the redefined pixels. In an aspect of the invention, the central lines are corrected by identifying a geometrically central point of the associated corrected cross-section and applying the fitting path to the central point.

In another aspect of the invention, an image, having an original size, is represented by first reducing the image from the original size. At least one characteristic line of the reduced image is identified, each characteristic line being a line on the image along which a visual pattern repeats itself. The reduced image is then re-scaled to the original size and a central line is determined corresponding to the characteristic line. The central line approximates the shape of the identified characteristic line and consists of a number of points. Then, consistent with other aspects of the invention, visual patterns along the central line are then identified. A basis signature representative of the characteristic line is determined and this basis signature is transformed to approximate a repetition of the visual pattern along the central line. A characteristic line model representing the characteristic line is assembled, consisting of the central line, the basis signature and the transformation of the basis signature. The characteristic line model is stored, transmitted or processed further, depending on the implementation.

Further, according to a related aspect of the invention, the central line of the re-scaled image is identified as a candidate central line. A characteristic strip associated with the candidate central line is determined. The characteristic strip includes portions of the image adjacent to the candidate central line. Image patterns are detected within the characteristic strip. It is then determined whether each of the image patterns within the characteristic strip repeats along the central line. If the image patterns within the characteristic strip do not repeat along the central line, the candidate central line is discarded as not corresponding to a characteristic line. Otherwise, the candidate central line is accepted and each of the image patterns is separated, a signature is identified and a geometric transformation that fits the signature to the repetitions of the pattern along the candidate central line is determined. A signature and a fitting sequence corresponding to the candidate central line are then approximated.

In another embodiment of the invention, an image is represented by identifying an empirical cross-section of at least one point of a line on the image. It is determined whether the line approximates the shape of a uniform characteristic line. If so, a fitting path, a corrected cross-section and a central line of the uniform characteristic line are identified accordingly.

Other aspects of the invention involve implementation of image representation by a computing apparatus. The computing apparatus includes a computing device that executes computer readable code, an input device that receives the digital image and interfacing with a user, at least one data storage device that stores computer data, and a programming code reading device that reads computer executable code. The computing device is in communication with the input device, the data storage devices and the programming code reading device.

According to one aspect of the invention involving computer apparatus implementation, the computer executable code instructs the computing device to identify at least one characteristic line of the image. Each characteristic line includes a line along which a visual pattern repeats itself. The computing device determines a central line corresponding to the characteristic line, the central line approximating the shape of the characteristic line and consists of a number of points. The computing device then determines a cross-section at each of the points along the central line, determines a basis cross-section representative of the characteristic line and transforms the basis cross-section to the cross-sections of the points along the central line. The cross-section includes at least one geometric parameter and at least one brightness parameter. Data representing the characteristic line, the central line, the cross-section and the transforms of the cross-section are stored in at least one data storage device. Also, the characteristic lines and the central line corresponding to each characteristic line may be identified by a user via the input device.

In another aspect of the invention, computer executable code instructs the computing device to identify at least one characteristic line of the image, each characteristic line including a line along which a visual pattern repeats itself. The computer executable code further instructs the computing device to determine a central line corresponding to the characteristic line, identify a plurality of patterns along the central line, determine a basis signature representative of the characteristic line and transform the basis signature to approximate a repetition of the visual pattern along the central line. The central line approximates the shape of the characteristic line. Data representing the characteristic line, the central line, the patterns, the basis signature, and the transforms of the cross-section are stored in at least one data storage device. The characteristic lines, as well as the central line and visual pattern corresponding to each characteristic line, may be identified by the user via the input device.

In another aspect of the invention, computer executable code causes the computing device to reduce the image from an original size and to identify at least one characteristic line of the reduced image. The characteristic line is a line along which a visual pattern repeats itself. The computing device then re-scales the reduced image to the original size, and determines for the re-scaled image a central line corresponding to the characteristic line. The central line approximates the shape of the characteristic line and consists of a number of points. The computing device then identifies patterns along the central line, determines a basis signature representative of the characteristic line and transforms the basis signature to approximate a repetition of the visual pattern along the central line. The data representing at least one of the characteristic line, the central line, the patterns, the basis signature and the transforms of the cross-section are stored in at least one of the data storage devices.

In still another aspect of the invention, computer executable code causes the computing device to identify at least one central line approximating a shape of a characteristic line and to subdivide the central line into subpieces, based on a predetermined length. The computing device further identifies pixels located within a characteristic strip corresponding to each of the subpieces and defines each of the pixels at least according to its distance from the central line and a brightness parameter. The computing device then derives a cross-section at each of the subpieces based on the defined pixels, forms a quadratic difference between each derived cross-section and the cross-section derived from the next subpiece, minimizes the quadratic differences with respect to the parameters of a fitting transformation and identifies a minimized fitting transformation of each derived cross-section and the cross-section derived from the next subpiece. Multiple fitting transformations are composed from the plurality of minimized fitting transformations and interpolated along the corresponding line segment.

The computer executable code then causes the computing device to derive a fitting path from the interpolated fitting transformations and redefine each of the pixels according to a distance from the central line corrected according to the fitting path and one of a brightness and a color parameter corrected according to the fitting path. A corrected cross-section at each of the subpieces is derived based on the redefined pixels. The computing device then identifies an (e.g.) geometrically central point of the corrected cross-section and applies the fitting path to the central point to derive a corrected central line. Data representing at least one of the uniform characteristic line, the central line, the plurality of fitting transformations, the fitting path, the empirical cross-section and the corrected cross-section are stored in one or more data storage devices.

The computing apparatus implementing representation of an image can alternatively include an image reading device for reading and storing the image, an interface device for enabling a user interface, a program module that receives and executes computer readable code, and a model storage device that stores characteristic line model data representing the image. The program module detects multiple edges and/or ridges on the image stored in the image reading device. The program module then detects adjacencies among each of the edges and ridges, interprets common adjacencies as characteristic lines and determines a central line corresponding to each of the characteristic lines. The central line approximates the shape of the characteristic line. The program module further detects cross-sections corresponding to each point along the central line. The cross-sections include one or more geometric parameters and one or more brightness parameters.

The program module can also subdivide each of the edges and ridges into corresponding spline segments. The program module then evaluates each of the spline segments, and identifies adjacent spline segments and at least one adjacency interval on each of multiple edge components corresponding to the edges.

In another aspect of the invention, a program module of the computing apparatus detects edges on the image and subdivides each edge into corresponding spline segments. It evaluates each of the spline segments and identifies adjacent spline segments and connects, with an adjacency pointer, a midpoint of the evaluated spline segment with a midpoint of each of the corresponding adjacent spline segments. This creates multiple adjacency couples. The program module then identifies adjacency intervals as continuous chains of adjacent couples, identifies a central point of each adjacency pointer within each adjacency couple, and joins the central points of each adjacency pointer within each adjacency interval to form a central line corresponding to the characteristic line. The program module then detects cross-sections corresponding to each point along the central line. Each of the cross-sections includes one or more geometric parameters and one or more brightness parameters.

The program module determines a basis cross-section representative of the characteristic line, determines a fitting path corresponding to the cross-sections and assembles a characteristic line model representing the characteristic line. The fitting path includes a transformation of the basis cross-section to the cross-sections of the points along the central line. The characteristic line model includes data representing the central line, the basis cross-section and the fitting path. The data representing one or more of the characteristic lines, the characteristic line model, the central line, the basis cross-section and the fitting path are stored in one or more data storage devices.

According to another aspect of the invention, a program module identifies an empirical cross-section of one or more points of a line on the image and determines whether the line approximates the shape of a uniform characteristic line. If so, the program module identifies a fitting path, a corrected cross-section and a central line of the uniform characteristic line. The data representing one or more of the uniform characteristic lines, the central line, the fitting path, the empirical cross-section and the corrected cross-section are stored in one or more data storage devices. As with all aspects of the invention, the program module can work in conjunction with the interface device to interact with a user in executing the invention.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout several views of the drawings, and in which.

DETAILED DESCRIPTION OF EMBODIMENTS

Described herein is a method and apparatus for analyzing and processing digital images. In particular, the following description relates to identifying characteristic lines of an image and associated parameters, including characteristic strips, signatures, cross-sections and transformations. Moreover, described are processes for transforming the image into mathematical models derived from the characteristic lines and associated parameters.

Different types of images are processed according to the present invention, originating from different sources. Types of images include, for example, black and white and color images produced by digital photography and video (or scanned into a computer); sensor data, such as laser depth, infrared, ultrasound and x-ray images, and temperature maps; and synthetic images, generated by computer or similar means, such as CT scan imaging, magnetic resonance imaging, molecular computations and scientific visualization. Many other image sources exist and new sources appear in various applications. Although a significant type of image is the digital image, in the image data are represented in digital form, the present invention encompasses all types of image data, including analog image data.

As discussed below, all images include brightness parameters. "Brightness" can represent any values characterizing a particular image type. For example, each one of the values of the standard color separations (R, G, B) is usually referred to as brightness.

Figure 1:
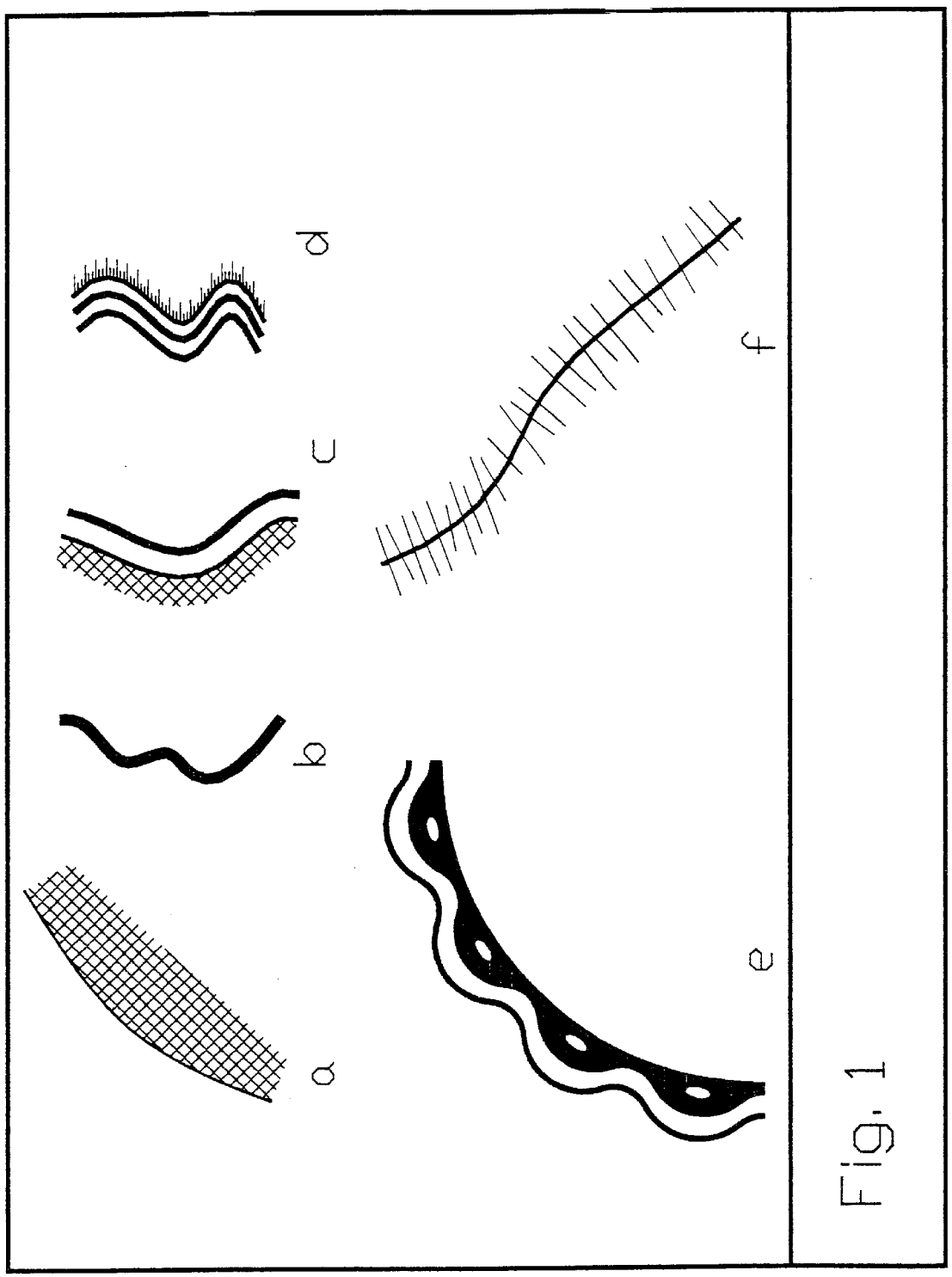
FIG. 1 shows exemplary types of characteristic lines, according to an aspect of the present invention.

The basic image element utilized in the present invention is a "characteristic line." A characteristic line is a line on the original image along which the visual pattern of the image qualitatively repeats itself. Usually, the image pattern along these lines is visually distinguishable from neighboring portions of the image (e.g., the background). FIG. 1 shows examples of characteristic lines, the most typical of which is the conventional edge, shown in FIG. 1(a). The characteristic lines depicted in FIGS. 1(b)–(d) are considered combinations of two, three and five conventional edges, respectively. FIG. 1(e) shows a characteristic line along which a brightness pattern of the image is not constant, unlike FIGS. 1(a)–(d). Rather, the visual pattern of FIG. 1(e) repeats itself periodically. FIG. 1(f) shows a characteristic line having a complicated visual pattern, although the pattern does repeat itself along the line. Conventional edges and ridges are types of characteristic lines.

Characteristic lines are global image patterns. In other words, they are identified and characterized without first having to divide the image into an artificial grid or cells, as required in the prior art. All the visually significant, mutual relations among the characteristic lines and their associated parameters are therefore accurately captured.

Figure 2:
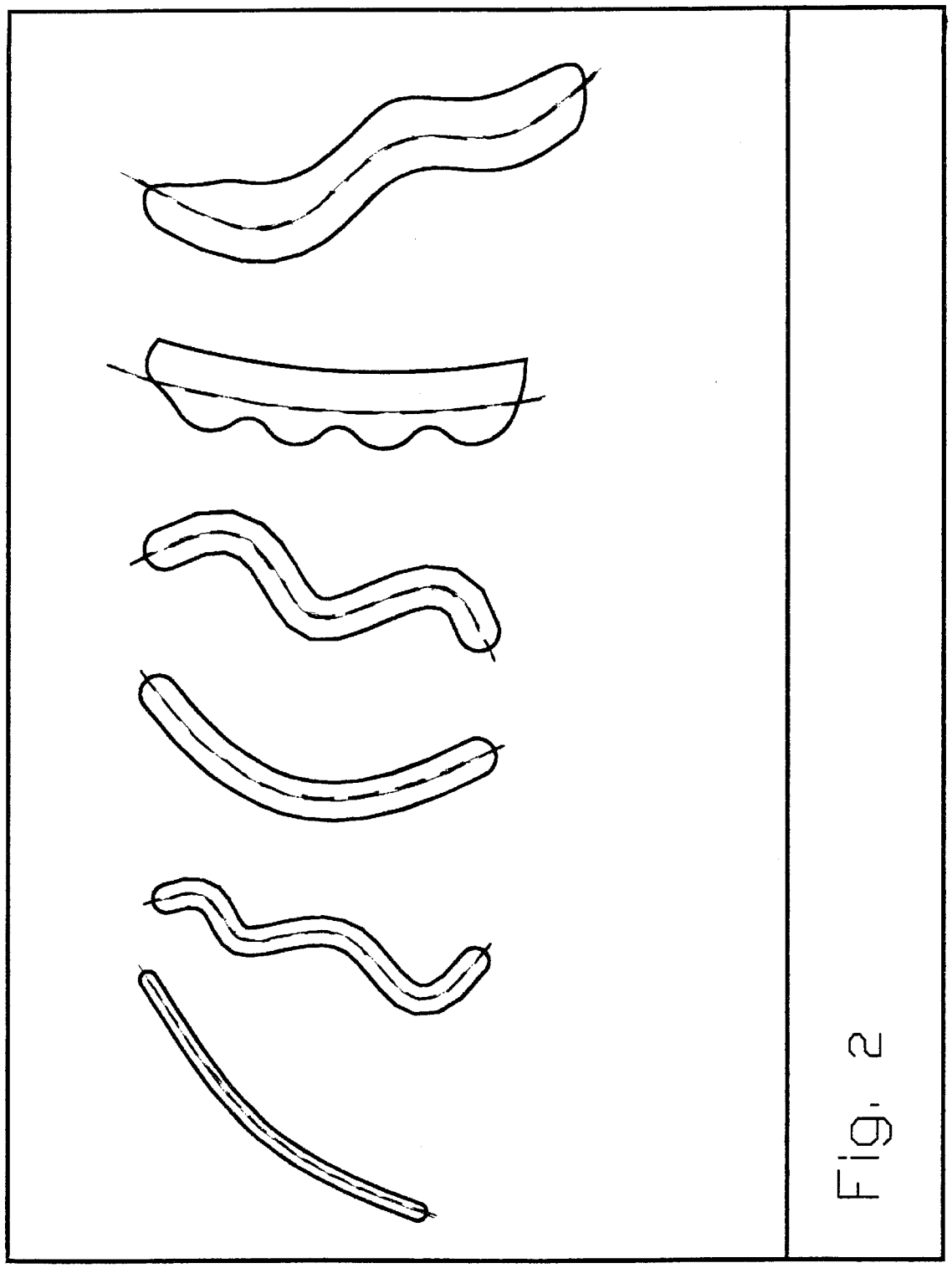
FIG. 2 shows exemplary characteristic strips and central lines, according to an aspect of the present invention.

With each characteristic line is an associated "characteristic strip." A characteristic strip is the part of the image covered by visually discernible patterns that repeat along an associated characteristic line. FIG. 2 shows the characteristic strips corresponding to each of the characteristic lines depicted in FIG. 1, respectively.

Each characteristic line also has a "central line", which is an imaginary line that is visually perceived as geometrically representative of the characteristic line. Central lines are useful in most aspects of processing the characteristic lines. The central line should not only faithfully represent the shape of the characteristic line, but should also be relatively smooth and geometrically simple. In FIG. 2, the possible central lines corresponding to the respective characteristic lines of FIG. 1 are shown as dashed lines.

Another aspect of each characteristic line is a "transition area." The transition area is the portion of the image representing a transition between the line patterns and the background. This transition area is also referred to as the "margin" of a characteristic line. Ordinarily, the margin is visually perceived as a thin band around the exterior boundary of the associated characteristic strip.

Figure 3:
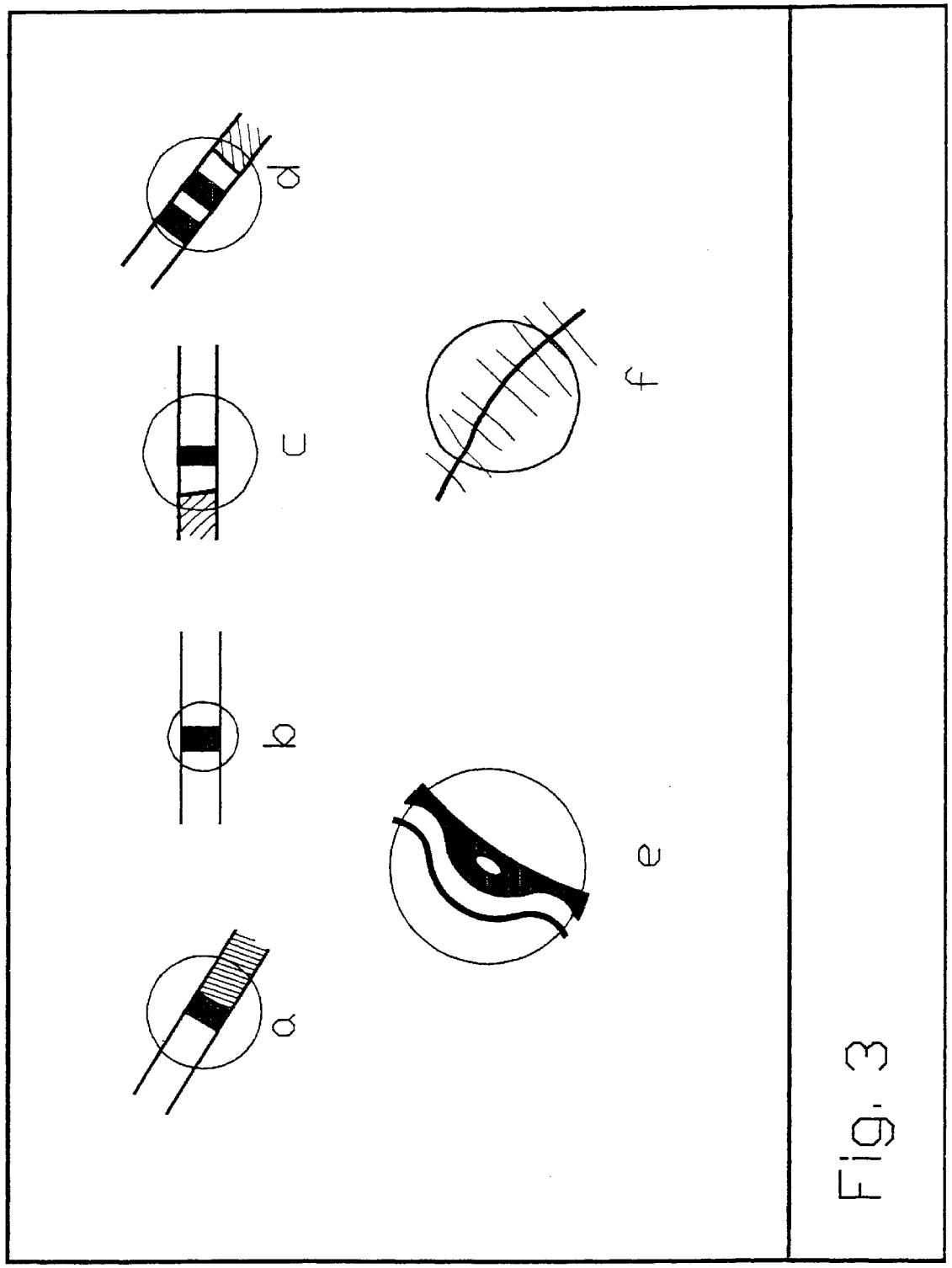
FIG. 3 shows exemplary signatures of characteristic lines, according to an aspect of the present invention.

Each characteristic line also has a corresponding "signature." A signature is a local visual pattern that repeats itself along the characteristic line. The signature generally describes the simplest brightness pattern present. The choice of signature is not unique. The signature chosen is also referred to as a "basis signature." The parameters of the signature are the brightness and geometric parameters of the repeating pattern that vary significantly along the line. FIG. 3 shows signatures corresponding to each of the characteristic lines depicted in FIG. 1, respectively. Generally, the minimal set of these brightness and geometric parameters is used.

Closely related to the signature is the "cross-section" of a characteristic line. A characteristic line has a cross-section at each point along its central line. A cross-section is the brightness (or color) pattern in a direction transverse (and usually orthogonal) to the line, represented in graph form or by a corresponding function. When represented as a graph, as noted herein, brightness values on the ordinate, and distance from the center line along the abscissa. Usually, one cross-section is chosen for the purpose of transformation, which is referred to as the "basis cross-section."

Figure 4:
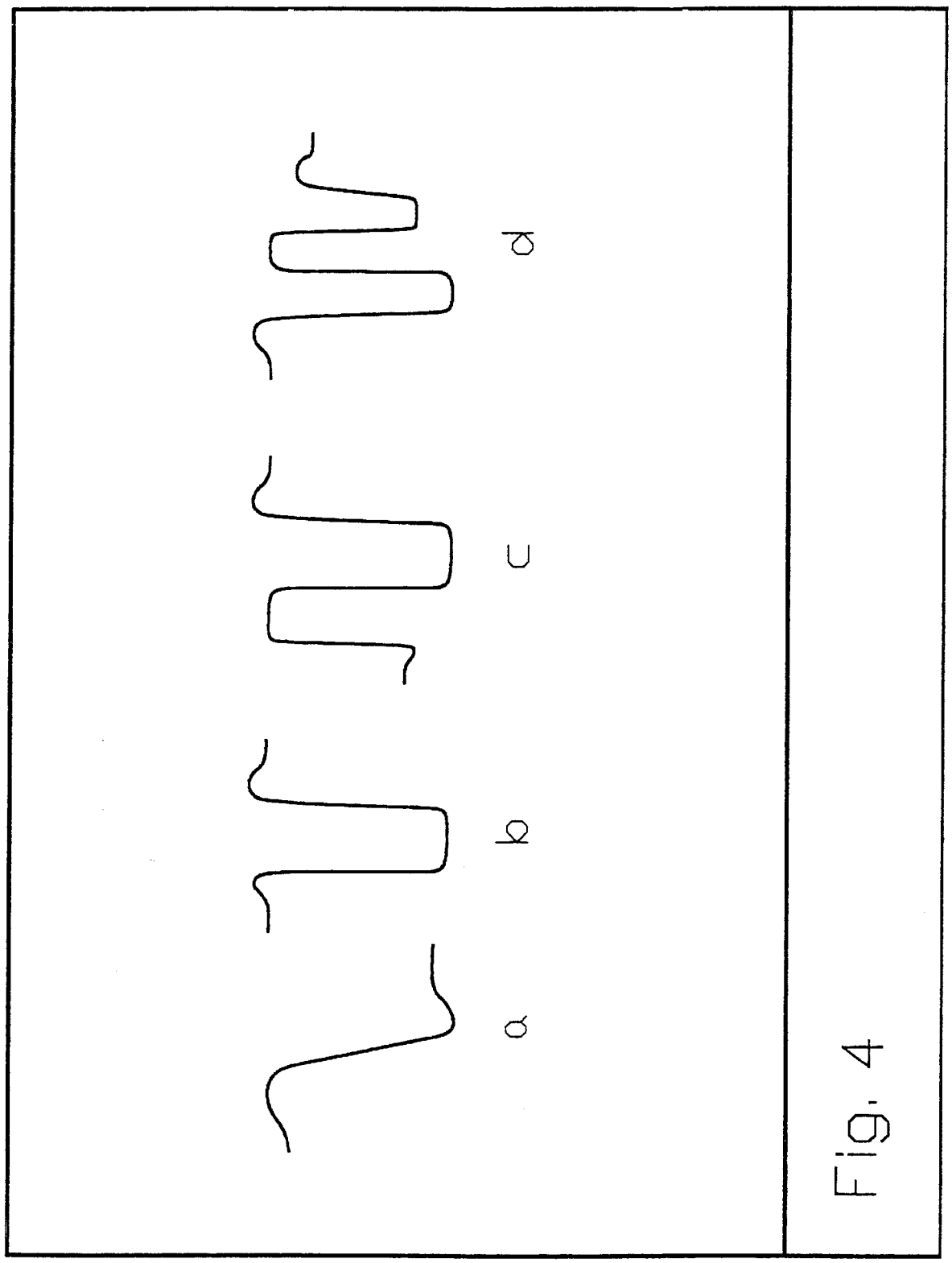
FIG. 4 shows exemplary cross-sections of characteristic lines, according to an aspect of the present invention.

FIG. 4 shows cross-sections of the "uniform characteristic lines" (discussed below), shown in FIGS. 1(a)–(d), respectively. A cross-section is represented by the coordinates (d, b), in which d represents distance from the central line and b represents brightness. In alternative embodiments, b represents, instead of brightness, the intensity of each color separation, the intensity of any sensor measurement or a vector value. For example, in color embodiments, b may represent the intensities of the three standard color separations (RGB).

The patterns along a characteristic line are not assumed to repeat themselves precisely. These patterns need only be visually perceived as repetitions of the same pattern, with possible variations in brightness and geometry. Therefore, a "fitting transformation" is performed, including both geometric and brightness components, in which the signature is "fit" to one of the perceived repetitions along the characteristic line. A sequence of fitting transformations of the signature representing repetitions along a characteristic line is known as a "fitting sequence."

One common type of characteristic line appearing in images under analysis is the "uniform characteristic line," which is a characteristic line having a signature that is completely characterized by a single cross-sectional brightness (or color) pattern. For uniform characteristic lines, the image pattern along the line is not only periodic, but essentially constant (within tolerance for the fitting transformations). Referring to FIG. 1, the characteristic lines of FIGS. 1(a)–(d) are uniform, whereas those of FIGS. 1(e) and (f) are not. The cross-section of a uniform characteristic line is a two-dimensional brightness (or color) pattern, in a direction transversal (and usually orthogonal) to the line, which completely characterizes its signature. FIG. 4 shows cross-sections of the uniform characteristic lines of FIGS. 1(a)–(d), respectively.

For a uniform characteristic line, the fitting transformation is a transformation of the cross-section at one point of the line to the cross-section at another point on the line. Therefore, the notion of the fitting sequence is replaced by a "fitting path." This is a one-parametric family of fitting transformations of a representative or selected cross-section of one point of the line to the cross-sections of all points along the line.

Generally, any evolution of a cross-section along the line is considered a family of transformations according to the present invention. If cross-sections along the characteristic line are represented in a certain form, specified by a number of parameters, any change of these parameters is a transformation of cross-sections. In particular, according to the present invention, representing cross-sections at all points of the line by a number of parameters (or representing cross-sections at certain sample points and interpolating between the sample points) is a particular way of representing the fitting path of the characteristic line.

In an embodiment, a fitting transformation T of a cross-section for a uniform characteristic line consists of a geometric transformation $T_g$ and a brightness transformation $T_b$. $T_g$ and $T_b$ are expressed in coordinates (d, b), where d is the distance of the cross-section from the central line and b is the original brightness. $T_g$ transforms d into a new value, d', as a one-to-one relationship. $T_b$ is a set of one-to-one transformations of the brightness curve, depending on the distance d, indicated by the relationship b'=$T_b$(d, b), where b'0 is the new brightness value. Therefore, the complete fitting transformation T of a uniform characteristic line is represented by the following:

$$T(d, b) = (d', b') = (T_g(d), T_b(d, b)).$$

Figure 5:
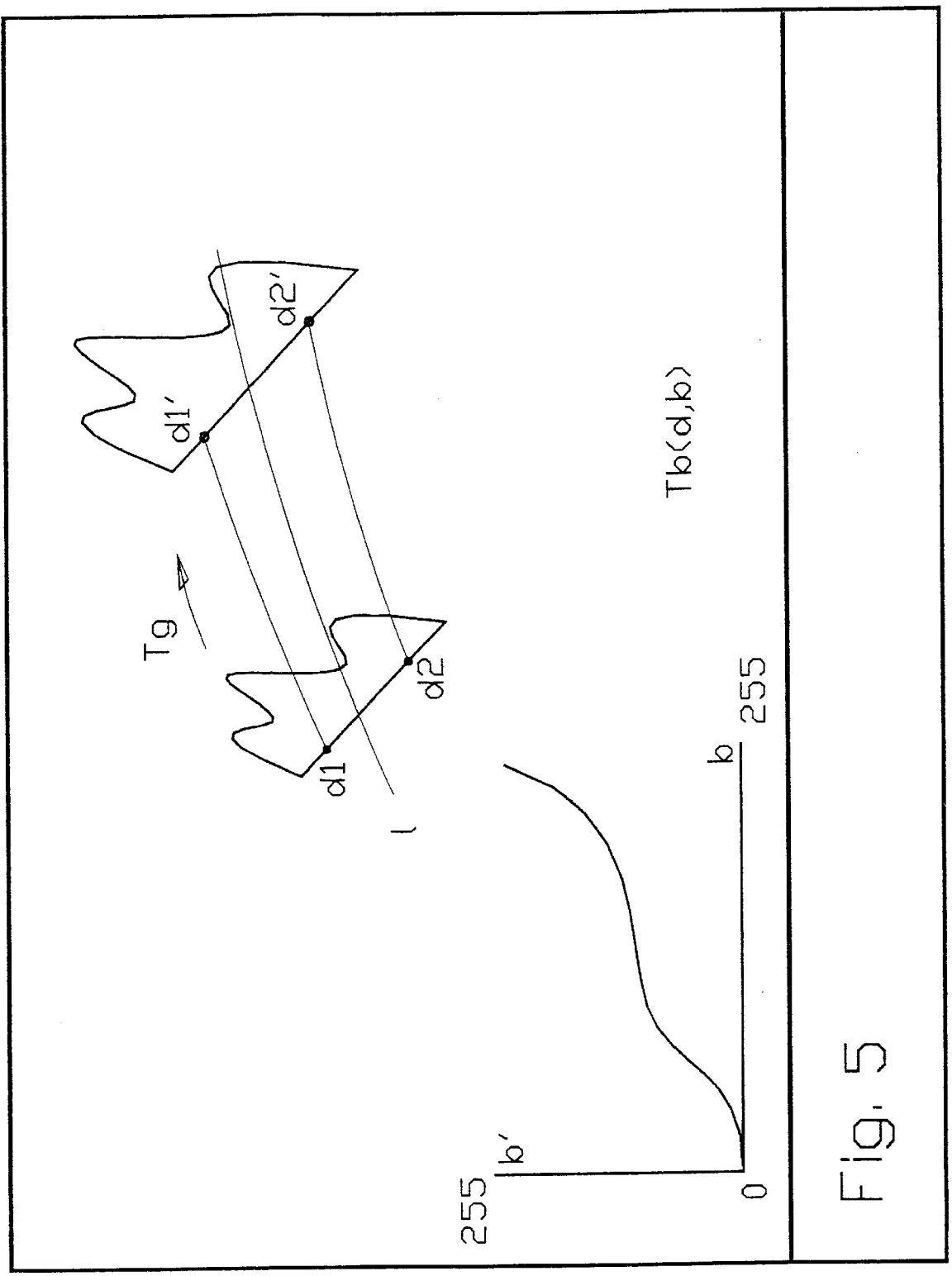
FIG. 5 shows graphical representations of exemplary geometric and brightness transformations, according to an aspect of the present invention.

Graphical depictions of $T_g$ and $T_b$, according to the relationships described above, are provided in FIG. 5.

Figure 6:
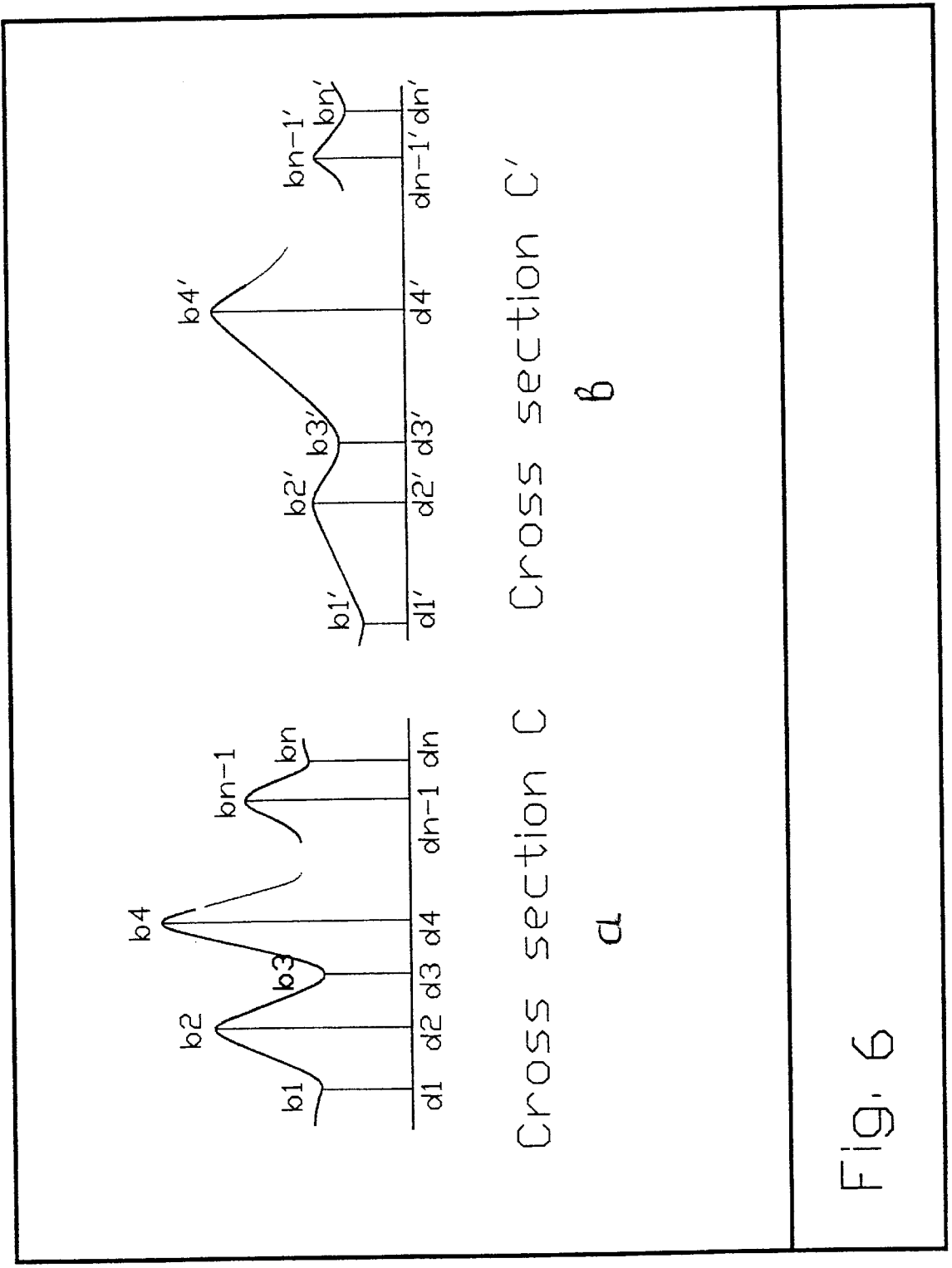
FIG. 6 shows graphical representations of exemplary geometric and brightness transformations, determined by linear interpolation between external points, according to an aspect of the present invention.

Often, a fitting transformation for a uniform characteristic line is characterized by modified distance and brightness parameters at the maximum or minimum points of the cross-section. Geometric transformation $T_g$ can then be determined by linear interpolation between the new extreme positions and brightness transformation $T_b$ can be determined by linear re-scaling of the new brightness values, as shown in FIG. 6. In particular, FIG. 6(a) shows graphically the distance and brightness values of the original cross-section on the horizontal axis and the vertical axis, respectively. FIG. 6(b) shows these values following the transformation procedures. The geometric transformation, $T_g(d_i)=d_i'$, is linearly interpolated between consecutive points $d_i$, where i=1, 2 ... n. The brightness transformation is $T_b$(di, b)=$\alpha_i$b, where $\alpha_i$=b'$_i$/b$_i$, and for each point d between $d_i$ and d'$_i$, $T_b$(d, b)=$\alpha$b, where $\alpha$ is linearly interpolated between $\alpha_i$ and $\alpha_{i+1}$.

Figure 7:
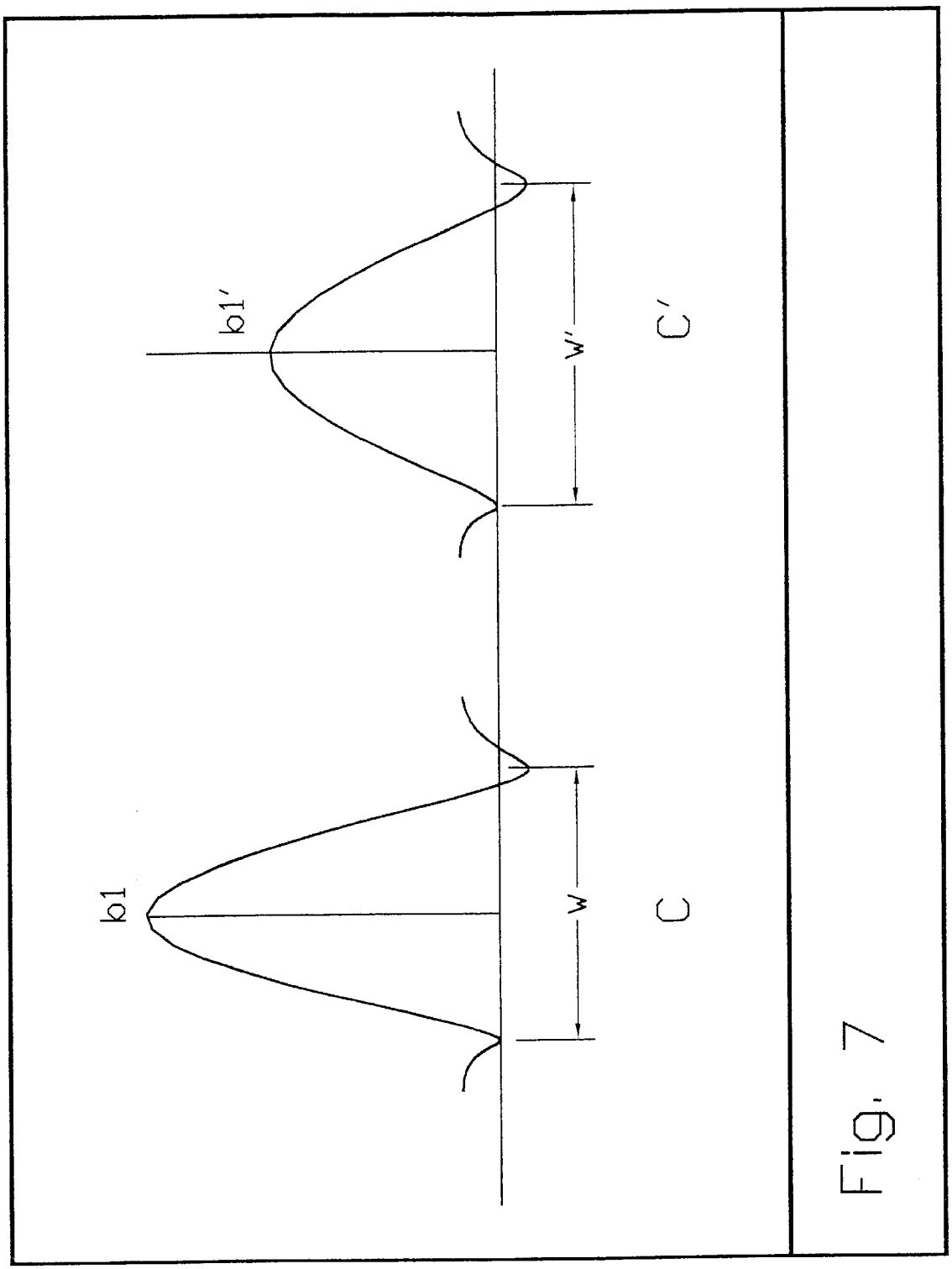
FIG. 7 shows exemplary fitting transformations of cross-sections, defined by global resealing, according to an aspect of the present invention.

In an embodiment, a good approximation of the fitting transformation is obtained by assuming that one or both the geometric and brightness transformations are global linear re-scalings. In other words, it is assumed that d'=$\alpha$d and b'=$\beta$b. Then, as shown in FIG. 7, it is possible to describe the entire fitting transformation using only two parameters. These parameters are the total width (distance d') along the horizontal axis and the total height (brightness b1') along the vertical axis of the new cross-section C'. FIG. 7, in particular, shows the original cross-section transformed into the globally re-scaled cross-section, by the following relationships:

$$T_g(d)=d'=(d)(w'/w) \text{ and } T_b(d,b)=b'=b(b_1'/b_1).$$

According to the invention, another type of characteristic line is the "non-uniform characteristic line." A non-uniform characteristic line has at least one signature that is spatially localized on the line. Although a signature of a non-uniform characteristic line may consistently repeat itself along the line, it cannot be characterized by a cross-section evolving along the line, as in the case of a uniform characteristic line. Conceivably, a non-uniform line may have more than one signature, which may alternate or form a progression along the line. Nonetheless, the non-uniform line having more than one signature is represented using the technique described herein. One skilled in the art can easily apply the described technique for single-signature lines to multiple-signature lines in view of the techniques set forth in detail herein. Otherwise, a combination of e.g., alternating signatures is generally represented as a signature including the least number of elements necessary to accurately repeat the patterns.

Figure 8:
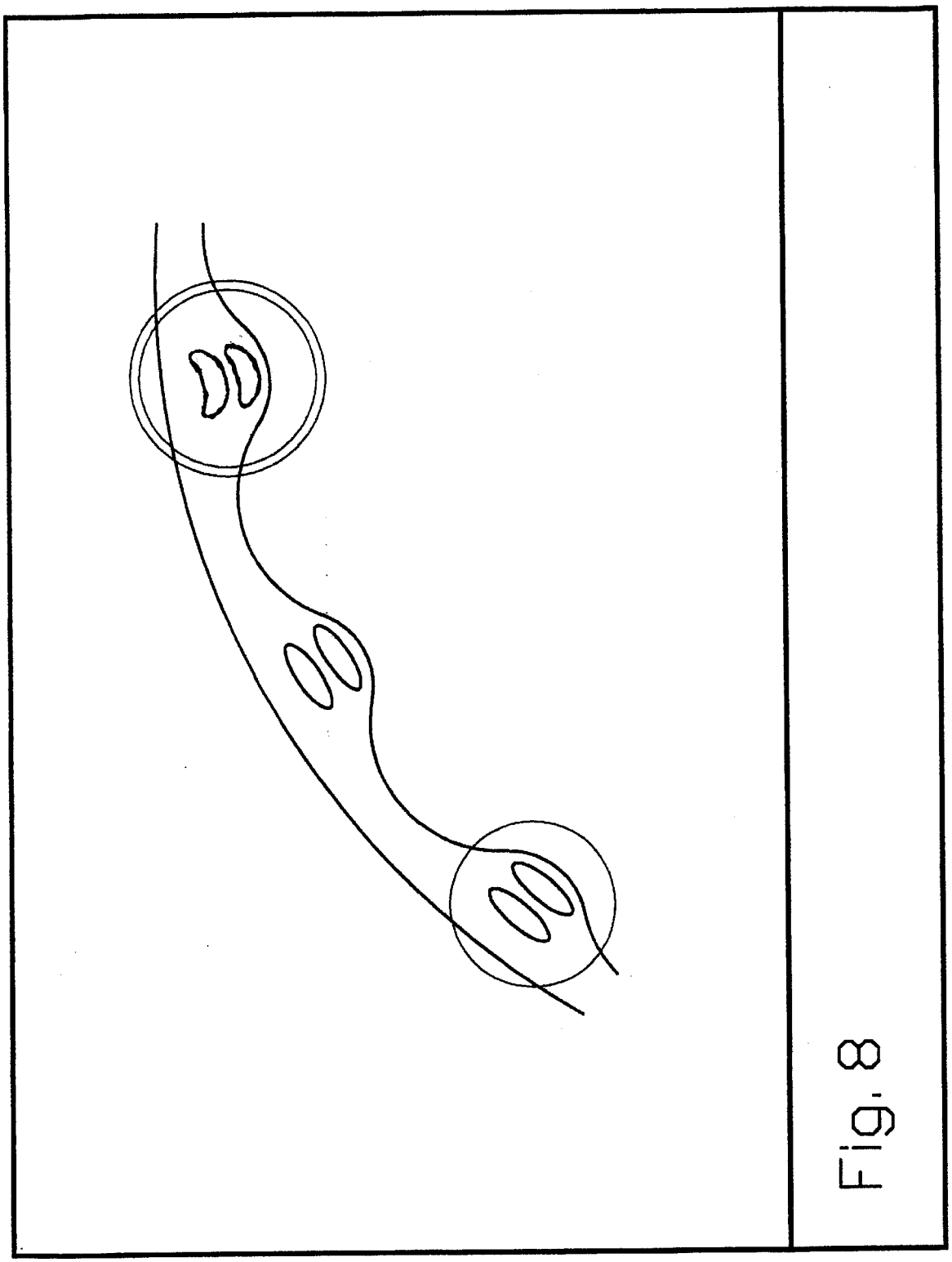
FIG. 8 shows an exemplary non-uniform characteristic line, according to an aspect of the present invention.
Figure 9:
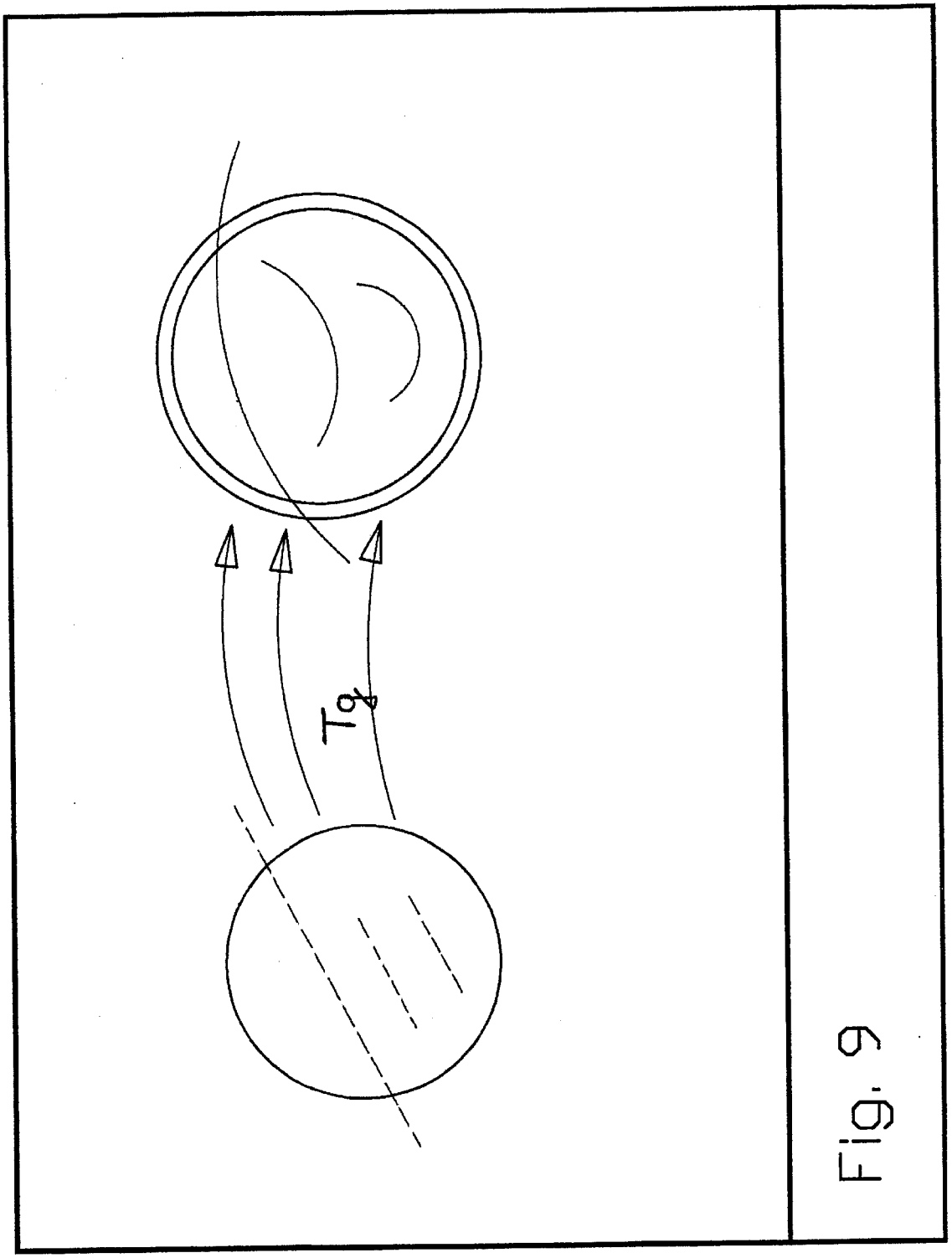
FIG. 9 shows an exemplary morphing transformation, according to an aspect of the present invention.

FIG. 8 shows a non-uniform characteristic line. The corresponding signature is the pattern, indicated by the circle, which repeats itself along the line. For the purpose of explanation, the brightness of the line in the example of FIG. 8 is constant, so the transformations of the signature along the line are only geometric. These geometric transformations can be restricted to "morphings," depicted in FIG. 9, with a relatively small distortion. A morphing is a one-to-one transformation (e.g., a distortion such as a mesh warp or other defined distortion) from the domain of the signature of the characteristic line to the domain of the signature's repetition along the line. Such transformations or distortions are conventionally represented as functions, and techniques for applying a recorded/derived distortion function to an image, or model representing an image, are well known. The domain of the signature is that portion of the image covered by the image pattern represented by the signature. Such use of restricted morphings for non-uniform characteristic lines adequately accommodates representation of an image by mathematical models, while preserving the visual integrity of the image. In FIG. 9, the circle on the right is the morphing that fits the signature to the original pattern, shown in circle on the left. That is, the signature in the left circle of FIG. 9 is depicted, for the purpose of explanation, as three dashed lines that represent the general geometry of the shape of the left circle of FIG. 8, while the morphing in the right circle of FIG. 9 shows the result of applying the same morphing transformation to the three dashed lines as that necessary to distort the shape of the left circle of FIG. 8 to the pattern within the right circle of FIG. 8.

Figure 10:
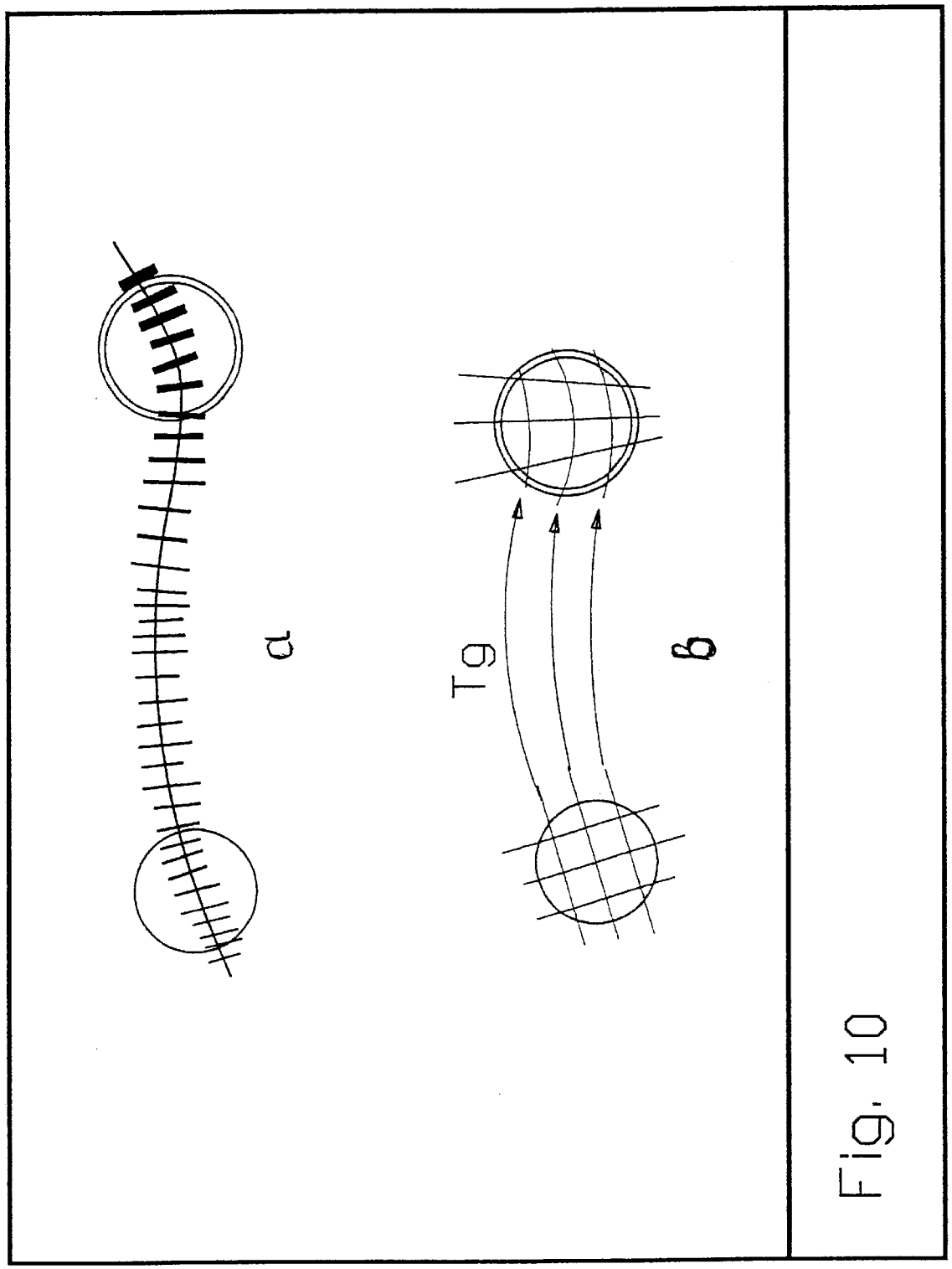
FIG. 10 shows an exemplary non-uniform characteristic line having a repeated visual pattern, and a corresponding morphing transformation, according to an aspect of the present invention.
Figure 11:
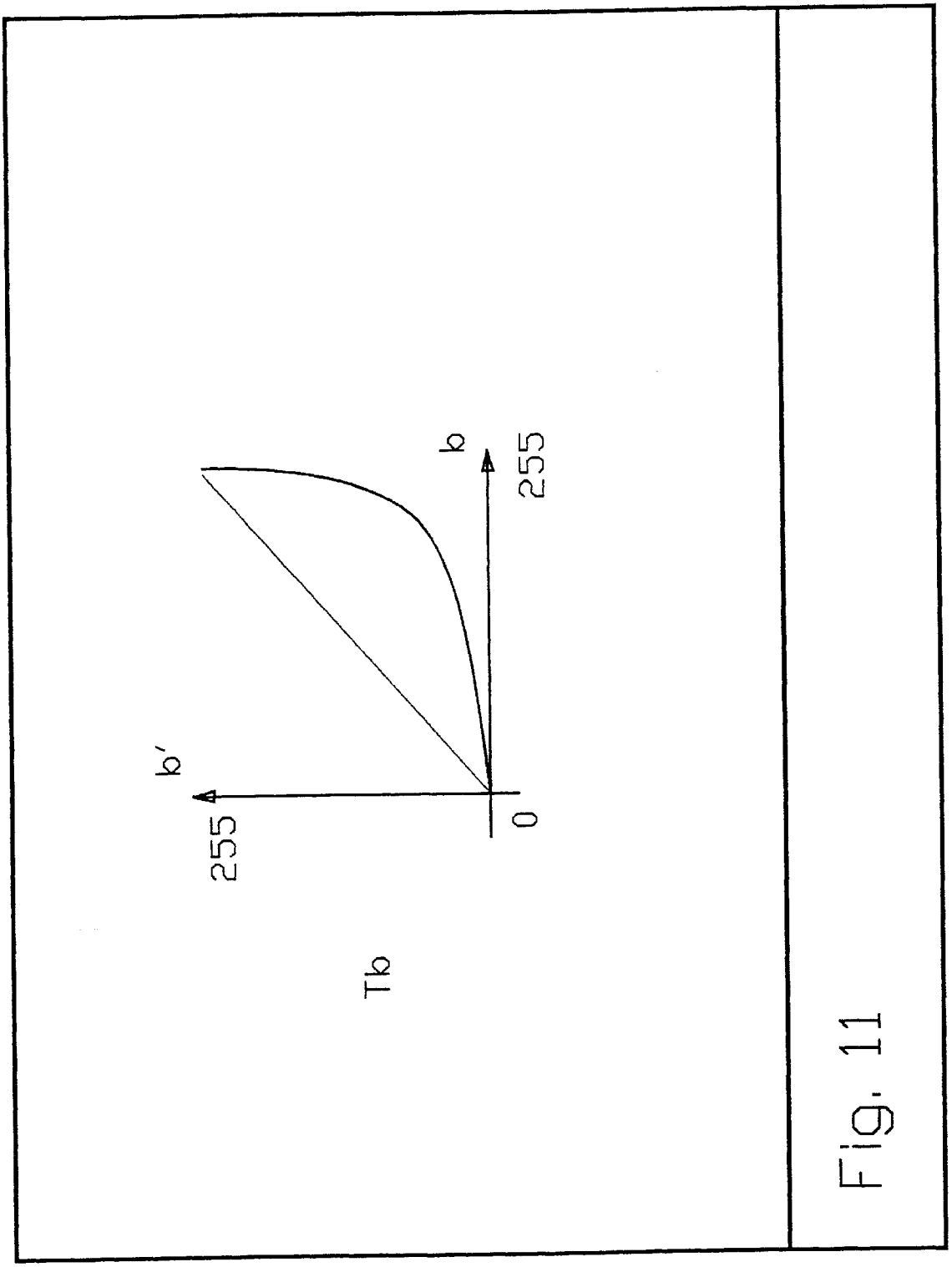
FIG. 11 shows a graphical representation of a brightness adjustment for an exemplary non-uniform characteristic line, according to an aspect of the present invention.

FIG. 10(a) shows another type of non-uniform characteristic line, in which the signature is not necessarily unique, but repeats itself with some identifiable regularity. The circled portion of the pattern represents a typical visual pattern repeated along the line and appears to be (is deemed to be) approximately the smallest element of such pattern. The corresponding fitting transformations are represented by geometric transformations (i.e., morphings), shown in FIG. 10(b), and brightness (or color) transformations, shown graphically in FIG. 11.

For all types of non-uniform characteristic lines, the fitting transformations are structured as follows: The geometric transformation $T_g$ of the transformation T is a morphing (i.e., a one-to-one transformation of the domain of the signature to the domain of its repetition along the characteristic line). The brightness transformation $T_b$ of the transformation T is a set of one-to-one transformations $T_b$ (x, b) of the brightness curve, depending on point x in the domain of the signature, where x is any point in the domain of the signature. The full fitting transformation T for a non-uniform characteristic line is therefore provided by the formula:

$$T(x, b) = (x', b') = (T_g(x), T_b(x, b)).$$

Figure 12A:
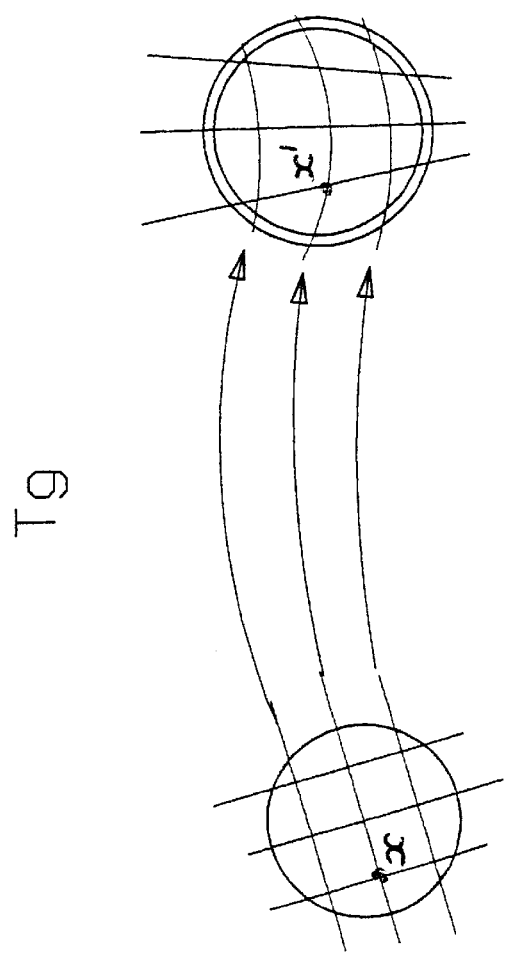
FIGS. 12a and 12b show the structures of fitting transformations of exemplary non-uniform characteristic lines, according to an aspect of the present invention.
Figure 12B:
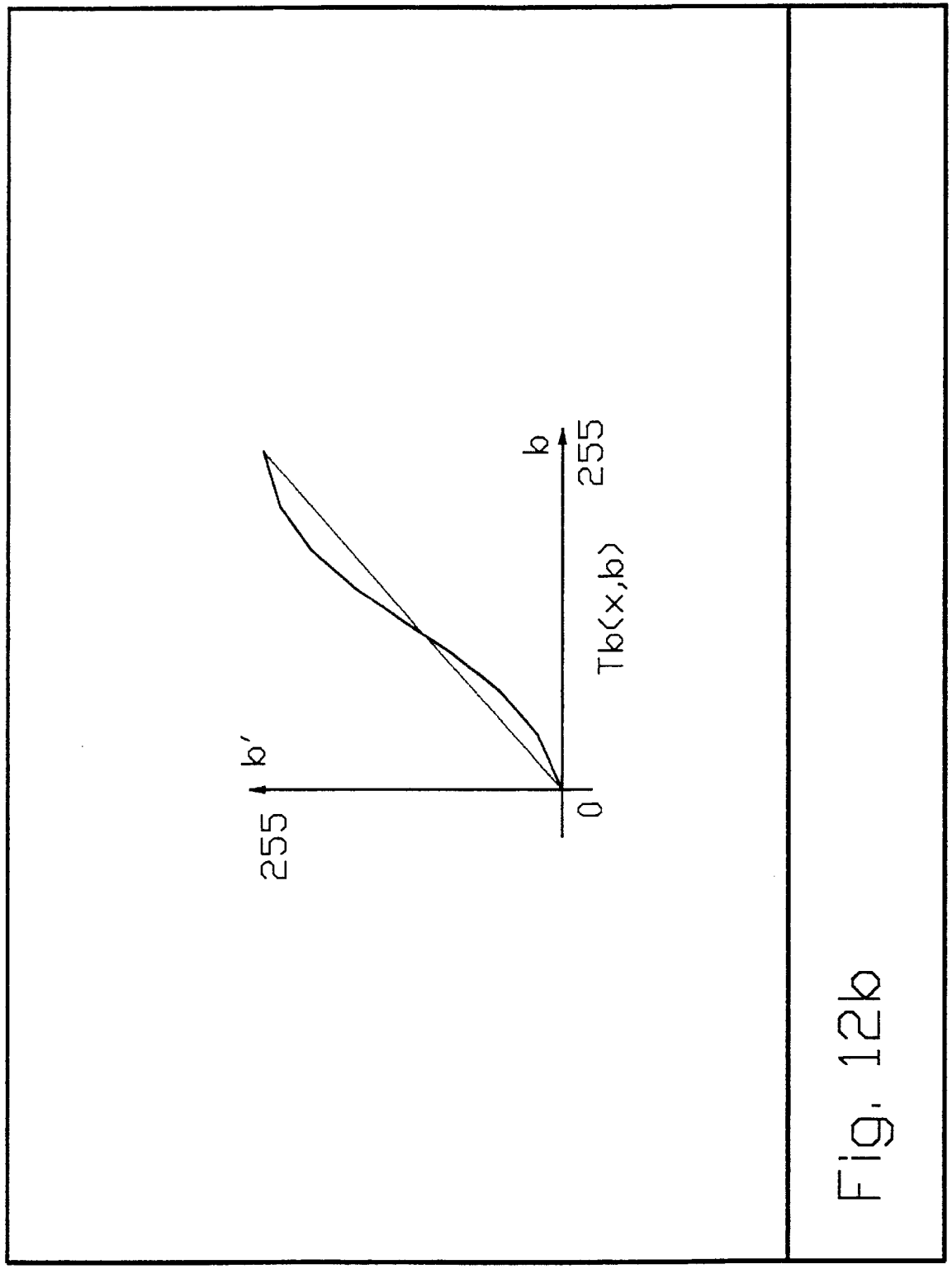

Graphical depictions of $T_g$ and $T_b$, according to the relationships described above, are provided in FIG. 12. FIG. 12(a) shows the geometric transformation, or morphing, of point x in the domain of the signature to the point x' in the domain of the signature's repetition along the line. FIG. 12(b) shows the brightness transformation Tb as an unbroken line on the graph of b and b', while the dashed line represents an identical brightness transformation.

The corresponding fitting sequence includes the fitting transformations of the signature, described above, to their consecutive repetitions along the characteristic line. Note that the fitting transformations for uniform characteristic lines are given in coordinates (d, b), and referred to in terms of the central line.

Another type of characteristic line is a "chain," which is a characteristic line along which the image brightness (or color) pattern is not constant, but repeats itself periodically. FIG. 1(e) depicts a typical chain. For all types of characteristic lines, the patterns along the lines do not necessarily need to repeat themselves perfectly. These patterns need only be visually perceived as repetitions of the same pattern, with possible variations in brightness and geometry.

Figure 13:
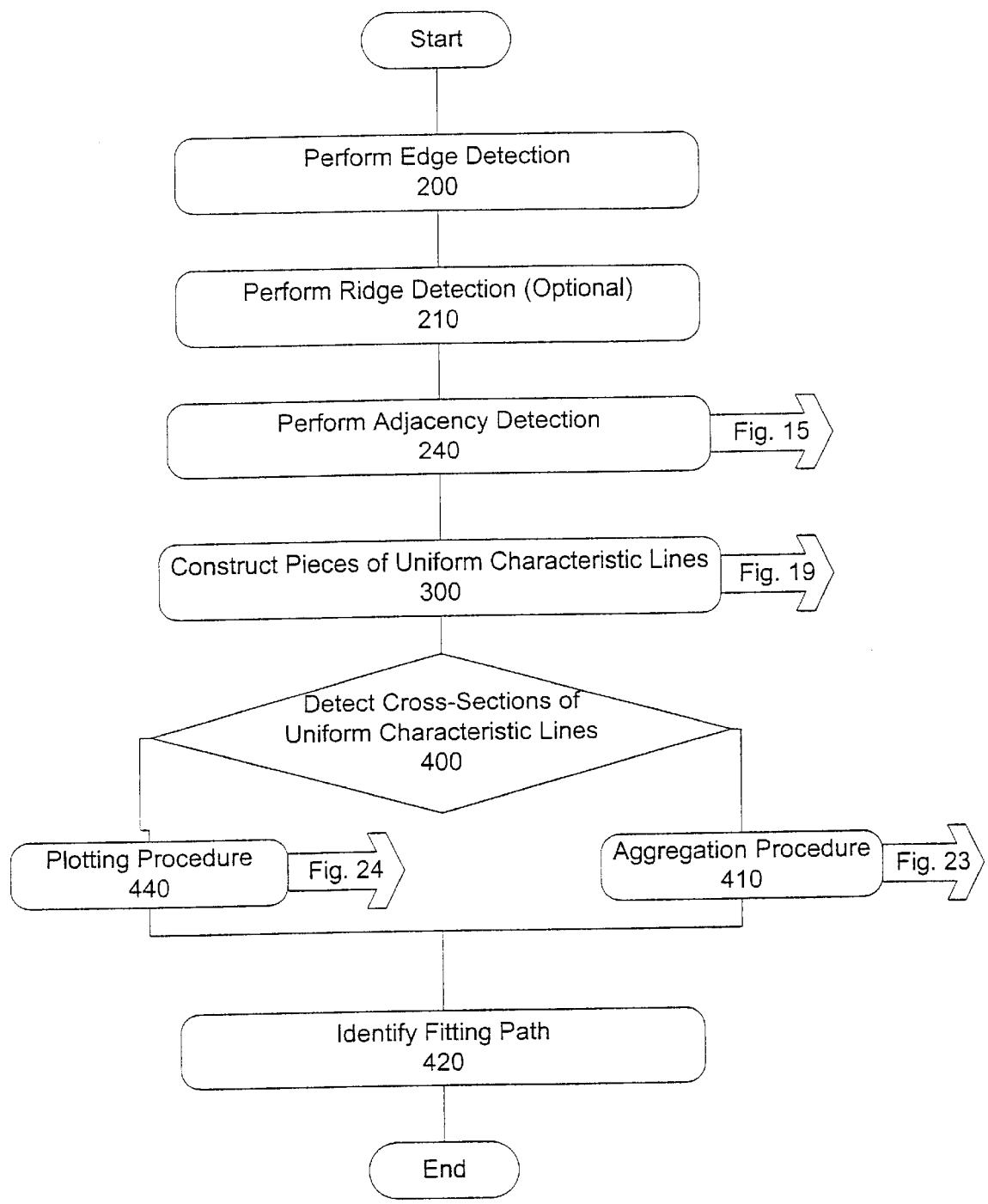
FIG. 13 is a flow chart illustrating the automatic identification procedure for identifying parameters of characteristic lines, according to an aspect of the present invention.

The characteristic lines, and the parameters corresponding to each, are approximated by mathematical models according to the method of the present invention. FIG. 13 is a flow diagram showing the overall method of representing images, usually in the form of pixels, by mathematical models derived from these characteristic lines and associated parameters. FIG. 13 depicts an embodiment of the invention involving the full automatic detection procedure, in which all steps are performed automatically. However, in alternative embodiments, not all of the steps shown in FIG. 13 are performed automatically, but rather portions of the invention are applied manually or interactively, as described below. FIG. 13 illustrates the entire process for images having only uniform characteristic lines (as opposed to non-uniform characteristic lines). If there are non-uniform characteristic lines, then further processing is necessary. This additional processing includes multi-scale identification and high-level processing, illustrated in the flow diagrams of FIGS. 29 and 30, respectively, described below.

In an embodiment, automatic implementation is preferable, especially for images of high resolution or otherwise having rich, fine-scale content. Automatic detection of characteristic lines, in the embodiment discussed herein, entails performing a combination of edge detection on different scales and identifying visual adjacencies of the detected edges, shown at steps 200 to 240 of FIG. 13. The edge detection at step 200 is accomplished applying any conventional edge detection algorithm, such as that provided by relevant portions of R. Gonzales and P. Wintz, "Digital Image Processing" (1987). The output of an edge detection algorithm is either in the form of marked pixels or spline curves, approximating the detected edges. In one embodiment of the invention, the accuracy of a geometric approximation of edges is on the order of 0.25 pixels, for example. Other accuracies may be incorporated, depending on the resolution of the image and the demands of the desired implementation.

Depending on the edge detection technique employed, non-uniform characteristic lines may not be detected as edges in the original image. However, various image processing can be used to remove detail to the extent that the localized non-uniform signatures are dominated by the overall line-shaped character of a non-uniform characteristic line. In an aspect of the present invention, the non-uniform lines are detected as uniform lines on a re-scaled image, which, after a "zoom-out" process shown in FIG. 29, reduces the image size, as discussed below. This process removes sufficient detail such that non-uniform signatures in the original scale image do not obviate the detection of edges of the dominant line shape brought out by re-scaling. Re-scaling captures most of the non-uniform characteristic lines using the procedure of FIG. 13. Furthermore, a high level procedure, shown in FIG. 30, may be implemented to assure adequate representation of all non-uniform characteristic lines.

Figure 14:
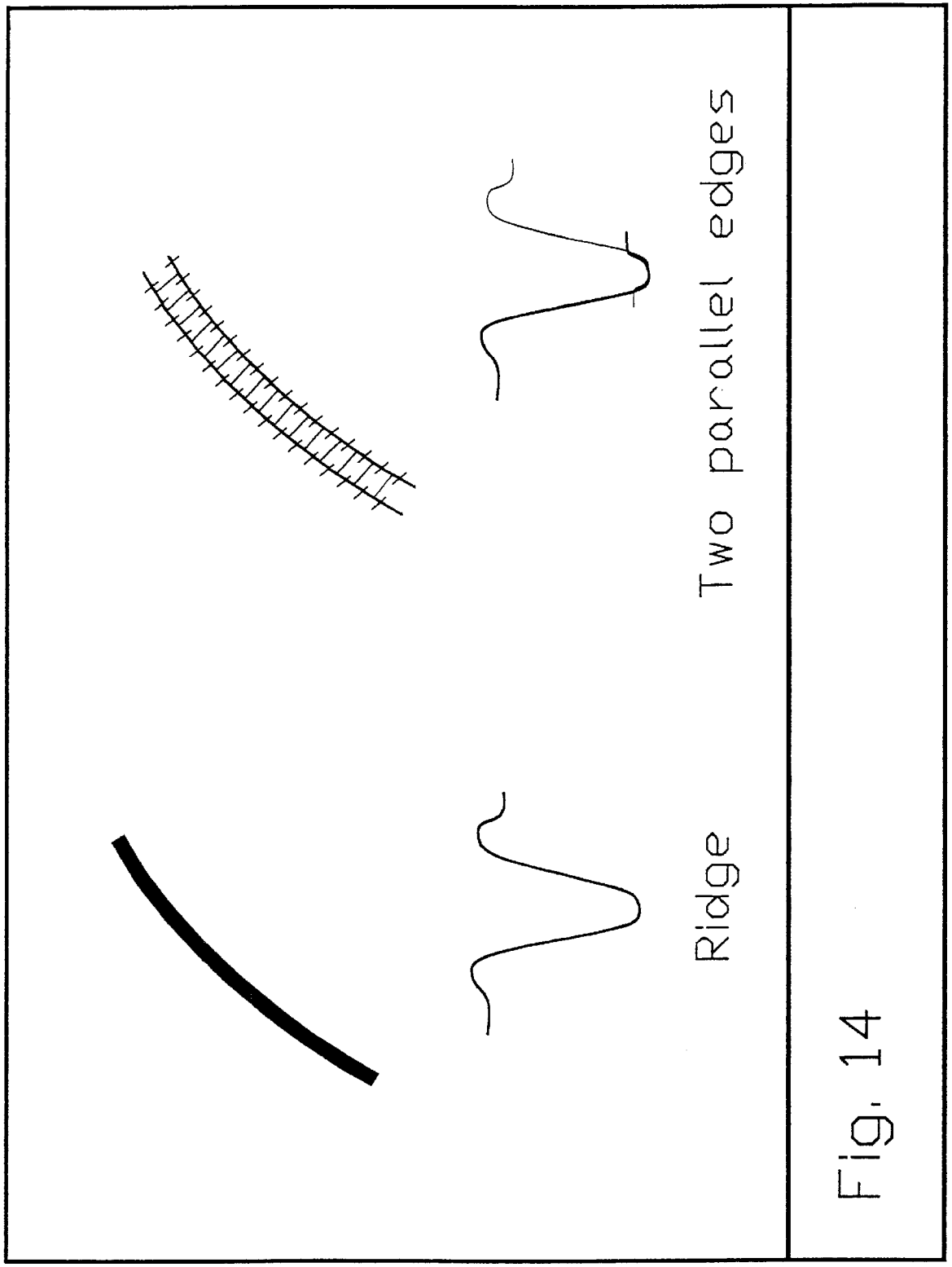
FIG. 14 shows an exemplary ridge and corresponding cross-sections, according to an aspect of the present invention.

In an alternative embodiment, characteristic lines are identified through ridge detection, in combination with edge detection. An example of conventional ridge detection techniques is provided in U.S. Pat. No. 5,960,118. The entire content of U.S. Pat. No. 5,960,118 is expressly incorporated by reference herein. Ridges may be captured as couples of adjacent edges (having different orientation) as depicted in FIG. 14. However, direct ridge detection provides much higher resolution for ridges having a width of a few pixels. It is well known that each ridge is represented by two parallel edges at a distance equal to a predefined width. If the separating distance is less than or equal to the predefined width, the edge pair is identified as a ridge. Otherwise, they are identified as separate edges. Any conventional method of ridge detection is implemented, such as those identified in relevant portions of A. Blake and M. Isard, "Active Contours" (1998). In all embodiments involving ridge detection, each detected ridge is replaced by a couple of parallel edges, placed according to the width of the ridge. After adjacency detection has been completed, these couples of parallel edges are replaced by the original ridges. If parts of the parallel edges have been detected as edges (by the edge detection part of the algorithm), as opposed to ridges, these parts are identified with one another preserving all the adjacency pointers. After ridge detection, the remainder of the algorithm proceeds as in the case of edge detection, described above.

The detected edges alone form portions of characteristic lines. More complicated uniform characteristic lines are formed by several adjacent detected edges under certain circumstances, indicated at step 240 of FIG. 13. These "adjacencies" capture the geometric distance between different image elements, by which the different image elements are visually perceived as part of the same image pattern or are deemed to be part of the same image pattern. For efficient implementation, it is important to identify these groups of adjacent edges as one characteristic line with a more complicated signature, as opposed to independent edges. Therefore, geometric adjacency between detected edges is automatically analyzed, and sufficiently long aggregates of adjacent edges are marked as new characteristic lines.

Closely related to "adjacencies" are "proximities." Proximities are the geometric distance between different image elements, such that the different image elements are visually perceived as aggregated with one another or are deemed to be aggregated, even where they comprise separate image patterns. Adjacencies are relationships between various parameters of the same characteristic line, whereas proximities are relationships between separate characteristic lines. Depending on image interpretation, some patterns can be interpreted either as adjacencies or as proximities.

Both adjacencies and proximities are determined using visual, angular distances between the elements involved. The ultimate interpretation depends largely on image resolution and complexity in view of processing requirements. For example, for a 500×700 pixel RGB image of a dense, natural world scene, viewed from the distance of 40 cm on a 17 inch, 75-dpi resolution screen, the typical range of identification is between 1 to 8 pixels for adjacencies and between 6 to 20 pixels for proximities, respectively, in an exemplary embodiment. Aggregation of image elements separated by more than 20 pixels distance, usually does not provide any significant practical advantage. Generally, these pixel threshold values are translated into visual angular distances and corrected for density and resolution of the image, viewing conditions and processing requirements.

Figure 15:
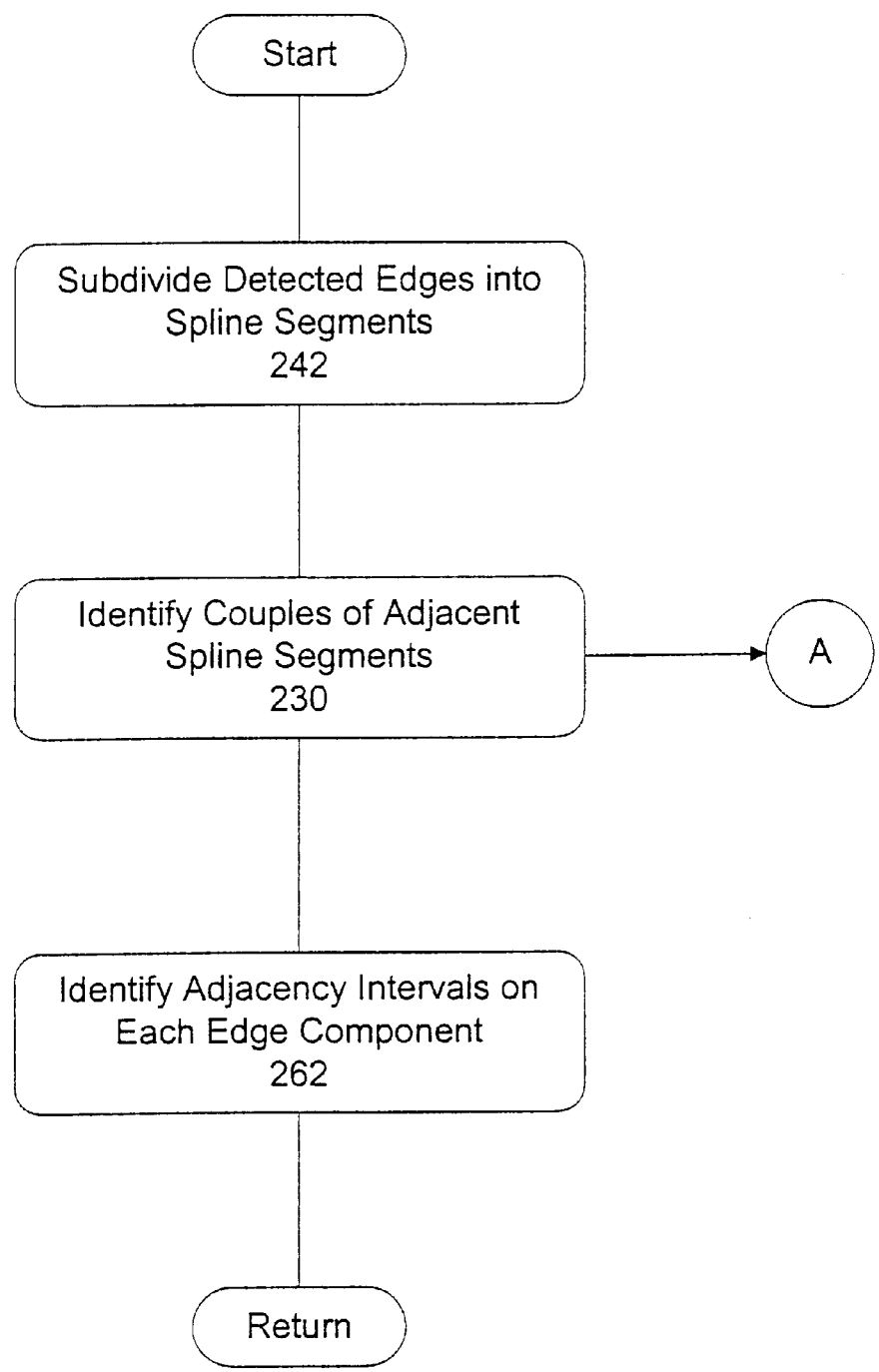
FIG. 15 is a flow chart illustrating the adjacency detection process, according to an aspect of the present invention.

Referring to FIG. 15, the first step in adjacency detection is subdividing detected edges into sub-pieces, having lengths 1.5 to 15 pixels, for example, shown at step 242. Because edges are represented by spline curves, the edge sub-pieces are referred to as "spline segments." In an embodiment, the length of the spline segments is determined adaptively. The length is based on the concept that detected edges with smaller (i.e., flatter) curvatures have longer spline segments. These spline segments may reach lengths of 10 to 15 pixels. The edge curvature must be small enough, though, so that the change in direction of the extended spline segment does not exceed a predetermined angle F4, which is on the order of 1 to 30 degrees, for example.

Figure 16:
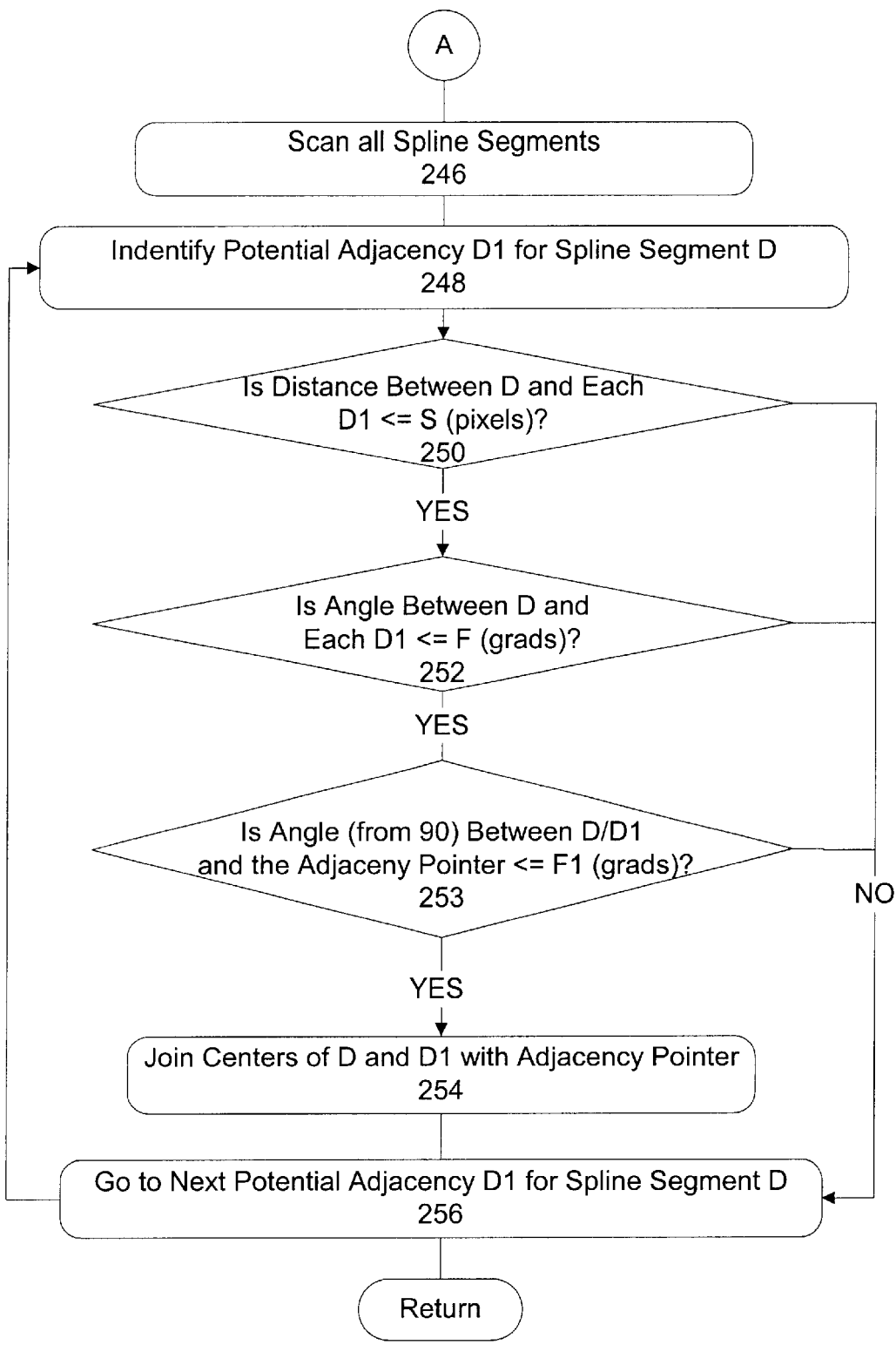
FIG. 16 is a flow chart illustrating the process of identifying couples of adjacent spline segments within the adjacency detection process, according to an aspect of the present invention.

Next, "couples" of adjacent spline segments are identified, indicated at step 230 and set forth in FIG. 16. The spline segments formed at step 242 are scanned, along with all connected components of the detected edges. For convenience, the scanned spline segments may be organized in an ordered list. The specific manner of ordering is not essential. All of the connected components are then processed in their chosen order, as described below. The associated spline segments are also processed in their chosen order. Such ordering reduces the adjacency processing.

Figure 17:
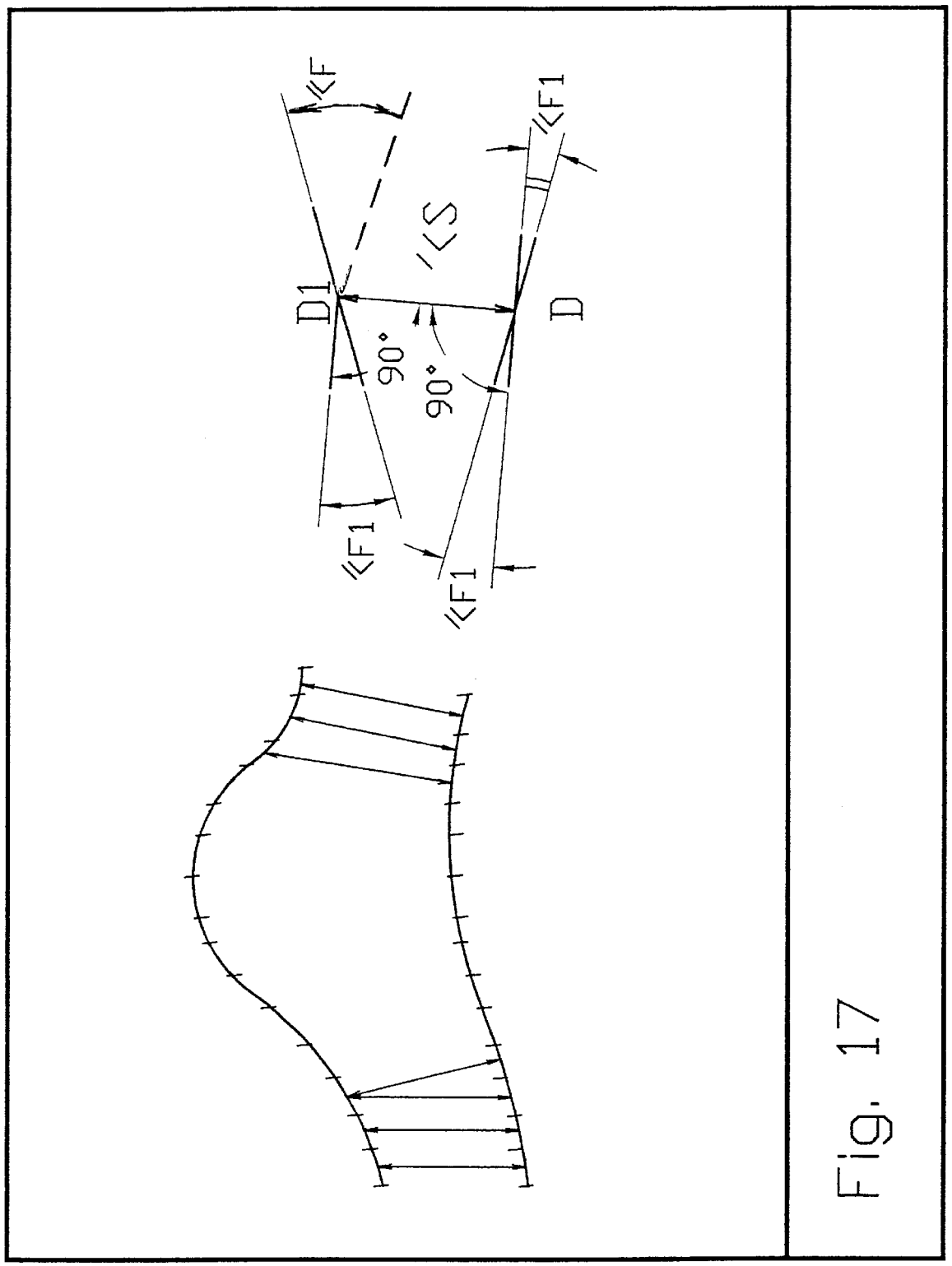
FIG. 17 shows exemplary adjacency pointers corresponding to two edge components, according to an aspect of the present invention.

At step 248, each spline segment is consecutively identified as spline segment D for processing purposes. For each spline segment D, all other spline segments (from other edge components) are scanned and consecutively identified as D1 for processing purposes. As shown at decisional diamonds 250, 252 and 253, it is determined whether there is an adjacency relationship between a spline segment D and each scanned spline segment D1. Spline segment D and any scanned spline segment D1 are deemed adjacent according to the invention if three criteria are met: (i) the distance between D and D1 is less than or equal to a predetermined distance S; (ii) the difference in angle between the directions of D and D1 is less than or equal to a predetermined angle F; and (iii) the difference between 90 degrees and the angle between the directions of D (and D1) and the (proposed) "adjacency pointer," which connects the centers of D and D1, does not exceed a predetermined angle F1. Each pairing that meets these criteria is marked by a symmetric line segment (i.e., an adjacency pointer) joining the center of D with the center of D1, indicated at step 254. FIG. 17 depicts adjacency pointers joining spline segments D and D1, as well as the distance S, angle F and angle F1. In an exemplary embodiment, typical values for S, F and F1 are 6 pixels, 20 grads and 15 grads, respectively. However, other embodiments may incorporate alternative values for each parameter.

Efficiency is improved by limiting the image area from which spline segments D1 are evaluated with respect to any spline segment D. This is accomplished by sampling spline segments D1 only within a radius S of each spline segment D. In an alternative embodiment, efficiency is further improved by subdividing the image into square blocks having the dimension S×S pixels. Then, for each spline segment D, located in a particular square block B, only those spline segments D1 of detected edges located in neighboring blocks B1 are scanned. This is easily implemented in that, for each spline segment created at step 242, the coordinates of the blocks containing the ends of a spline segment can be identified and stored.

Figure 18:
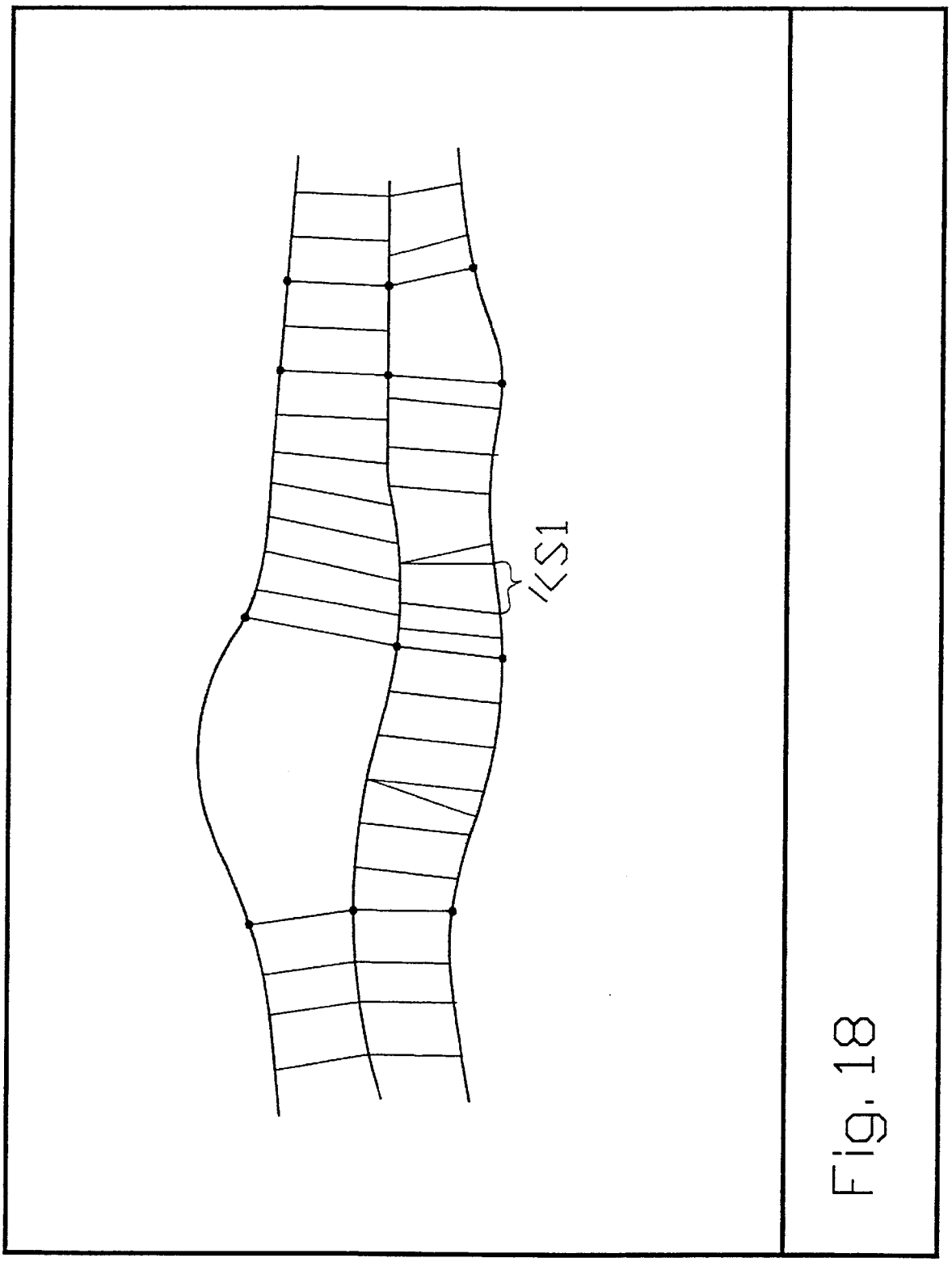
FIG. 18 shows exemplary adjacency intervals, according to an aspect of the present invention.

FIG. 18 depicts an example of couples joined by adjacency pointers. The couples of joined spline segments on different edge components are marked. Usually these couples occur in relatively long chains, corresponding to adjacency intervals of different edge components. Lastly, these adjacency intervals are identified with respect to each of the edge components, shown at step 262 of FIG. 15, by marking the end points of continuous chains of couples of joint spline segments. Gaps in these chains that are considered insubstantial, i.e., less than or equal to a predetermined length S1, are ignored. In one embodiment, S1 is on the order of 2 to 8 pixels in length, although other values can be used. Additional criteria of brightness (color) consistency, geometric smoothness of the edge components, etc., can be applied at this stage.

Figure 19:
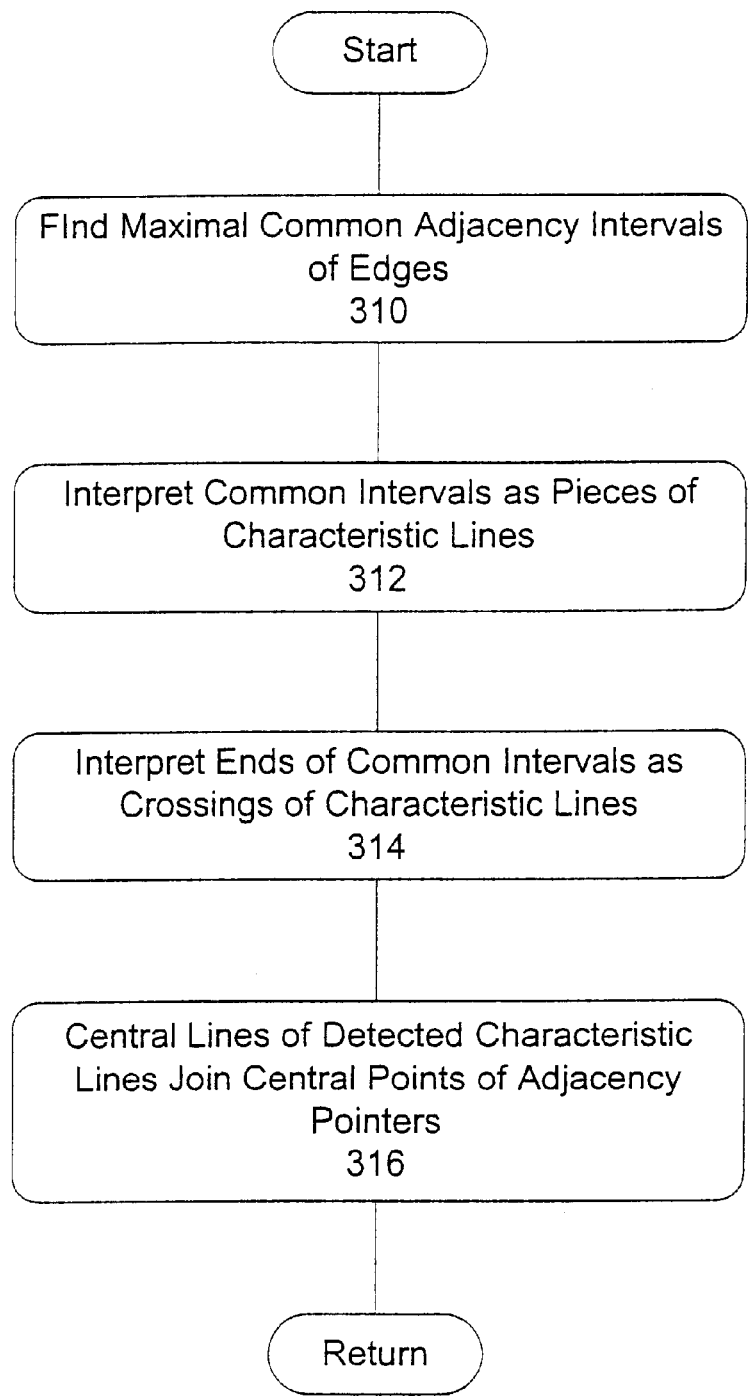
FIG. 19 is a flow chart illustrating the uniform characteristic line construction process, according to an aspect of the present invention.
Figure 20:
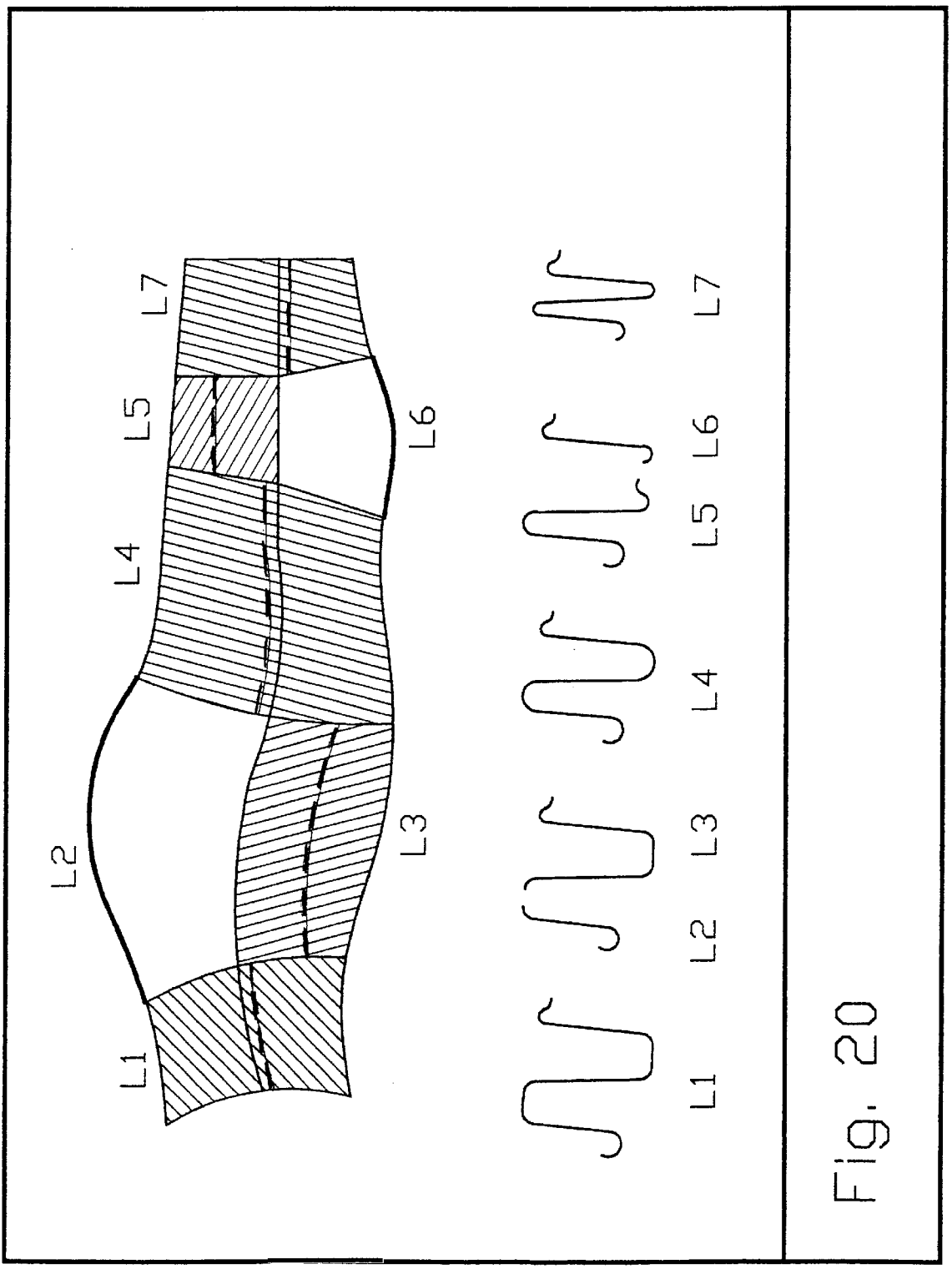
FIG. 20 shows an exemplary aggregated characteristic line with central lines, according to an aspect of the present invention.

As the adjacencies detection is completed, some of the edge components have been detected as adjacent (on certain sub-intervals). Now, uniform characteristic lines may be constructed, shown in FIG. 19. At step 310, the maximal common adjacency intervals of all edges are found. These common adjacency intervals are interpreted as pieces of characteristic lines, while the ends are interpreted as crossings of separate characteristic lines. FIG. 20 shows identification of the characteristic line in FIG. 18 as an aggregation of seven uniform characteristic lines, L1 to L7, and their respective cross-sections. At step 316, the central lines of the detected characteristic lines are derived from the lines joining the central points of the adjacency pointers. The central lines are depicted as dashed lines in FIG. 20. Where two or more adjacency pointers are situated end-to-end, essentially forming a single, extended adjacency pointer, the central line is derived from the line joining the central point of the combined adjacency pointers. For example, the central lines of L1, L4 and L7 in FIG. 20 connect the central points of combined adjacency pointers.

Figure 21:
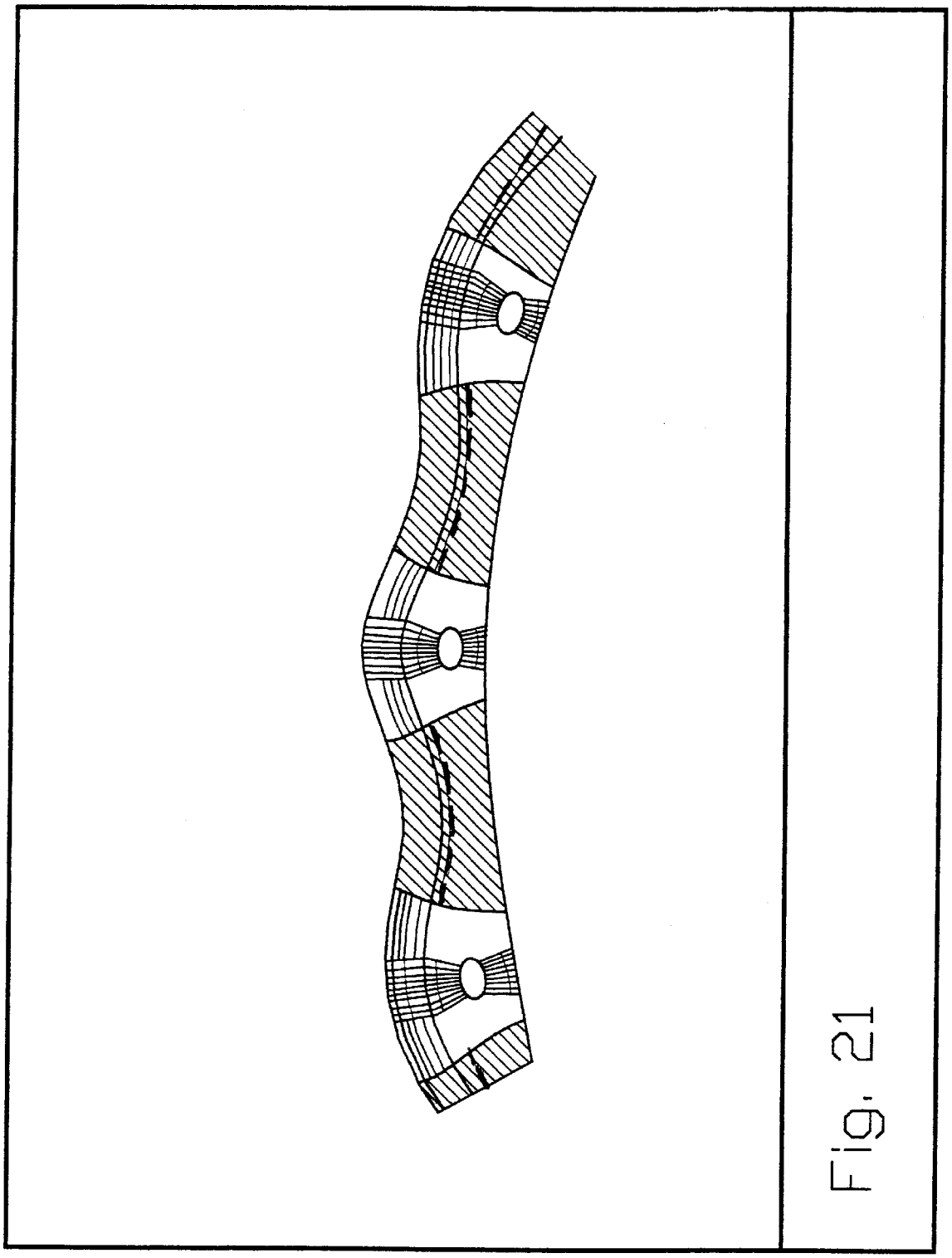
FIG. 21 shows an exemplary non-uniform characteristic line as aggregation of uniform characteristic lines, according to an aspect of the present invention.

This process only identifies uniform characteristic lines. Non-uniform characteristic lines are captured as aggregations of uniform characteristic lines, via their crossings. For example, representation of a non-uniform characteristic line by multiple uniform characteristic lines is shown in FIG. 21. The solid lines represent edges, while the dashed lines represent central lines of more complicated characteristic lines (i.e., ridges, in this case). Below, a "high level" algorithm is described, with reference to FIG. 30, described below, which allows for automatic or semi-automatic capturing of non-uniform characteristic lines, starting with the initial identification process depicted in FIG. 8.

After the constructing uniform characteristic lines, the cross-section for each must be identified, as indicated at step 400 of FIG. 13. Detecting cross-sections of uniform characteristic lines may be accomplished by a number of techniques. Techniques provided in alternative embodiments of the invention include the "aggregation procedure" at step 410 and the "plotting procedure" at step 440.

Uniform characteristic lines are captured as common adjacency intervals of several edges and ridges. This enables an efficient, automatic approximation of their corresponding cross-sections. Indeed, the cross-sections of edges and ridges usually have the shape shown in FIG. 22 and therefore can be characterized by a small number of parameters, such as width, two margin brightness values on each side, and (for ridges only) a central brightness.

Figure 23:
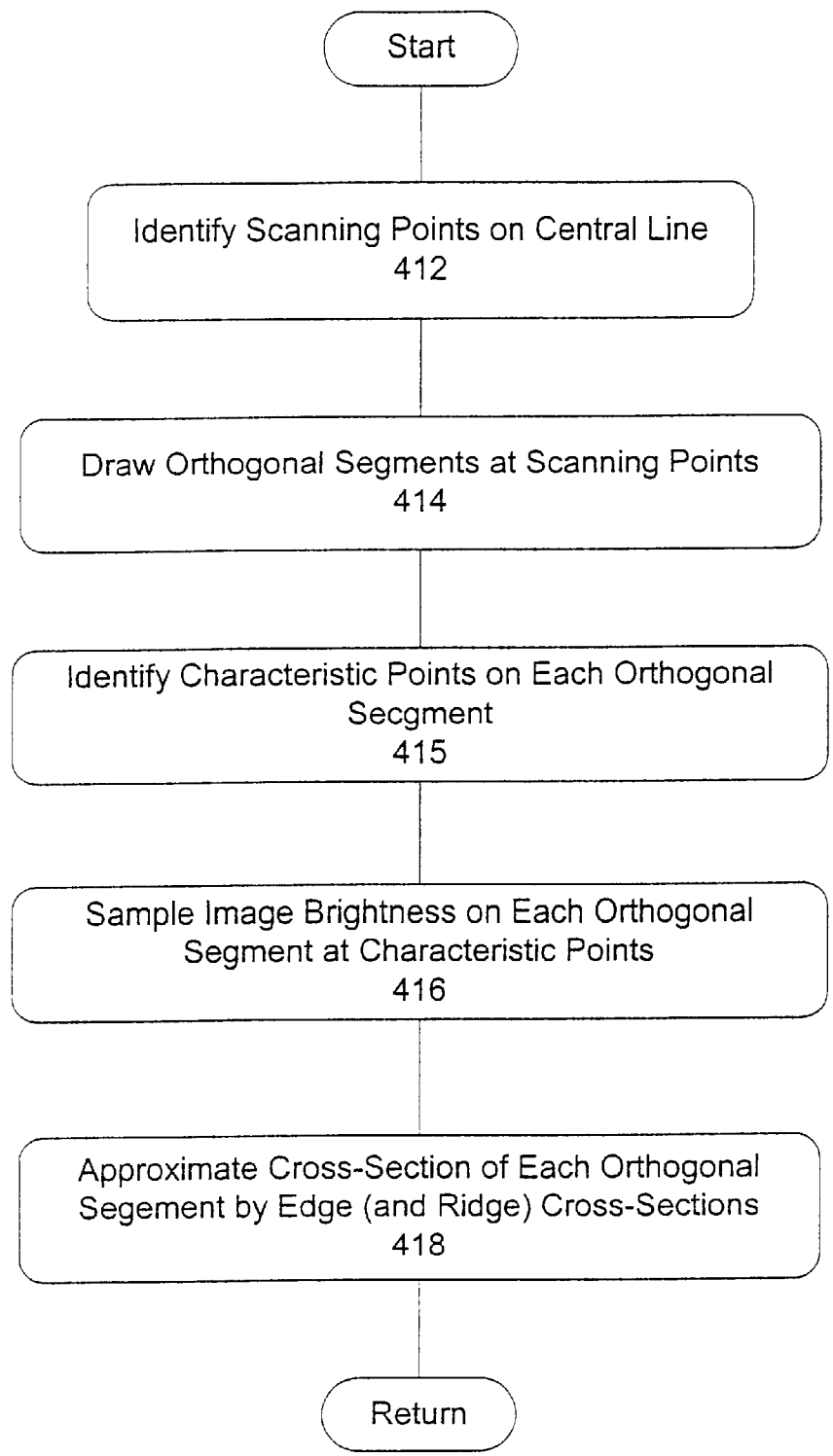
FIG. 23 is a flow chart illustrating the aggregation procedure, according to an aspect of the present invention.

The aggregation procedure, shown by the flow diagram of FIG. 23, produces the total cross-section of each uniform characteristic line by aggregating the cross-sections of the adjacent edges and ridges which form the line. This procedure is necessary only if the method of edge and ridge detection does not inherently produce cross-sections. For example, the edge and ridge detection technique described in U.S. Pat. No. 5,960,118, the entire content of which is expressly incorporated by reference herein, produces edges and ridges with spline approximations of their respective cross-sections. Based on this method, the total cross-section is produced as a spline curve, consisting of the corresponding edge and ridge pieces. However, other methods of edge and ridge detection may not generate this information.

Referring to FIG. 23, step 412, the aggregation procedure begins with identification of certain reference points $s_i$, called "scanning points," along the central line of each characteristic line. In an exemplary embodiment, the scanning points $s_i$ are selected at equal intervals, several pixels in length (e.g., 2–8 pixels) along the central line. Line segments orthogonal to the central lines at the scanning points are "drawn" (e.g., virtually projected) at step 414. Then, as indicated at step 415, "characteristic points" are constructed on the orthogonal line segments at the points of intersection between the segments of the central line and the margins of the edges and ridges (and the central lines of ridges).

Figure 22:
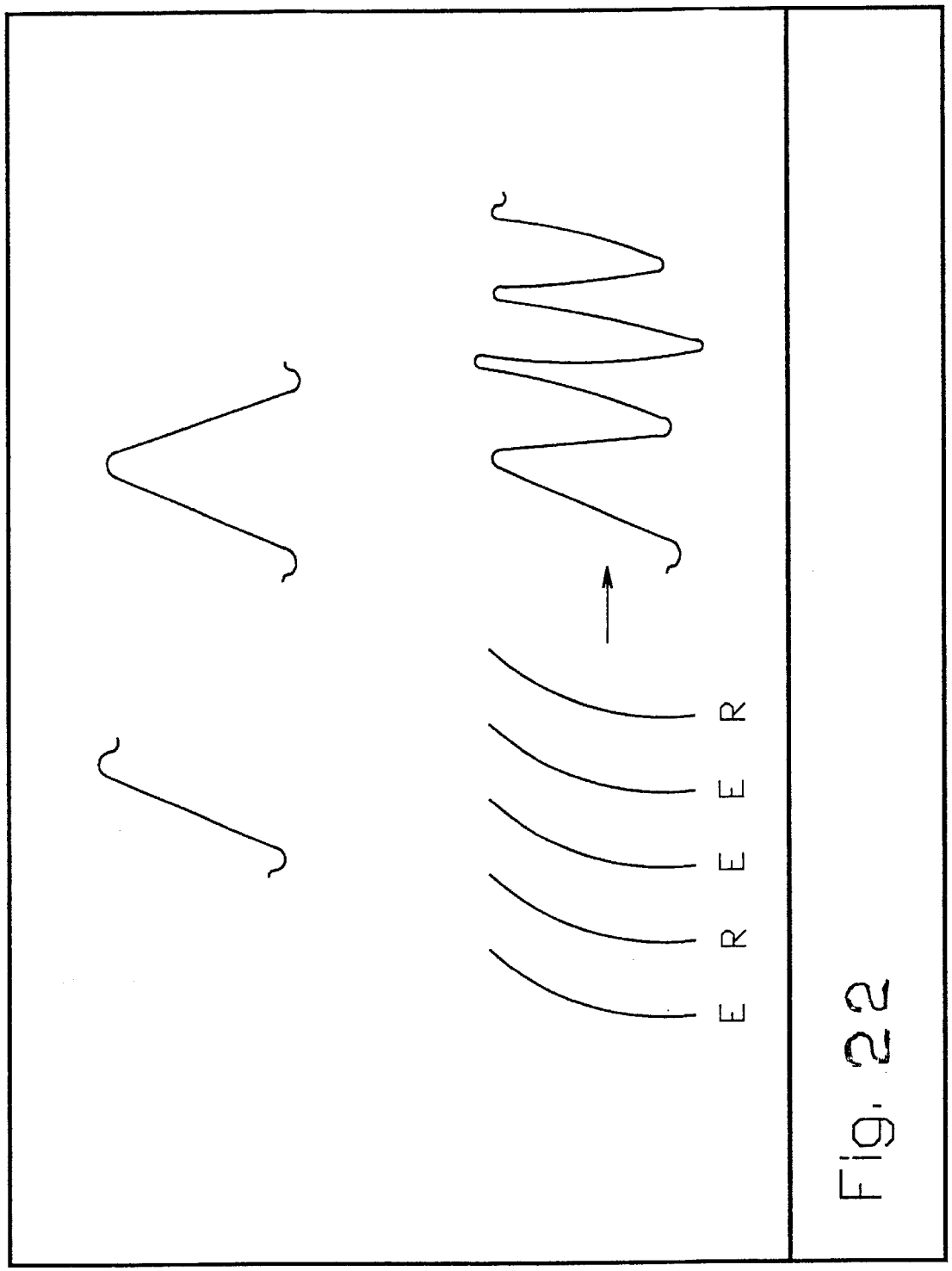
FIG. 22 shows exemplary aggregation of cross-sections of edges and ridges, according to an aspect of the present invention.

Image brightness is sampled on each orthogonal segment at these characteristic points, shown at step 416. Also, at step 418, the cross-section of each orthogonal line segment is approximated by the edge and ridge cross-section, using parameters corresponding to the actually sampled values of this segment. FIG. 22 depicts the combined edge and ridge cross-section derived from the series of edges and ridges, designated "E" and "R," respectively, approximated from the aggregation procedure. The aggregation procedure produces a cross-section $C_i$ on each segment orthogonal to the central line at the sampling points si. In an embodiment of the invention, these cross-sections are further interpolated between the points si to apply to any point s on the central line.

After the aggregation procedure is performed, the fitting path of transformations T(s), such that $T(s)C_1=C(s)$, is determined, indicated at step 420 of FIG. 13. This process is described below in reference to the plotting procedure, at steps 460 and 476 of FIGS. 24a and 24b.

The resulting approximation generally produces a visually faithful cross-section of the uniform characteristic lines, which is sufficient for most applications. However, in many cases, especially where the image obtained is by sensors other than conventional optical devices (such as x-ray images), an approximation based on the aggregation procedure may be inadequate. In these cases, the "plotting procedure" is used to determine the cross-section. This procedure provides empirical cross-section identification, because it captures the actual cross-section of the original image without any a priori assumptions regarding possible shape.

The plotting procedure assumes, as a given, input of a central line l corresponding to the characteristic line for which a cross-section is to be determined. However, it is not essential that the central line be provided with exact precision. In fact, the plotting procedure ultimately produces an accurate central line, even starting with a rough approximation. Moreover, the plotting procedure can be performed using any given line l on the image. Where l approximates a certain uniform characteristic line, the plotting procedure will produce at once an accurate cross-section of this characteristic line, along with a corresponding fitting path and central line. If l does not represent a uniform characteristic line, the plotting procedure will indicate this fact and signal the same.

Figure 24A:
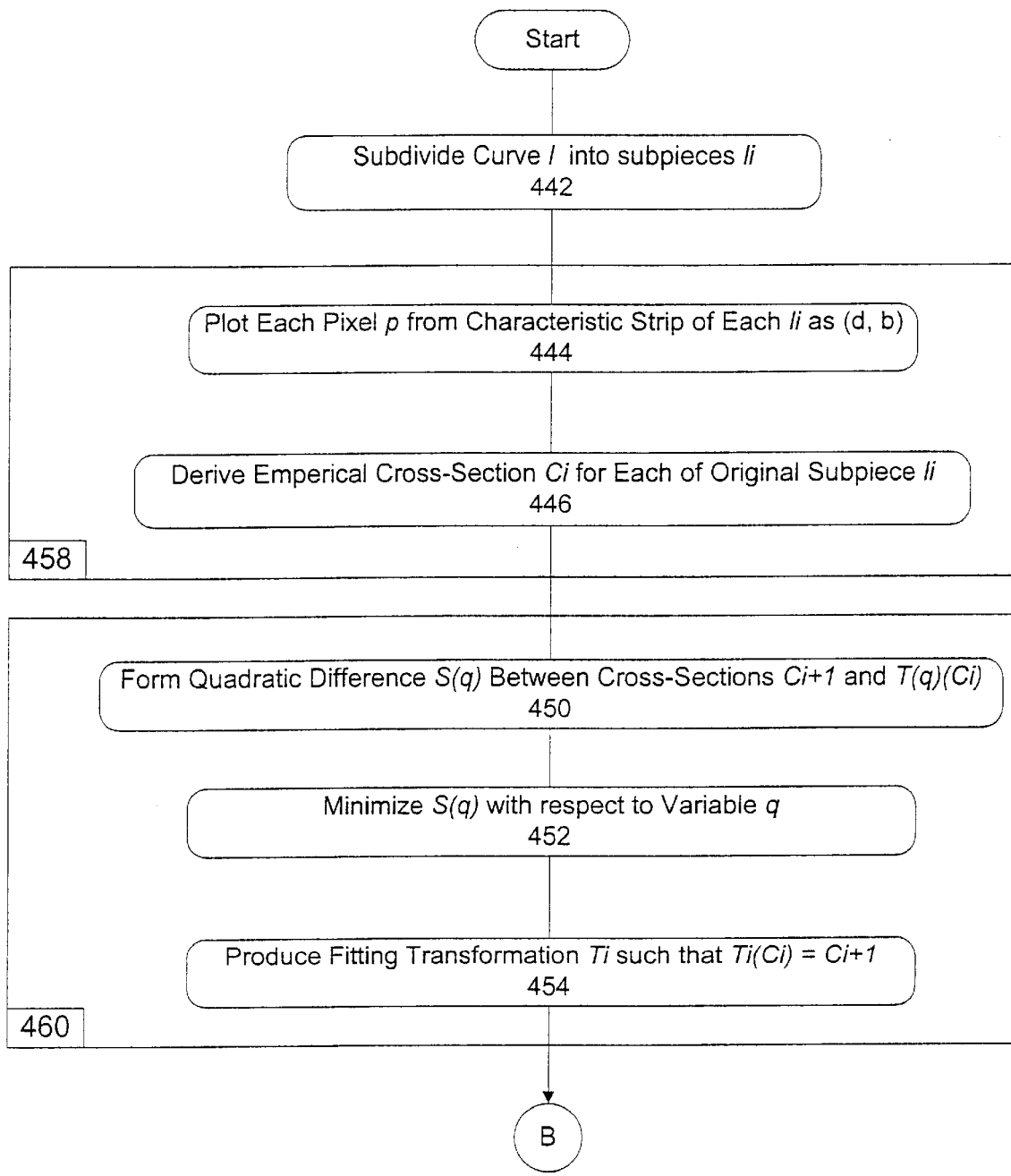
FIGS. 24a and 24b are a flow chart illustrating the general plotting procedure, according to an aspect of the present invention.

The plotting procedure is further divided into "restricted plotting procedure" and "general plotting procedure." As indicated in step 458 of FIG. 24a, the restricted plotting procedure may be incorporated into execution of the general plotting procedure. However, under certain circumstances, the restricted plotting procedure alone is sufficient for cross-section detection. For example, the restricted plotting procedure is sufficient where the line l represents an accurate central line of a uniform characteristic line, and the cross-section not only qualitatively preserves its shape along line l, but is essentially constant. In other words, where the fitting path of line l is constant, the restricted plotting procedure adequately produces a cross-section.

Figure 25:
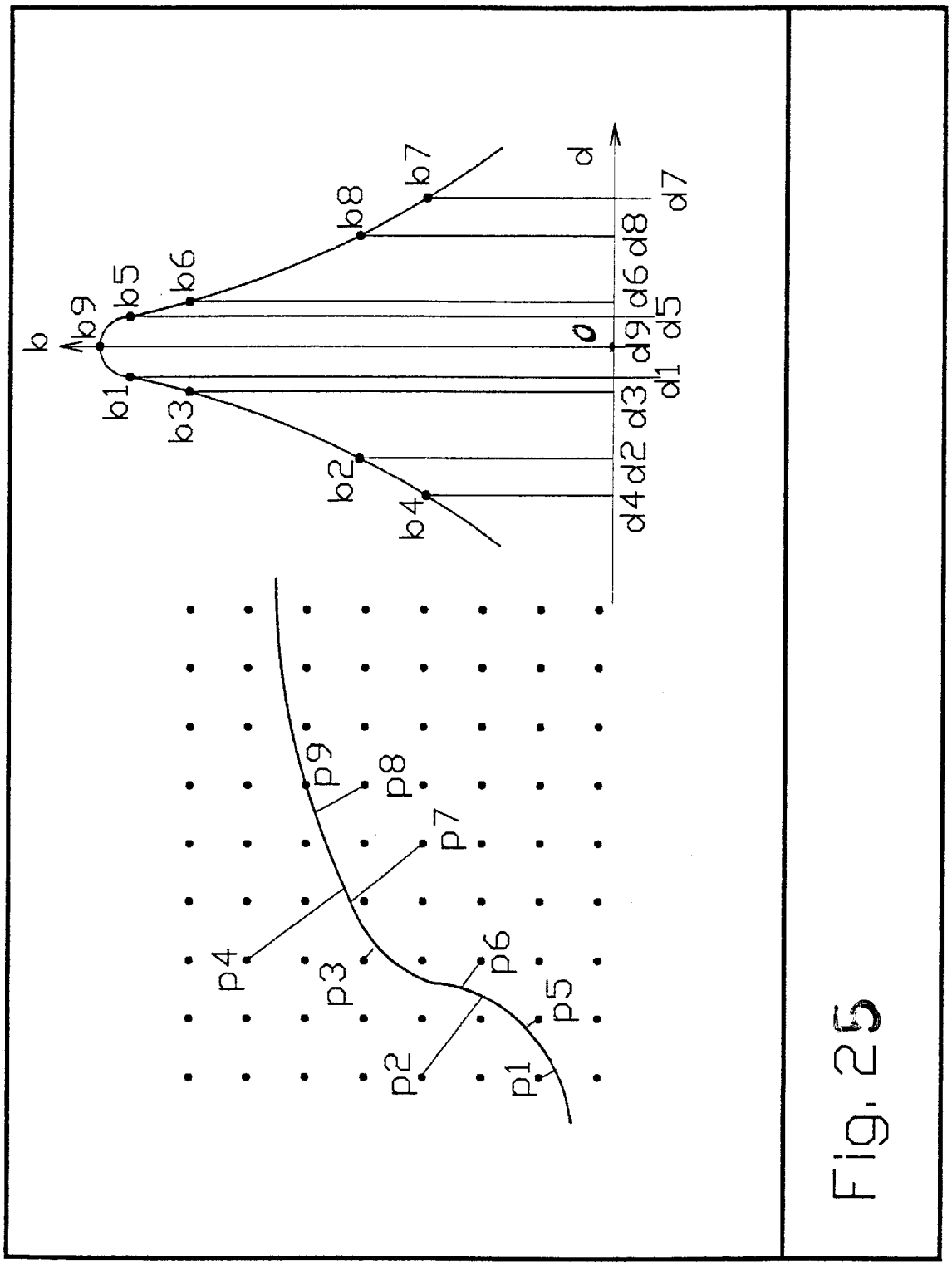
FIG. 25 shows an exemplary plotting of pixels on a cross-section of a characteristic line, according to an aspect of the present invention.

As previously described, a coordinate system consisting of the parameters (d, b) is constructed, in which d is the distance of a point from line l and b is the brightness at that point, indicated at steps 444 and 446. As shown in FIG. 25, each pixel p in the characteristic strip of line l is plotted such that d=d(p) (the distance of the pixel p from the line 1) and b=b(p) (the brightness value of the image at p). FIG. 25 shows the physical positioning of pixels p1 through p9 within the characteristic strip of line l, along with their corresponding distance and brightness coordinates, plotted as d1 to d9 and b1 to b9, respectively. As shown, brightness increases the closer the points are to the line. For example, p9 is located directly on the central line, so graphically point p9 is represented as the maximum brightness b9 on the vertical axis and zero at d9 on the horizontal axis. In an embodiment of the invention, a strip wider than the characteristic strip is plotted because the actual characteristic strip is not known in advance. After plotting the pixels near line l, a dense sample representation of the cross-section of the original characteristic line is obtained.

Figure 24B:
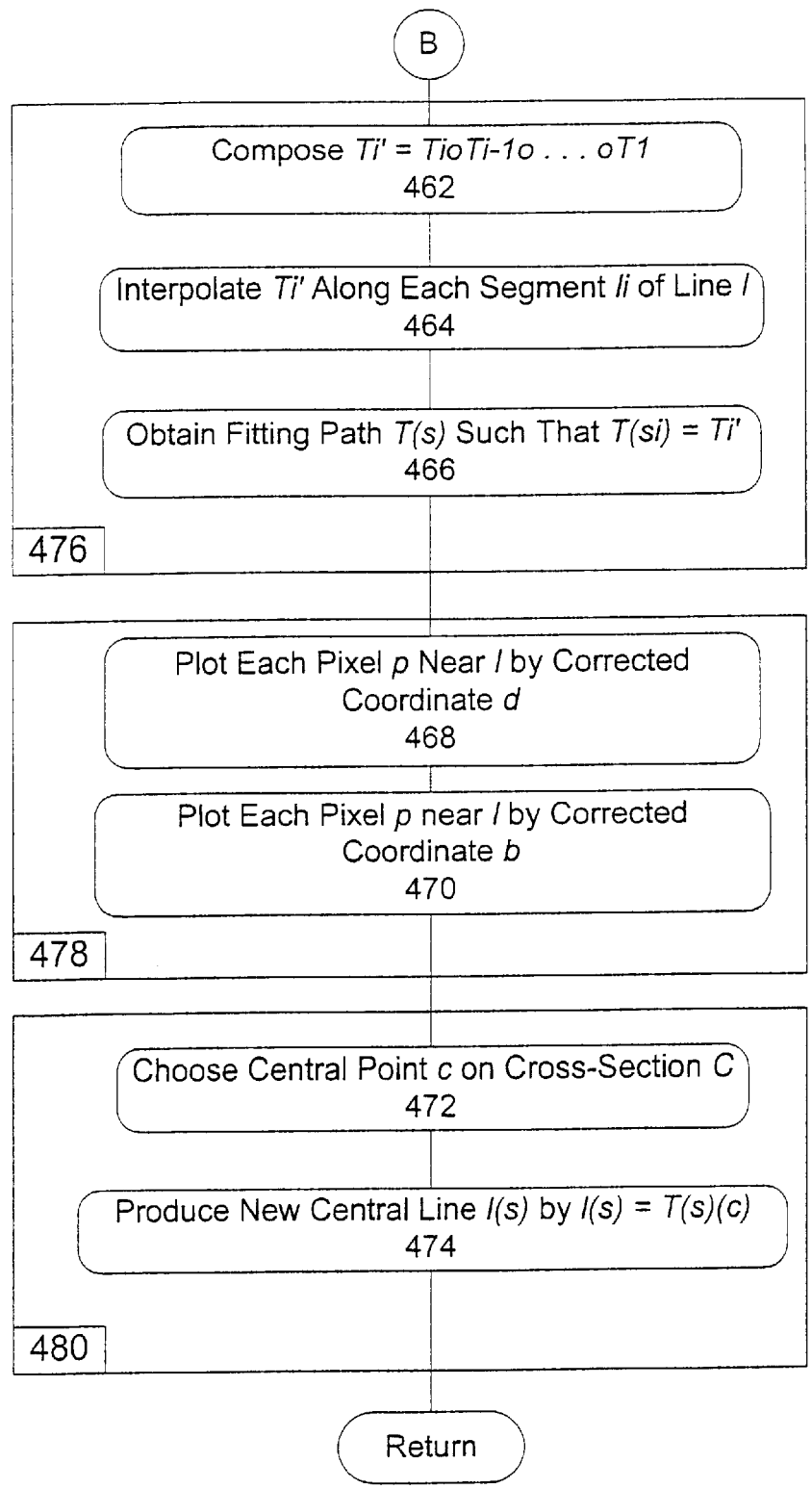

An important feature of the plotting procedure is that its accuracy depends on the direction of the line l with respect to the pixel lines on the image. For example, for a line l parallel to one of the pixel grid directions, the sampling points on the graph (d, b) will be obtained with one pixel step (i.e., the step between sampling points approximately equals in length the distance between neighboring pixels). For a line l positioned at a 45 degree angle with respect to the pixel grid directions, the step is 0.7 pixel. Generally, if line l has a rational slope with respect to pixel lines, the plotting step will be on the order of the inverse of the numerator and the denominator of the slope. Accordingly, when the plotting procedure is applied to a line l, which is almost parallel to one of the pixel grid directions, a preliminary image rotation of 20 to 30 degrees improves the results. Such image rotation can be performed using by standard software, such as "Photoshop," developed by Adobe Systems Incorporated. Alternatively, the sampling grid can be "rotated" by applying a transformation that interpolates the value that would be sampled by an image rotation using multiple pixels for each sample point.

Where the cross-section is assumed not to be constant along the line l, but only preserves its qualitative shape, the general plotting procedure of FIGS. 24a and 24b is implemented. First, the input line l is subdivided into sub-pieces $l_i$, at step 442. In an automatic mode, subdivision into sub-pieces of equal length h is preferable. These sub-pieces must be selected such that the cross-section of line l is approximately constant along each sub-piece $l_i$. This enables implementation of the restricted plotting procedure for each sub-piece $l_i$, at steps 444 and 446. A length h of 4 to 10 pixels satisfies this requirement, for example.

Figure 26:
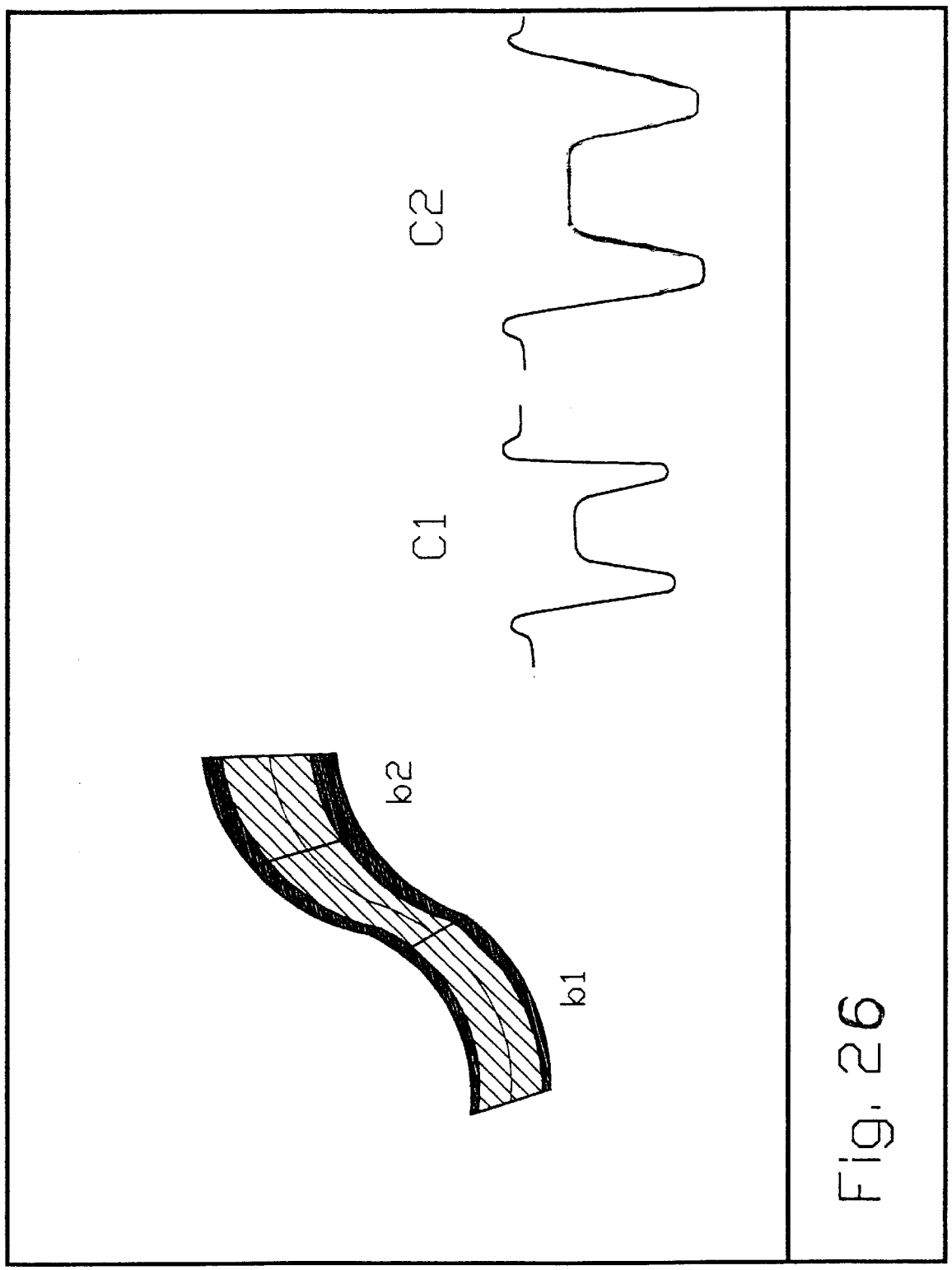
FIG. 26 shows an exemplary fitting transformation and corresponding cross-sections, according to an aspect of the present invention.

Application of the restricted plotting procedure to each sub-piece $l_i$ of l produces an experimental cross-section $C_i$ for each $l_i$. FIG. 26 shows exemplary cross-sections $C_1$ and $C_2$ corresponding to sub-pieces $l_1$ and $l_2$, respectively, as a result of restricted plotting procedure steps.

Next, a cross-section fitting procedure of step 460 is applied to each cross-section couple $C_i$ and $C_{i+1}$. The parameters of a fitting transformation T are considered free variables q. The quadratic difference S(q) of the cross-sections $C_{i+1}$ and $T(q)(C_i)$ is formed at step 450. S(q) is then minimized with respect to the variables q, using any conventional minimization routine, starting with the parameters of the identical transformation, indicated at step 452. Minimization determines the values of the parameters q for which S(q) becomes the smallest possible value. Because the cross-sections $C_i$ and $C_{i+1}$ are usually close to one another, the cross-section fitting procedure can be performed automatically. It produces a fitting transformation $T_i$, such that the cross-section $T_i$ ($C_i$)=$C_{i+1}$, at least approximately. For example, the fitting transformation of the cross-sections $C_1$ and $C_2$ of FIG. 26 consist of stretching the brightness and the distance scale roughly 1.5 times.

Next, the set of fitting transformations $T_i'$ are composed, beginning at step 462. The fitting transformations $T_i'$ transform the first cross-section $C_1$ into the $i^{th}$ cross-section $C_i$, such that $T_i'$ ($C_1$)=$C_i$. In an embodiment of the invention, $T_i'$=$T_i$o$T_{i-1}$o . . . o$T_1$, where o denotes the composition of the transformation, i.e. their performing one after another. Then at step 464, the transformations $T_i'$ are interpolated along each of the segments $l_i$ of the line l. These interpolations may be linear or of a higher order. Thus, a fitting path T(s) is obtained, at step 466, where s is a length parameter on the line l, such that $T(s_i)$=$T_i$. Each parameter $s_i$ is the common end point of $l_i$ and $l_{i+1}$.

Figure 27:
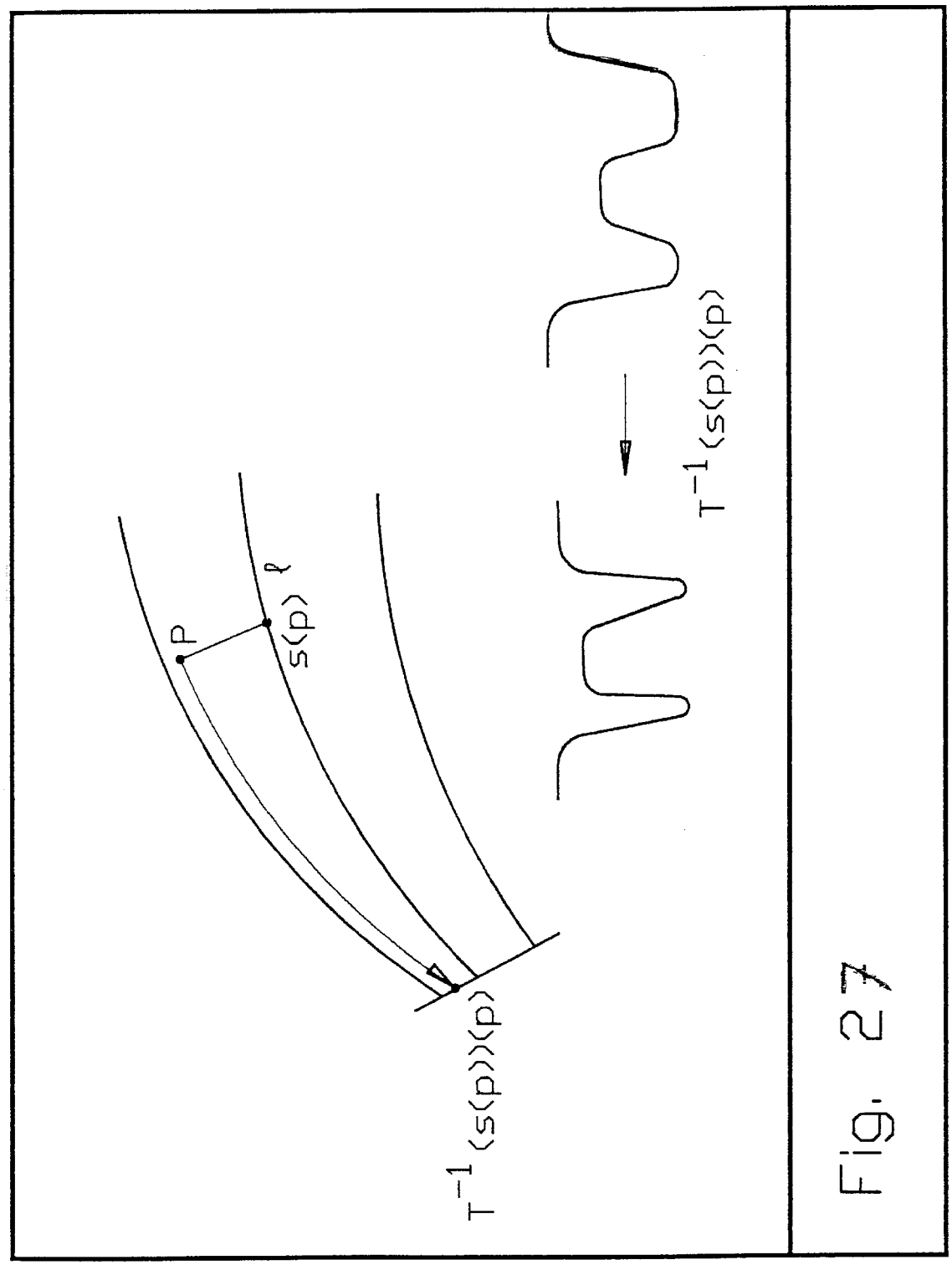
FIG. 27 shows an exemplary geometric fitting transformation and an orthogonal projection of pixels onto a central line, according to an aspect of the present invention.

Next, the pixels corrected for the fitting path T(s) are plotted, indicated at step 478. All pixels near the line Q are plotted in the (d, b) coordinates, with correction provided by the fitting path T(s). At step 468, each pixel p near line l is plotted by the coordinate d, where d equals the pre-image distance under $T_g$ (s(p)) of d(p). Similarly, at step 470, each p is plotted by the coordinate b equal to the pre-image brightness under $T_b$ (s(p)) of b(p). $T_g$ and $T_b$ are the geometric and the brightness components of the transformation T, discussed above, and s(p) is the orthogonal projection of the pixel p onto the line l, as shown by FIG. 27. In other words, the inverse transformation of T(s(p)), which represents the transformation T(s) at s=s(p), is applied to each pixel p to compensate for the distortion of the cross-section along the line l. An accurate and smooth experimental cross-section curve is thereby produced. It should be noted that "plotting" does not require generation of an image. The plotting may be done into a buffer 14 of FIG. 39.

If the plotting procedure results in a distorted experimental curve with a large variance, the algorithm indicates this fact. In other words, a unique cross-section does not exist for the input line l, so l cannot be interpreted as a uniform characteristic line. The process must then be repeated using an alternative input curve (line) l.

If necessary, the accuracy of the general plotting procedure can be enhanced by performing an additional step. In particular, the parameters of the fitting path T(s) are considered as free variables. For each choice q of these parameters, a new fitting path $T_q$ (s) is obtained. The pixels p are then plotted, as described above and indicated in steps 468 and 470, using $T_q$(s) instead of T(s). As a result, an experimental plotted section C(q) is obtained. At this stage a function is constructed, which measures the "incoherence" of the plotted section obtained. Incoherence is the distortion in plotting different segments of curve l caused by incorrect identification of the fitting path. For example, in one embodiment, the measure of incoherence is the function S'(q), which is the sum of squares of the differences between neighboring plotted values of the brightness for the plotted section C(q).

Then, a minimization of the function S'(q) is performed with respect to the parameters q of the fitting path. The fitting path T(s), as described above and indicated in steps 462–466, is the starting point of the minimization. Because T(s) usually provides a good approximation to the actual fitting path, this minimization procedure converges and provides a new fitting transformation $T_0$(s). Again, the pixels p are plotted, as indicated in steps 468 and 470, using $T_0$(s) instead of T(s), to get an improved experimental cross-section C0.

The final step in the general plotting procedure is correcting the central line, step 480. As a byproduct of the general plotting procedure, the input line l can be replaced by a much more accurate approximation of the actual central line of the characteristic line originally considered. If the input line l is a reasonably good approximation of the central line of a uniform characteristic line on the image, then an experimental cross-section C and a fitting path T(s) are obtained. Otherwise the plotting procedure indicates a failure and a new input line l must be entered.

To correct the central line, a central point c must be chosen on the cross-section C, indicated at step 472. In one embodiment, the point c is the center of the width interval of C. Alternative embodiments include the central point c being the baricenter of the graph of C or any other representative point. At step 474, a new central line l(s) is produced by the formula l(s)=T (s)(c). More precisely, l(s) is the point on the segment orthogonal to input line l at l (s), obtained by the geometric transformation $T_g$ (s), applied to the chosen central point c.

Figure 28:
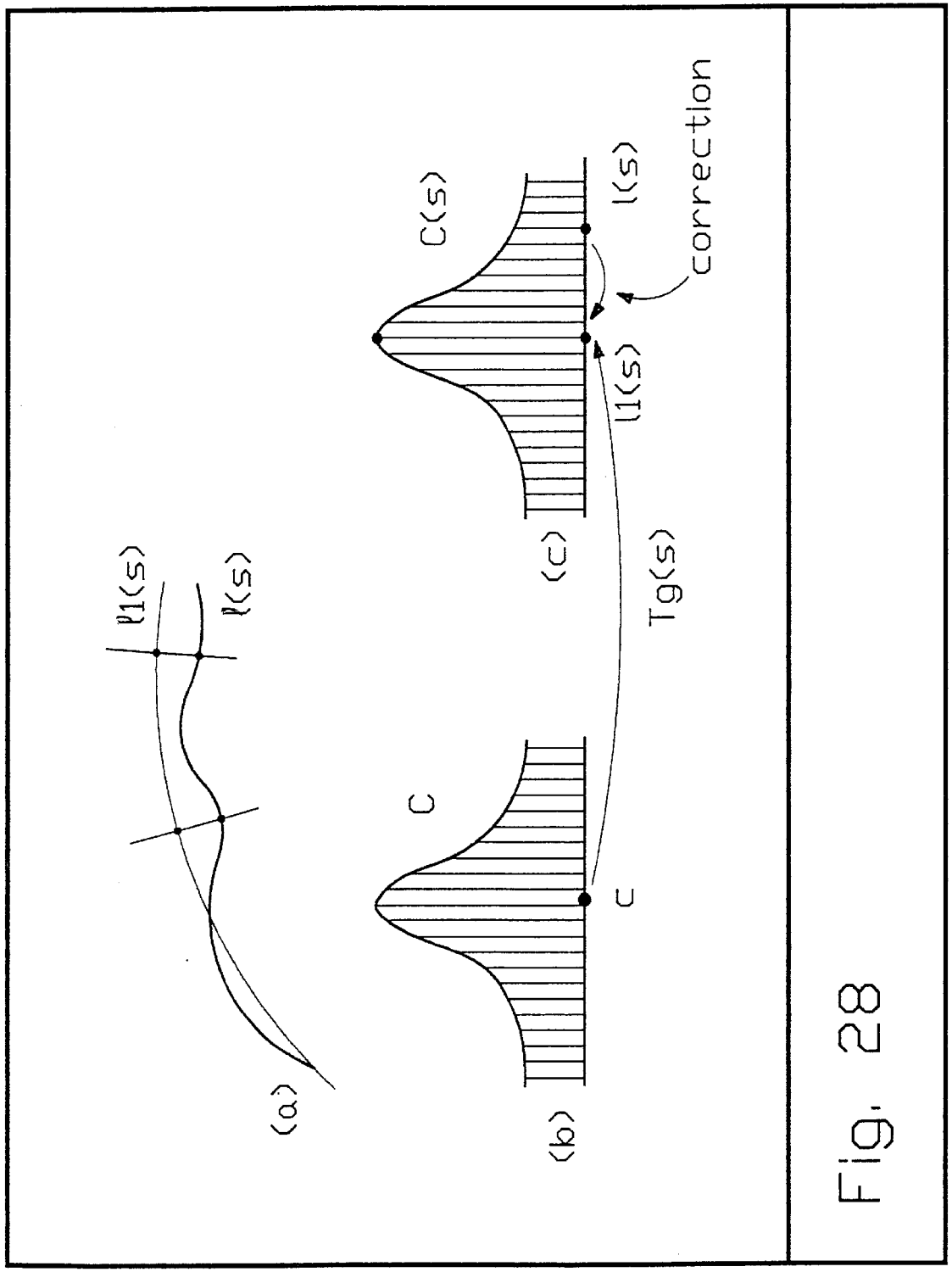
FIG. 28 shows an exemplary correction of central lines, according to an aspect of the present invention.

FIG. 28 shows graphically the process of obtaining central point c, and line l(s) and correcting the central line. FIG. 28(a) indicates by a solid line the original center line l(s) determined according to the general plotting procedure. The dashed line represents the corrected center line $l_1$(s). FIG. 28(b) shows the selected point c on cross-section C, representing generally the central point of that cross-section. Geometric transformation $T_g$ provides the corrected cross-section C(s), as well as the corrected central line $l_1$(s), indicated in FIG. 28(c). Ultimately, T(s)(c) defines for any s an actual center of the cross-section C(s), corresponding to the chosen point c on C, because T(s) compensates for shifts in the position of l(s) on the cross-sections C(s).

The general plotting procedure provides numerous advantages over the prior art. For example, because the plotting procedure provides actual, empirical cross-sections of characteristic lines on the image, the general plotting procedure can be used for tuning and calibration of the sensors that produce the image. Second, it can efficiently enable pattern detection, since an actual cross-section (as opposed to an approximated cross-section) of a pattern boundary provides the accuracy needed for medical, industrial and other image applications. In particular, the empirically obtained cross-section is compared with a database of "model" cross-sections for visual inspection, image analysis and testing.

Non-uniform characteristic lines may also be identified or "captured" automatically. To do so, the scale of the overall image is reduced, shown in FIG. 29. Complicated characteristic lines (both uniform and non-uniform) are simplified on lower resolution representations of the same image. Ultimately, after "zooming out" from an image sufficiently (i.e., reducing the scale), most of the characteristic lines become edges or ridges. Therefore, multi-scale identification usually detects the same uniform characteristic lines detected in previous steps, as well as non-uniform characteristic lines that developed uniform characteristics at the reduced scale.

Figure 29:
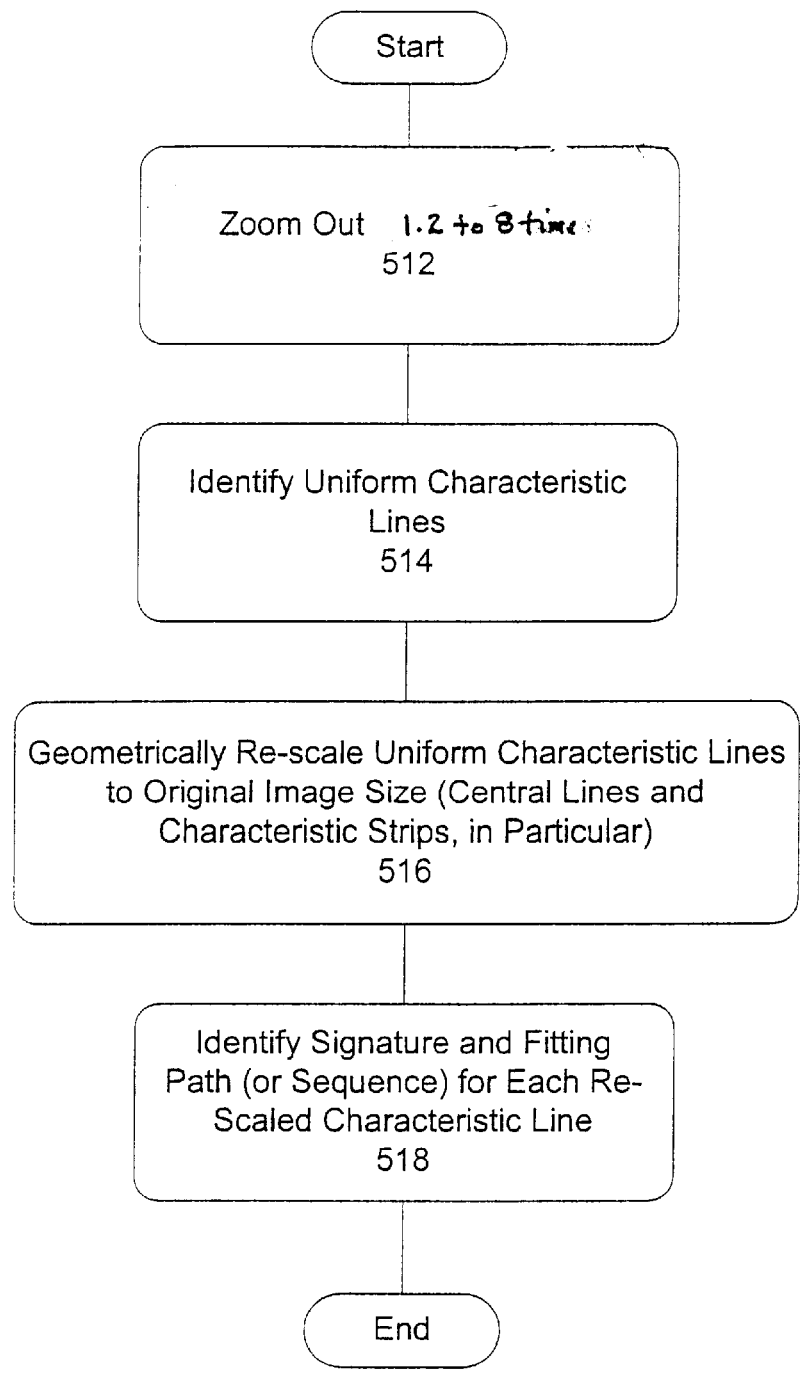
FIG. 29 is a flow chart illustrating the multi-scale identification procedure, according to an aspect of the present invention.

FIG. 29 shows the multi-scale identification process for characteristic lines. First, at step 512, the original image is zoomed-out 1.2 to 8.0 times. Usually, a 1:4 zoom-out is sufficient for creating edges and ridges of the majority of characteristic lines. The uniform characteristic lines are identified on each of the smaller scales, at step 514. Next, these lines and, in particular, their respective central lines and characteristic strips, are geometrically re-scaled to the original image size, at step 516. For each of the resulting lines, identification of the signature and of the fitting path is performed, at step 518, as described above.

The multi-scale procedure of FIG. 29 in most cases accurately identifies the central line and the characteristic strip of both uniform and non-uniform characteristic lines. For the uniform characteristic lines, application of the automatic plotting procedure described above produces an accurate representation of the line. However, for non-uniform characteristic lines, even after identification of their central line and characteristic strip, automatic recognition of the signature and fitting path remains to be performed. This information is obtained by execution of the high level procedure, described in the reference to FIG. 30, below.

Figure 30:
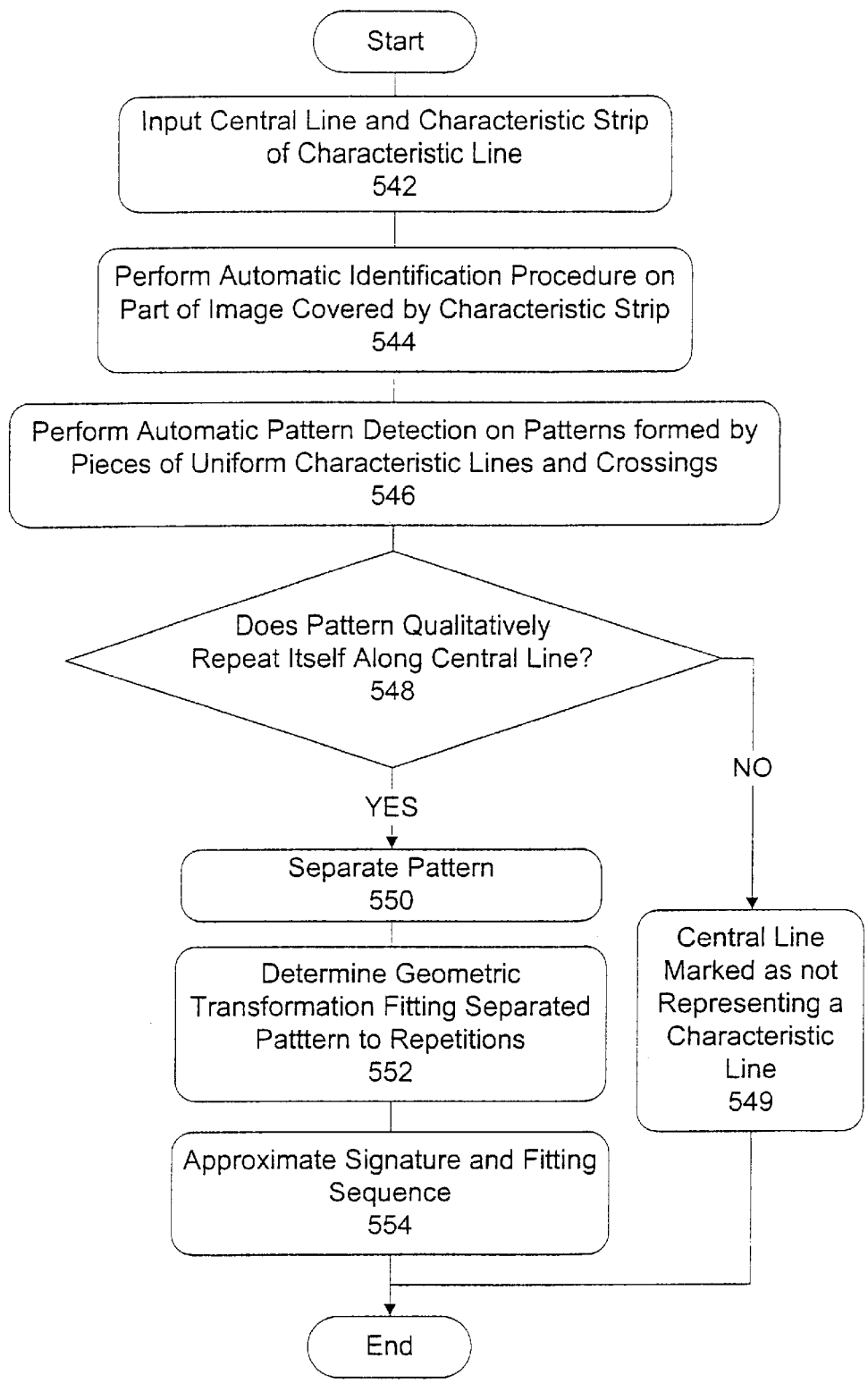
FIG. 30 is a flow chart illustrating the high level procedure, according to an aspect of the present invention.
Figure 31:
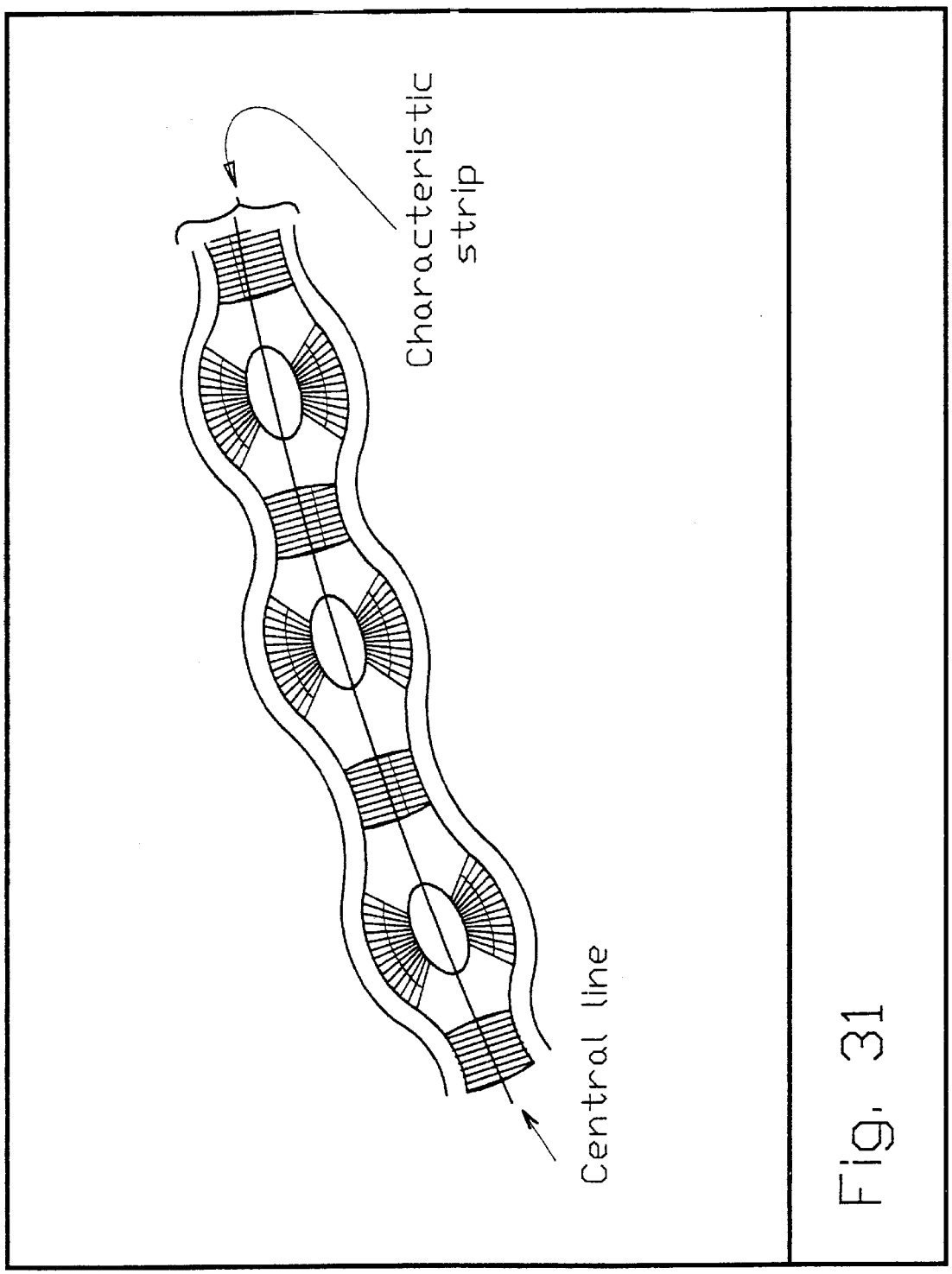
FIG. 31 shows a central line and characteristic strip corresponding to an exemplary characteristic line, composed of pieces of uniform characteristic lines, according to an aspect of the present invention.

As indicated in FIG. 30, the high level procedure input consists of the central line and the characteristic strip of the characteristic line being processed, at step 542. This input can be produced, for example, by the multi-scale procedure above. In the first stage, the automatic identification procedure of FIG. 13 is performed from steps 200 through 400 on the part of the image covered by the characteristic strip, in order to identify different pieces of uniform characteristic lines joined along their crossings. The characteristic strip is then represented, for example, as indicated in FIG. 31.

Figure 32:
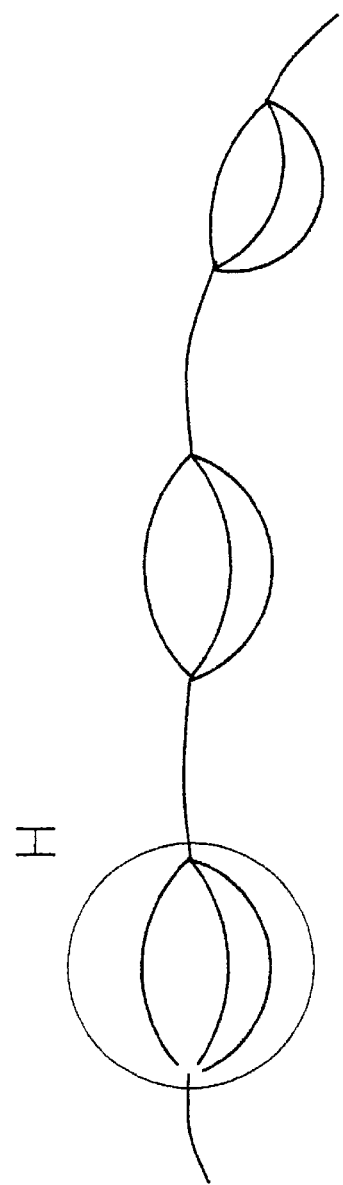
FIG. 32 shows an exemplary graph H corresponding to the non-uniform characteristic line shown in FIG. 8., according to an aspect of the present invention.

Next, "automatic pattern detection" is performed on the patterns formed by these uniform pieces of characteristic lines and their crossings, shown at step 546 in FIG. 30, in order to find patterns that qualitatively repeat along the central lines. To detect a particular repeating pattern, a "pattern graph" H may be formed, such that each uniform line is represented by an edge and each crossing is represented by a vertex in the graph. Also, the type of uniform line (i.e., the number of external points in its cross-section) is indicated on the corresponding edge in the graph H. FIG. 32 shows an exemplary graph H corresponding to the non-uniform characteristic line shown in FIG. 8. As indicated in FIG. 32, a sub-graph H' is formed on graph H, using conventional tools of computational graph theory, which likewise repeats itself along the central line. If a sub-graph H' exists, an image pattern is formed, represented by all the uniform characteristic lines and their crossings, appearing in H'. In an embodiment, graph H' is matched to its repetitions in H along the central line, again using conventional tools. This matching process approximates the respective fitting transformations.

Whether a certain pattern qualitatively repeats itself along the central line is shown at (decision diamond) step 548 in FIG. 30. If not, the selected central line is identified as not being representative of a characteristic line, indicated at step 549. If so, the pattern is separated at step 550. The geometric fitting transformation is then determined, which fits the separated pattern of step 550 to its repetitions at step 552. This produces the approximate signature and fitting sequence, step 554. If necessary, the minimization procedure is applied to the transformations of the signature detected onto the repetitions of the detected signature, to obtain a better approximation of the fitting sequence.

All of the foregoing procedures have been described, in terms of automatic implementation. In an alternative embodiment of the invention, the characteristic lines are identified interactively by the user (i.e., using a combination of manual and automatic identification via a computing device). In the interactive mode, the user examines the original image and visually identifies the characteristic lines along which the brightness (or the color) patterns of the image are consistently repeated. The user marks these lines using conventional editing tools, such as "Director," developed by Adobe Systems Incorporated, and "Flash," developed by Macromedia, Inc. Next, the user identifies the central line and the characteristic strip corresponding to each of the detected lines in the same fashion. These elements are likewise marked manually.

Figure 33:
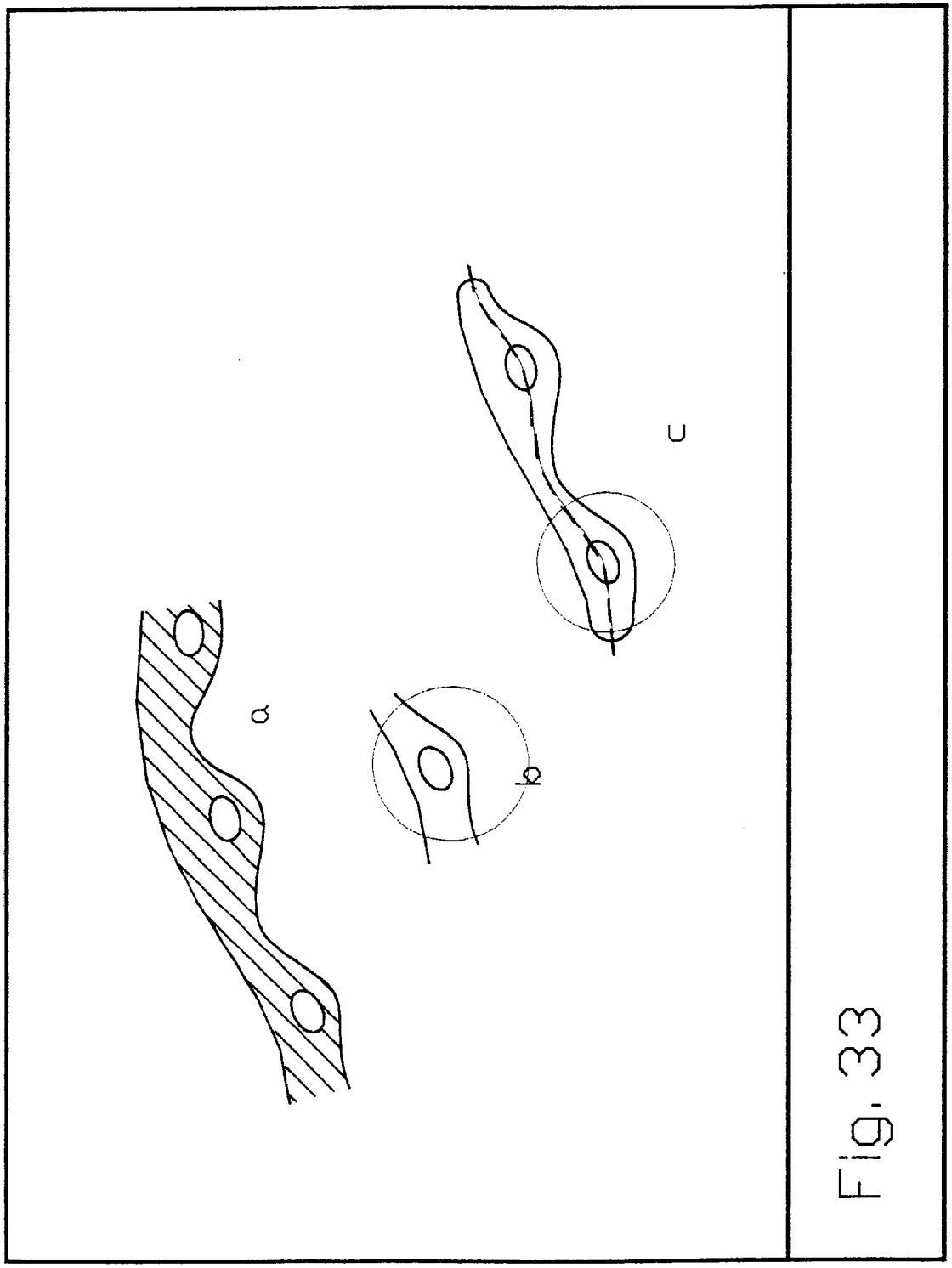
FIG. 33 shows marking of an exemplary characteristic line, according to an aspect of the present invention.

In an embodiment of the invention, the user simplifies this operation using a computer interface. For example, the user simultaneously marks the characteristic line, together with its characteristic strip, using a thick, colored line of a variable width, as shown in FIG. 33(a). The corresponding signature, which is an image pattern that repeats itself along the characteristic line, is marked as a colored patch, as shown in FIG. 33(b).

In an alternative embodiment, the computer interface is based on line contours, as opposed to thick colored lines. The characteristic line is marked by its central line and the corresponding characteristic strip is marked with a line contour bounding the characteristic strip, as shown in FIG. 33(c). The user then marks the signature by a line contour of a different color, in the same manner. The central line should match the visual shape and curve of the corresponding characteristic line as accurately as possible to enhance image processing. Simultaneously, though, the central lines should be as simple and "smooth" as possible. Further correction of central lines can be accomplished automatically as a part of the general plotting procedure, shown in FIGS. 24a and 24b and described above, which can be combined with the interactive identification procedure.

Next, the signatures and fitting sequences of non-uniform characteristic lines are identified. The user first manually marks a signature of the characteristic line, as an apparently representative and possibly small pattern, which repeats itself along the line. The line l is then interactively subdivided into sub-pieces $l_i$, along which the chosen signature apparently repeats itself. A morphing transformation $T_{gi}$ which approximately fits the signature onto the image pattern of the characteristic line along each $l_i$ is interactively identified. A conventional morphing (e.g., a distortion tool such as a mesh warp) interface is used, such as "Photoshop," developed by Adobe Systems Incorporated. The efficiency of this step can be improved by interactively minimizing the mean square deviation of the pattern along $l_i$ and the transformed signature. The brightness fitting transformation $T_{bi}$ is likewise found interactively, using conventional brightness interfaces. For brightness as well, minimizing the mean square deviation of the pattern along $l_i$ and the transformed signature can improve the accuracy of the approximation.

The parameters of $T_{gi}$ and $T_{bi}$ are automatically corrected (i.e., tentatively or otherwise according to a conventional minimizing algorithm) in order to provide the minimum quadratic distortion of the pattern along $l_i$ and the transformed signature. If the original approximation $T_i$ is sufficiently accurate, the automatic minimization converges and provides a very accurate representation of the fitting sequence. Finally, the line segments $T(l_1)$, as opposed to $l_i$, provide a much more accurate representation of the central line.

Some steps of this process can be performed completely automatically. For example, if a characteristics line contains uniform parts, the cross-sections and fitting transformations of these uniform parts can be found by an automatic procedure for uniform lines, as described above. In particular, the plotting procedure can be applied to each uniform part of a characteristic line, producing each uniform part's accurate experimental cross-section and corrected central line.

An additional aspect of each characteristic line, regardless of whether the characteristic line is defined automatically or interactively, is the "transition area" or "margin" in which the transition between the characteristic line patterns and the background occurs. A margin is generally a thin band around the exterior boundary of the characteristic strip, as shown in FIG. 34(a). A typical margin width is between 1 to 8 pixels. Any other characteristic line within the margin width is perceived as adjacent and therefore forms a new aggregated characteristic line. In contrast, the margins of two characteristic lines in proximity do not ordinarily overlap. This restricts the margin width to valves between the minimum threshold valve of adjacency and half the valve of the threshold of proximity.

For mathematical models representation of characteristic lines, discussed below, margins play an additional role. The margins permit the "gluing" of the characteristic line mathematical models to an image background model. After the margins of uniform characteristic lines and their respective cross-sections are obtained, the brightness values for the margins are likewise obtained, either from the margin values of the detected edges and ridges or by sampling the actual brightness values of the image at corresponding cross-section points. Finally, the margins of the spline approximations of the cross-sections are represented by separate spline segments, the separate spline segments being mostly constant. Because non-uniform characteristic lines are usually represented as aggregations of uniform characteristic lines, the margins for the non-uniform characteristic lines are generally determined in the same manner.

Figure 34:
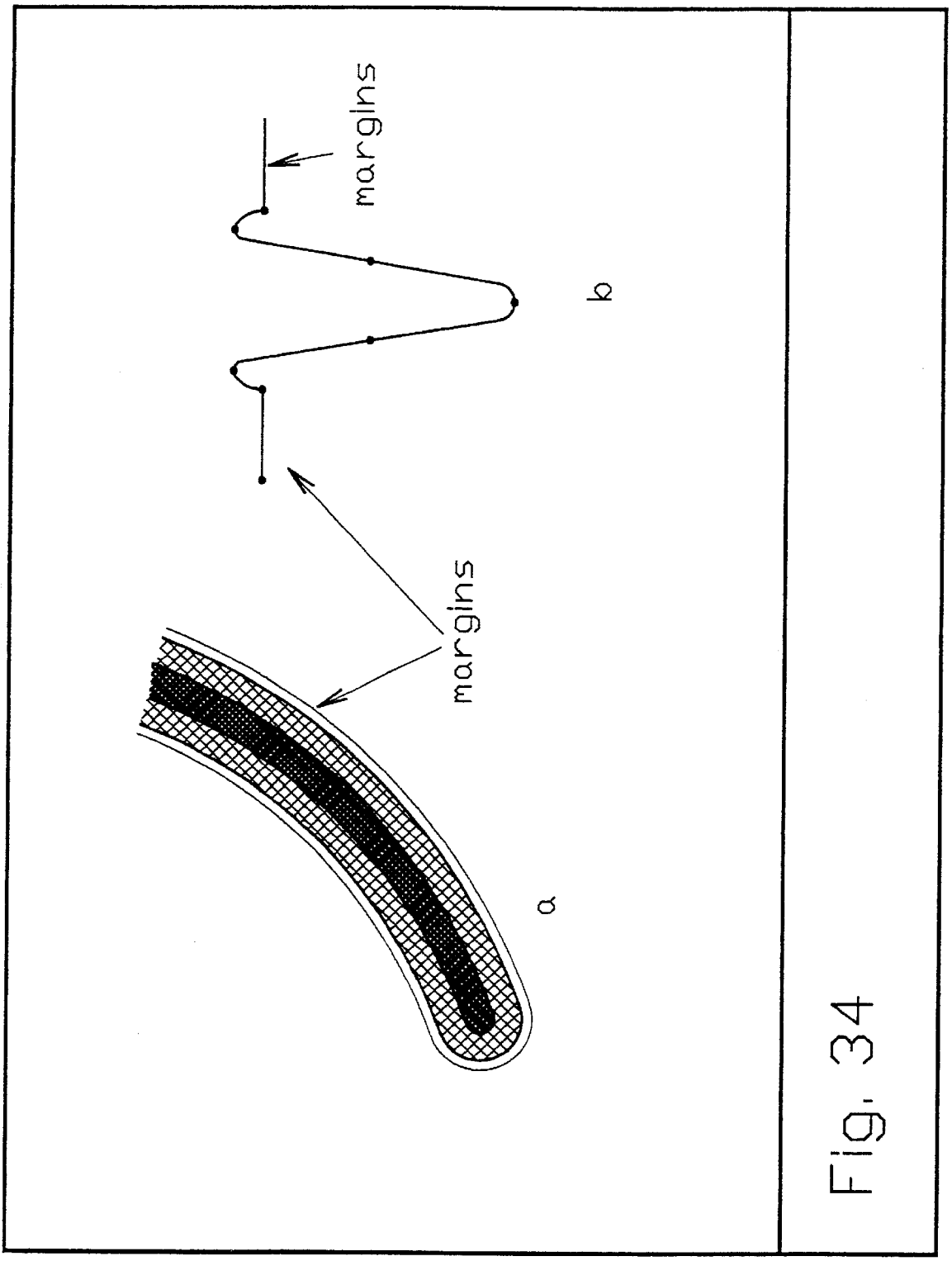
FIG. 34 shows exemplary margins of a characteristic line, and the corresponding cross-section, according to an aspect of the present invention.

The cross-section of a typical margin is shown in FIG. 34. FIG. 34(a) shows a segment of a characteristic strip with the margin outlined by the dashed line. A cross-section of the same characteristic strip is graphically depicted in FIG. 34(b). The brightness values of the margins are indicated at opposing ends of the cross-section.

In addition to margins, the "end areas" of characteristic lines should be captured and approximated. An end area is defined generally as that area of an image in close proximity to the ends of a central line. To capture an end area, an additional analysis is performed. In the interactive mode, end patterns of characteristic lines are visually identified and marked, as described above. In the automatic mode, the described edge and ridge detection algorithms inherently produce endpoints of each of the edge and ridge detected, so the end area is obtained thereby.

Figure 35:
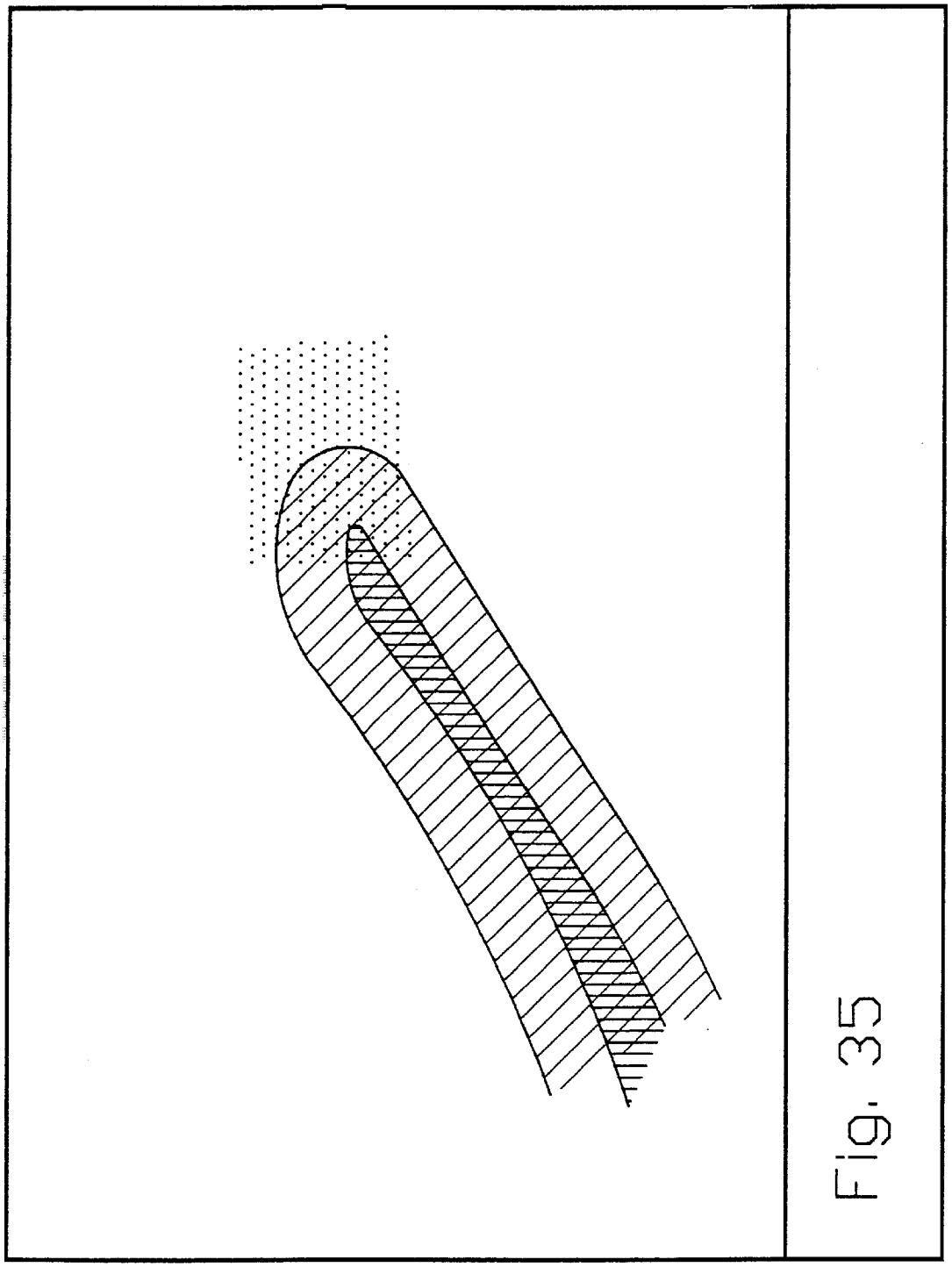
FIG. 35 shows an exemplary end boundary of a characteristic line, according to an aspect of the present invention.

To improve the accuracy of this basic end identification, additional steps are performed in an embodiment of the invention. First, Gaussian convolution is performed on the image in the neighborhood of the subject end point. This process convolutes the image with a Gaussian shaped matrix. The convoluted image is interpolated to a finer sub-pixel grid, such as ½ or ¼ of a pixel. Then, a boundary line is determined near the end point by fixing a threshold for the Gaussian convolution result. This threshold is fixed so that the sub-pixel boundary line fits the boundary line of the original characteristic line beyond the end area. FIG. 35 depicts the new sub-pixel boundary. FIG. 35 shows the end of a characteristic line, along with the corresponding central line and characteristic strip, on a sub-pixel grid. If necessary, a spline approximation of the new boundary line is constructed, which likewise is applied in the multi-scale algorithm for identification of characteristic lines.

Figure 36:
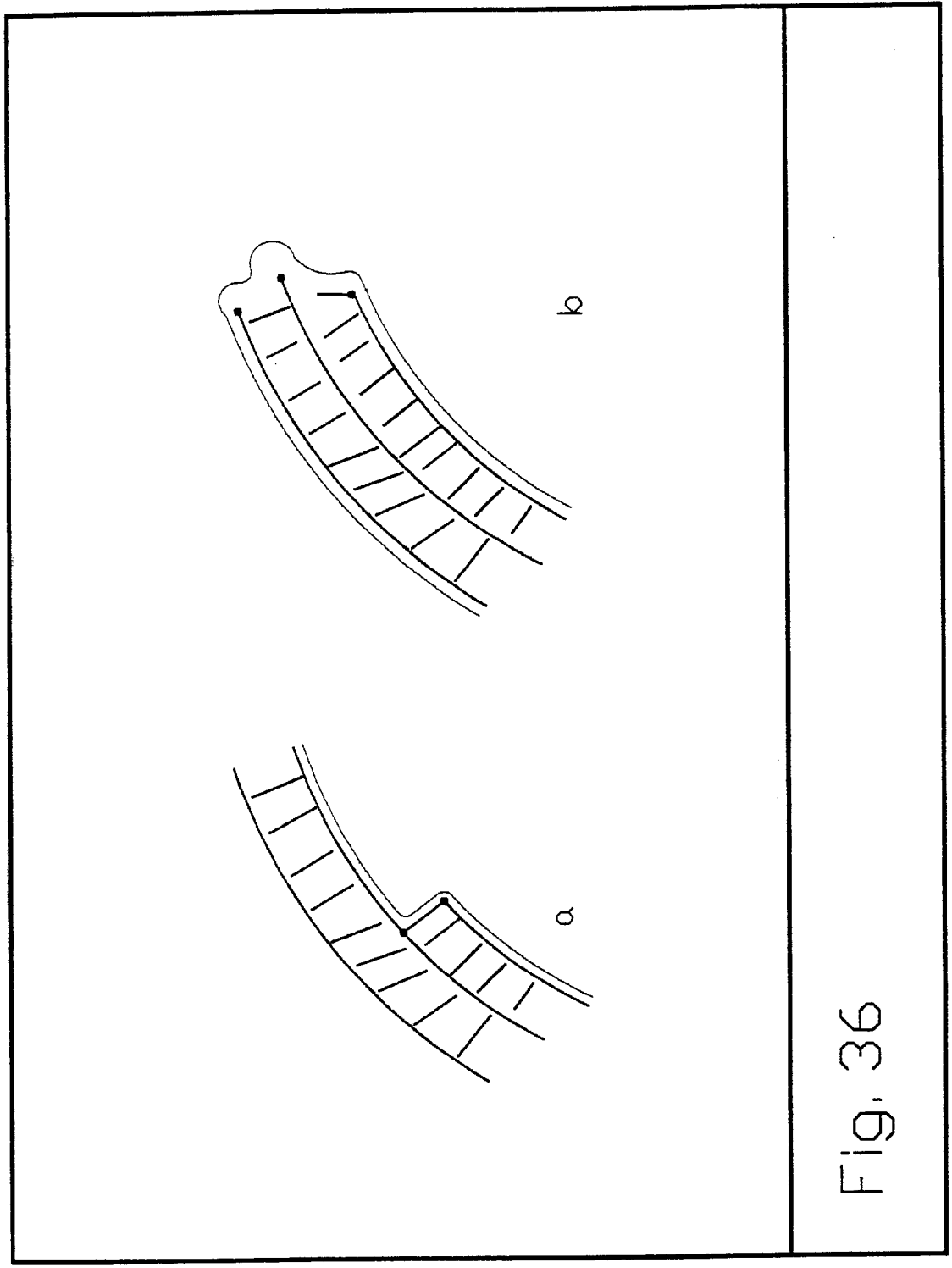
FIG. 36 shows exemplary end points and boundary lines of a characteristic line, according to an aspect of the present invention.

The automatic identification procedure of FIG. 13 produces an endpoint having a certain adjacency interval as one of the adjacent edges or ridge ends, as depicted in FIG. 36(a). If all the edges and ridges, which form an aggregated characteristic line, end within a certain common area (usually the size of several pixels), their respective boundary lines can be combined to form a single boundary line of the end area of the aggregated characteristic line, shown in FIG. 36(b).

Figure 37:
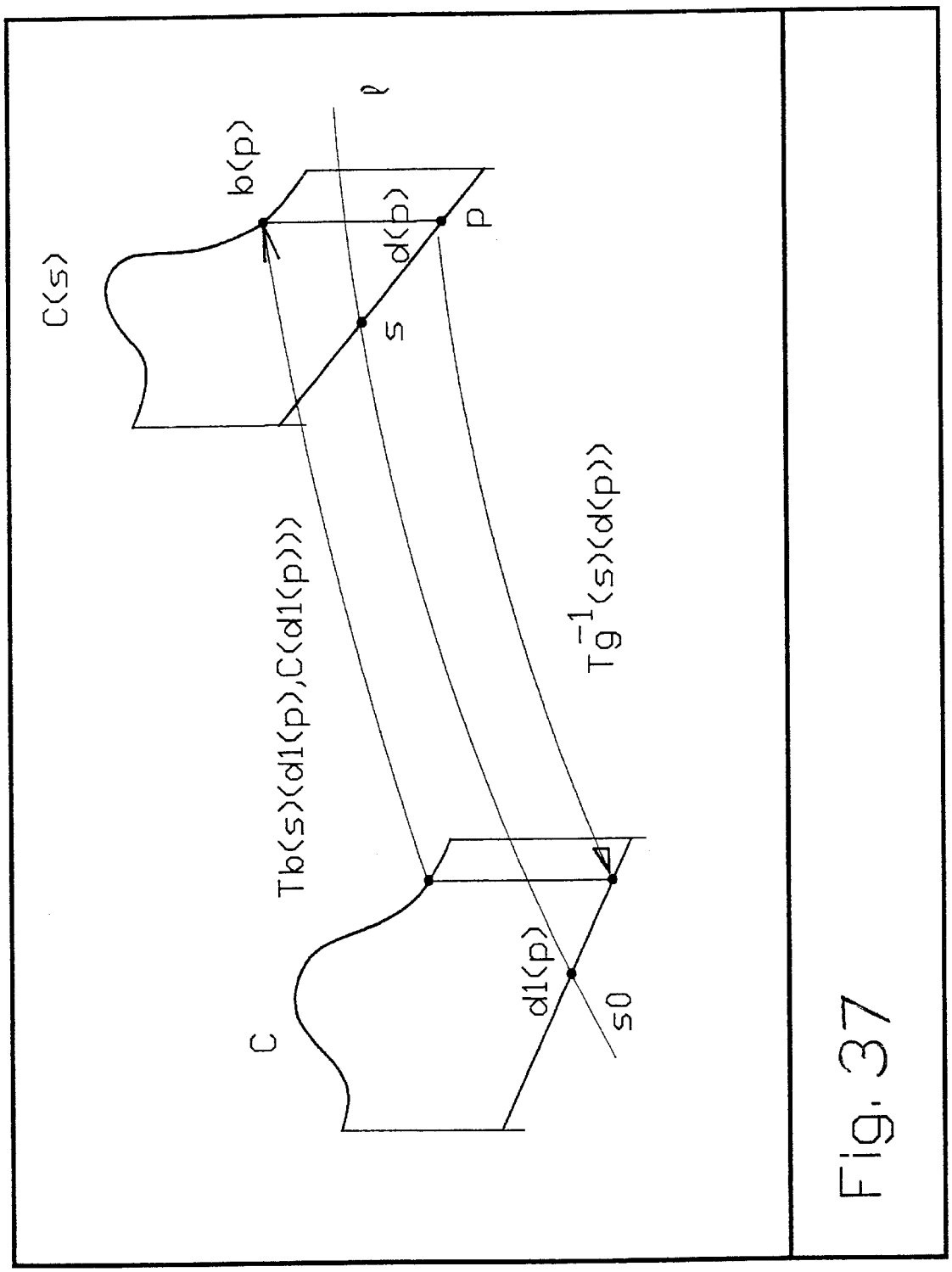
FIG. 37 is a graphical depiction of a mathematical formula for determining brightness value, according to an aspect of the present invention.

Once all of the parameters of the characteristic lines have been identified, automatically or interactively, the characteristic lines are approximated by mathematical models. With respect to uniform characteristic lines, each characteristic line has been completely captured by its central line l, its cross-section C and its fitting path T(s). This data enables reconstruction of the brightness value at each pixel inside the corresponding characteristic strip. In particular, the brightness of pixel p is given by the following formula (1):

$$b(p)=T_b(s)(d1(p),C(d1(p))),$$

where $d1(p)=T_g^{-1}(s)(d(p))$ and $d(p)$ is the distance of pixel p from the central line l. FIG. 37 graphically depicts this mathematical relationship. $T_b(s)$ and $T_g^{-1}(s)$ are the brightness and the (inverse of the) geometric components of fitting path T(s), respectively. Since the models are independent of scale, reproduction of an image is conceivably performed at any image size.

Figure 38:
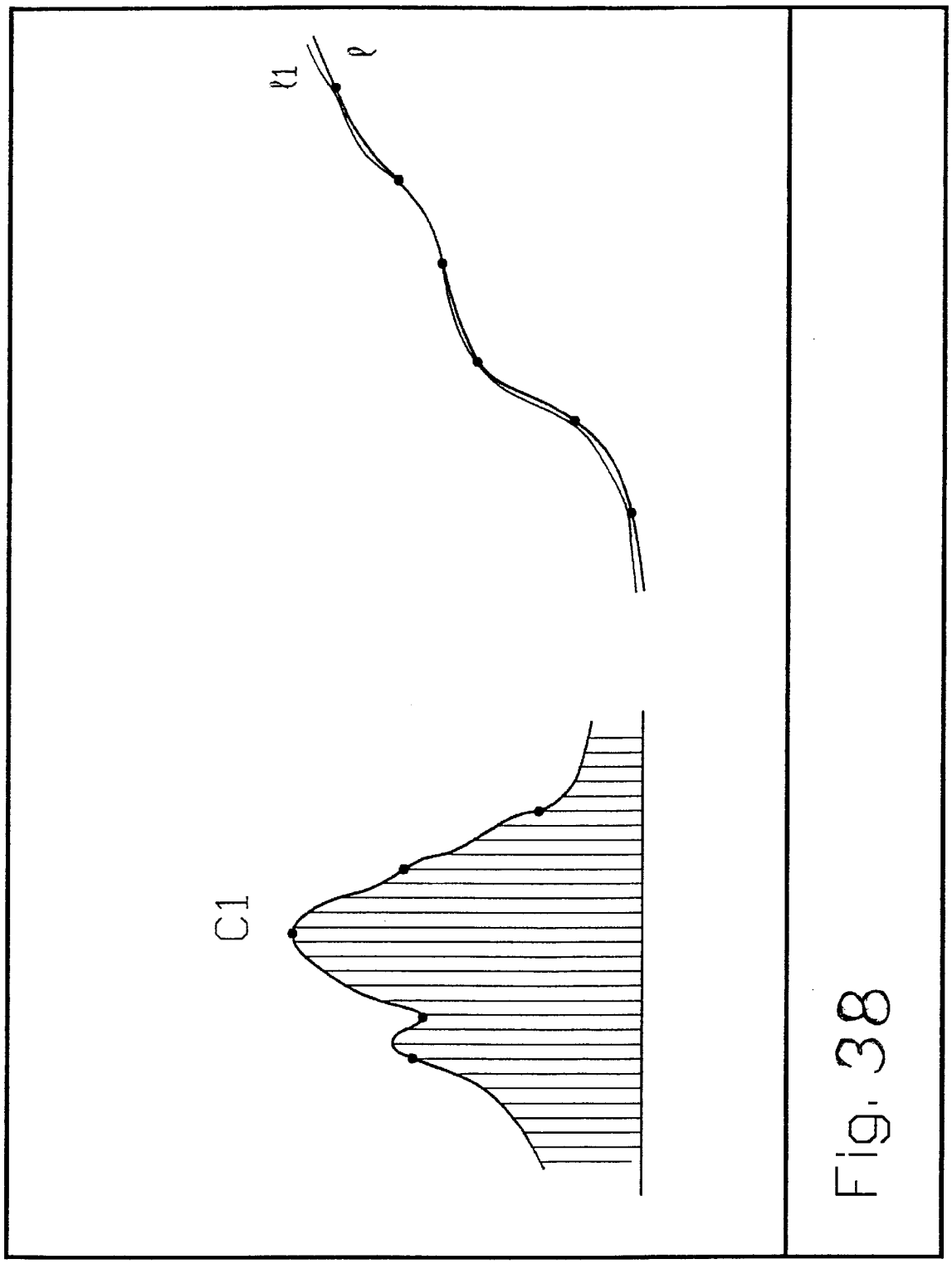
FIG. 38 shows spline curves for central line and cross-section of an exemplary characteristic line, according to an aspect of the present invention

Therefore, to construct a mathematical model approximating a uniform characteristic line, it is sufficient to approximate, by mathematical models, each of the salient elements corresponding to that line, i.e., the central line l, the cross-section C and the fitting path T(s). Second or third order splines suffice for these approximations. The cross-section C and the central line l are depicted in FIG. 38. The image on the left in FIG. 38 shows an exemplary spline approximation C1 of the cross-section C (obtained by a plotting procedure). The image on the right indicates a spline approximation l1 of the central line l.

Next, the transformations T(s) of the cross-section C must be represented. These transformations are specified by several parameters, described above. Each of these parameters is approximated along central line l by a spline curve. Therefore, a spline-approximation $T_1(s)$ of the fitting path T(s) is obtained. Usually, the control points of the splines for each of the parameters of T along central line l are chosen to be the same. In particular, these parameters can be sampled at certain points si on central line l and then interpolated between si.

The variables $l_1$, $C_1$ and $T_1$ now form the mathematical model approximating the original characteristic line. Reconstruction of the brightness values of each pixel in the characteristic strip is provided by the same relationship in formula (1), set forth above, with l, C and T being replaced by $l_1$, $C_1$, $T_1$, respectively. In an alternative embodiment, an equivalent way of constructing a mathematical model of a uniform characteristic line is to use cross-sections C(s) of each point s along the central line l, as opposed to the cross-section C1 and fit ting path T(s). The parameters of C(s) are stored in spline form with the same control points si, as described above.

Non-uniform characteristic lines are primarily identified as aggregated pieces of uniform characteristic lines. Therefore, the approximating mathematical models of non-uniform characteristic lines are obtained by aggregating the models representing each of these uniform characteristic lines. In an embodiment of the invention, this aggregation begins by constructing a model approximation $S_1$ of the signature S of the non-uniform characteristic line, using a combination of models for the pieces of uniform characteristic lines. A spline approximation $l_1$ of the central line l is then constructed. An approximation $T_{li}$ for each of the transformations $T_i$ in the fitting sequence is also constructed. This is done using a conventional method, such as incorporation of a triangular mesh. The resulting $l_1$, $S_1$ and $T_{li}$ form the model representing the original non-uniform characteristic line.

The reconstruction of brightness values at each pixel in the non-uniform characteristic line is given by the following formula (2):

$$b(p) = T_{1bi}(p, S_1(p)),$$

where $p = T_{lgi}^{-1}(p)$, for pixel p belonging to the domain of $i^{th}$ repetition of the signature. In an alternative embodiment, a bitmap BS of the signature, or its approximation by a certain compression method, is used in the model instead of $S_1$.

The generated center lines, cross sections, signatures, transformations, fitting paths, fitting sequences, graphs and the like are encoded individually and as groups, sets, and/or models into a readable and writable digital file format. A computer programmer of ordinary skill will recognize how to form the digital file format, and the organization thereof is non-critical. The file format may be in any decodable format, such as a coded text format (e.g., similar to the manner of encoding of a PostScript vector file), or a binary format for more compact encoding. The characteristic uniform and non-uniform lines may also be encoded into a file format that includes other kinds of models that represent image features that are best represented by means other than characteristic lines. In specialized applications, the file format may be replaced by a streaming or transmittable bit stream format.

The file format is readable by an imaging decoder, which may take the form of a stand-alone program, a "plug-in" for an image interpreting program (such as a PhotoShop plug-in), a "codec" for an image displaying program (such as Quicktime or Windows Media Player), a Dynamic Link Library, a programmed or programmable gate array, or other known means of interpreting and reassembling encoded image information for display or analysis. The file format is also readable by an analysis decoder, which may take similar forms to those above, but which reconstructs the image in memory or in an interpreted form that is not an image (histograms, vector representations, etc.).

Figure 39:
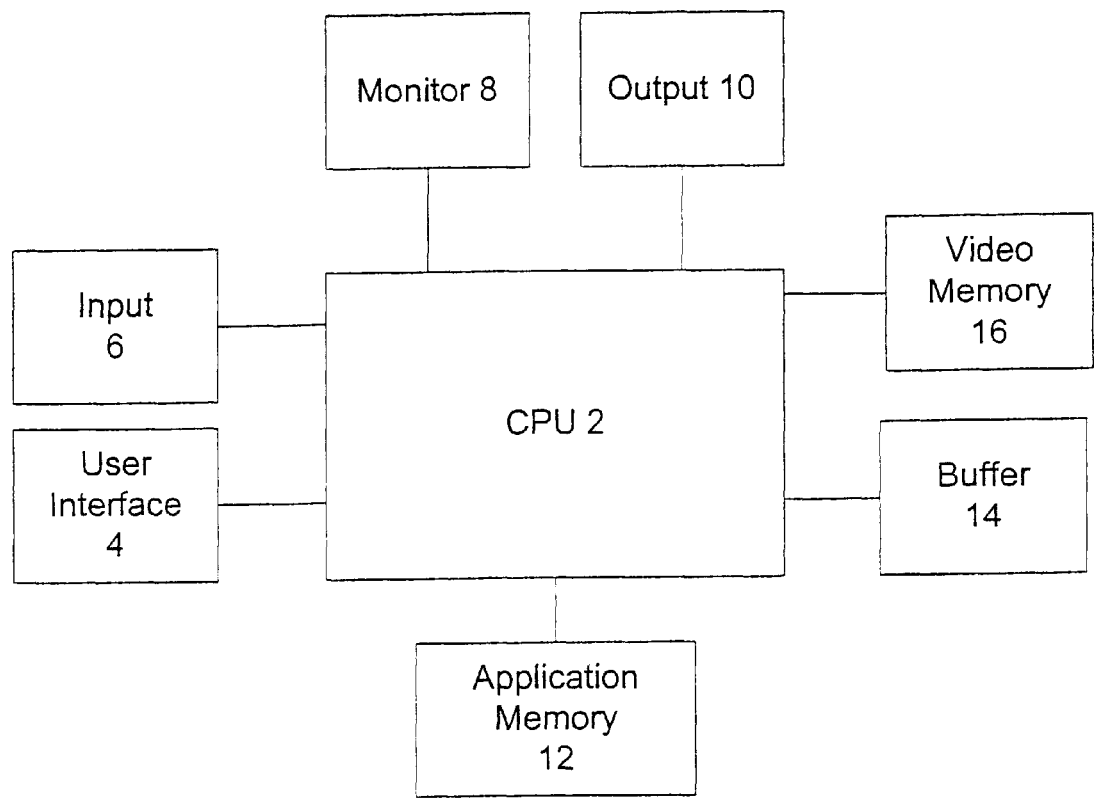
FIG. 39 shows a block diagram of an exemplary computing apparatus and system, according to an aspect of the present invention.

In an embodiment of the invention, the method described herein is implemented by a computer system that executes a computer program comprising each of the steps necessary for representing the digital image. A computer programmer of ordinary skill will recognize how to carry out the programming necessary to encode the methods described in detail herein. Referring to FIG. 39, an exemplary computer system includes a central processing unit (CPU) 2, operating (for example) a personal computer (not pictured) and capable of executing the program. In one embodiment of the invention, a general purpose standalone computer, running a consumer or enterprise operating system, is used. The program consists of computer readable code compatible with the CPU 2, which executes the program implementing the method. The program is accessible by the CPU 2 through a RAM memory, and may be read from and written to a conventional hard disk drive or any other peripheral or internal data storage medium. The digital image files of the file format discussed above are also read from and written to either or both of internal memory and the noted data storage medium, and may also be received and transmitted via a network connection (not shown).

The system can include conventional peripheral computer equipment, such as typical user interface devices 4, including a keyboard and a mouse. Necessary input for those routines described herein as interactive may be provided via the keyboard and mouse. Other CPU input 6 includes any direct source of digital imaging, such as a digital camera, scanner or a facsimile machine. Typically, the computer program will also be able to import a variety of bitmap and vector image file formats (e.g., JPEG, GIF, PNG, TARGA, TIFF, PDF), as well as graphic file formats and storage formats that may also be represented by the method described herein but are not conventional "images" (e.g., map data, interferometry data, graphs of any kind, solid models, finite element analysis representation, flow diagrams of any kind, etc.). In a commercial setting, exemplary CPU input 6 could also include digital image data from medical imaging devices such as x-ray, MRI, and PET, oscilloscopes and industrial process controllers.

Similarly, the system incorporates any number of compatible graphic output devices and other output devices. User interface and interactive processing is facilitated by incorporation of a monitor 8. Other standard graphic output devices 10 are incorporated in embodiments of the invention, depending on the desired application, including a printer, a facsimile device or a modem. Furthermore, commercial uses may necessitate incorporation of alternative output devices. For example, the method may be implemented for pattern detection. An empirical cross-section of a pattern boundary detected according to an aspect of the invention can be compared with "sample" cross-sections (stored in a database) to accomplish visual comparison and inspection in tolerance sensitive manufacturing processes, such as printing of microelectronic circuits. Therefore, an exemplary output device of CPU 2 would include an automated controller (not pictured) used to maintain calibration of a manufacturing process. In another example, the output can be used to tune a sensor, which compares the empirical cross-sections of characteristic lines on a sensor image produced with a "standard" or "calibrated" cross-section.

The CPU 2 incorporates in an exemplary embodiment sufficient memory to carry out the functions described herein, for the purpose of explanation shown herein as three separate memories. The application memory 12 stores the executable program for processing the digital image. The video memory 16 retains the digitally defined pixel image currently displayed, including the source image and feedback indicators for interactive processes (colored indications and marks as described). The buffer 14 accommodates images under processing and model portions while the program "builds" the mathematical model through execution of the program. Generally, a flexible amount of other memory is used for accommodating active processes and necessary data. For example, in steps 246 through 256 of FIG. 16, the program must generate substantial data to perform the scanning, ordering and comparing operations related to the spline segments. As this data is generally process enabling and extraneous to the end product (i.e., the mathematically captured/converted characteristic line representations), the intermediate data may be swapped in and out of the buffer 14 as necessary and may be directly manipulated therein.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A method for representation of an image comprising:
   identifying at least one characteristic line of the image, based on a global image pattern, each characteristic line comprising a line along which a visual pattern repeats itself;
   determining a central line corresponding to the characteristic line, the central line approximating a shape of the characteristic line and comprising a plurality of points; and
   determining a cross-section at each of the plurality of points along the central line, the cross-section comprising at least one geometric parameter and at least one brightness parameter.

2. The method of claim 1 for representation of an image, further comprising:
   determining a basis cross-section representative of the characteristic line;
   transforming the basis cross-section to the cross-sections of the plurality of points along the central line; and
   assembling a characteristic line model representing the characteristic line, the characteristic line model comprising the central line, the basis cross-section and information representative of the transformed cross-sections.

3. The method of claim 2 for representation of an image, further comprising:
   performing at least one of storing, transmitting and processing the characteristic line model.

4. The method of claim 2 for representation of an image, wherein the image is a digital image.

5. A method for representation of an image comprising:
   identifying at least one characteristic line of the image, based on a global image pattern, each characteristic line comprising a line along which a visual pattern repeats itself;
   determining a central line corresponding to the characteristic line, the central line approximating a shape of the characteristic line; and
   identifying a plurality of patterns along the central line.

6. The method of claim 5 for representation of an image, further comprising:
   determining a basis signature representative of the characteristic line;
   transforming the basis signature to approximate at least one repetition of the visual pattern along the central line; and
   assembling a characteristic line model representing the characteristic line, the characteristic line model comprising the central line, the basis signature and information representative of the transformations of the basis signature.

7. A method for representation of an image, comprising:
   detecting a plurality of edges on the image, based on a global image pattern;
   detecting adjacencies among each of the plurality of edges;
   interpreting common adjacencies as characteristic lines;
   determining a central line corresponding to each of the characteristic lines, the central line approximating a shape of the characteristic line and comprising a plurality of points; and
   detecting a plurality of cross-sections corresponding to the plurality of points along the central line, each of the plurality of cross-sections comprising at least one geometric parameter and at least one brightness parameter.

8. The method of claim 7 for representation of an image, further comprising:
   detecting a plurality of ridges on the image, based on a global image pattern;
   detecting adjacencies among each of the plurality of ridges;
   interpreting common adjacencies as characteristic lines;
   determining a central line corresponding to each of the characteristic lines, the central line approximating the shape of the characteristic line and comprising a plurality of points; and
   detecting a plurality of cross-sections corresponding to the plurality of points along the central line, each of the plurality of cross-sections comprising at least one geometric parameter and at least one brightness parameter.

9. The method of claim 7 for representation of an image, further comprising:
   subdividing each of the plurality of edges into a corresponding plurality of spline segments;
   evaluating each of the plurality of spline segments and identifying adjacent spline segments; and
   identifying adjacency intervals on each of a plurality of edge components corresponding to each of the plurality of edges.

10. The method of claim 9 for representation of an image, wherein identifying adjacent spline segments corresponding to each of the plurality of spline segments comprises:
    scanning the plurality of spline segments; and
    identifying for one of the plurality of spline segments the other spline segments comprising (i) at least one point less than or equal to a predetermined distance from the selected one spline segment, (ii) a direction that forms an angle with a direction of the selected one spline segment less than or equal to a predetermined value, and (iii) a midpoint that, when joined by an adjacency pointer with a midpoint of the selected one spline segment, results in an adjacency pointer having a direction that forms an angle with the direction of each of the joined remaining spline segments which differs from 90 degrees by less than or equal to a predetermined value; and repeating the identification for each of the plurality of spline segments.

11. A method for representation of an image comprising:

detecting a plurality of edges on the image;

subdividing each of the plurality of edges into a corresponding plurality of spline segments;

evaluating each of the plurality of spline segments and identifying adjacent spline segments;

connecting, with an adjacency pointer, a midpoint of the evaluated spline segment with a midpoint of each of the corresponding adjacent spline segments, to create a plurality of adjacency couples;

identifying adjacency intervals as continuous chains of adjacent couples;

identifying a central point of each adjacency pointer within each adjacency couple;

joining the central points of each adjacency pointer within each adjacency interval, forming a central line corresponding to a characteristic line, the central line comprising a plurality of points;

detecting a plurality of cross-sections corresponding to the plurality of points along the central line, each of the plurality of cross-sections comprising at least one geometric parameter and at least one brightness parameter;

determining a basis cross-section representative of the characteristic line;

determining a fitting path corresponding to the plurality of cross-sections, the fitting path comprising a transformation of the basis cross-section to the cross-sections of the plurality of points along the central line; and assembling a characteristic line model representing the characteristic line, the characteristic line model comprising data representing the central line, the basis cross-section, and the fitting path.

12. The method of claim 11 for representation of an image further comprising:

performing at least one of storing, transmitting and processing the characteristic line model data.

13. The method of claim 11 for representation of an image, wherein identifying adjacent spline segments corresponding to each of the plurality of spline segments comprises:

scanning the plurality of spline segments; and identifying for, a selected one of the plurality of spline segments, remaining spline segments comprising (i) at least one point less than or equal to a predetermined distance from the selected one spline segment, (ii) a direction that forms an angle with a direction of the selected one spline segment less than or equal to a predetermined value, and (iii) a midpoint that, when joined by an adjacency pointer with a midpoint of the selected one spline segment, results in an adjacency pointer having a direction that forms an angle with the direction of each of the joined remaining spline segments which differs from 90 degrees by less than or equal to a predetermined value; and repeating the identification for each of the plurality of spline segments.

14. The method of claim 11 for representation of an image, wherein detecting the plurality of cross-sections comprises:

identifying a plurality of scanning points at equal intervals along the central line of a characteristic line;

projecting a line segment orthogonal to the central line at each of the plurality of scanning points;

identifying a characteristic point on the orthogonal line segment at each point where the orthogonal line segment intersects a margin of edges forming the characteristic line;

sampling an image brightness at each of the characteristic points on the orthogonal line segment; and approximating the cross-section of each orthogonal line segment by a cross-section of the edges corresponding to the sampled image brightness.

15. The method of claim 11 for representation of an image, wherein detecting the plurality of cross-sections comprises:

subdividing the central line into a plurality of subpieces, each having a predetermined length;

identifying a plurality of pixels located within a characteristic strip corresponding to each of the plurality of subpieces, and defining each of the plurality of pixels at least according to a distance from the central line and a brightness parameter; and deriving a cross-section at each of the plurality of subpieces based on the defined pixels.

16. The method of claim 15 for representation of an image, further comprising:

forming a quadratic difference between each derived cross-section and the cross-section derived from the next one of the plurality of subpieces;

minimizing the quadratic differences with respect to the parameters of a fitting transformation;

identifying a minimized fitting transformation of each derived cross-section and the cross-section derived from the next one of the plurality of subpieces;

composing a plurality of fitting transformations from the plurality of minimized fitting transformations and interpolating each of the plurality of fitting transformations along the corresponding line segment;

deriving a fitting path from the interpolated fitting transformations;

redefining each of the plurality of pixels according to a distance from the central line corrected according to the fitting path and a brightness parameter corrected according to the fitting path; and deriving a corrected cross-section at each of the plurality of subpieces based on the redefined pixels.

17. The image representation method of claim 16, further comprising:

identifying a geometrically central point of the corrected cross-section; and applying the fitting path to the central point to derive a corrected central line.

18. A method for representation of an image, having an original size, comprising:

reducing the image from the original size;

identifying at least one characteristic line of the reduced image, each characteristic line comprising a line along which a visual pattern repeats itself;

re-scaling the reduced image to the original size;

determining, for the re-scaled image a central line corresponding to the characteristic line, the central line approximating a shape of the characteristic line and comprising a plurality of points; and identifying a plurality of patterns along the central line.

19. The method of claim 18 for representation of an image, further comprising:
    determining a basis signature representative of the characteristic line;
    transforming the basis signature to approximate a repetition of the visual pattern along the central line; and
    assembling a characteristic line model representing the characteristic line, the characteristic line model comprising the central line, the basis signature and information representative of the transformation of the basis signature.

20. The image representation method of claim 19, further comprising:
    identifying as a candidate central line the central line of the re-scaled image;
    determining a characteristic strip associated with the candidate central line, the characteristic strip comprising portions of the image adjacent to the candidate central line;
    detecting a plurality of image patterns within the characteristic strip;
    determining whether each of the plurality of image patterns within the characteristic strip repeats along the central line;
    if the plurality of image patterns within the characteristic strip does not repeat along the central line, then discarding the candidate central line as not corresponding to a characteristic line;
    if the plurality of image patterns within the characteristic strip does repeat along the central line, then separating each of the plurality of image patterns, identifying a signature and determining a geometric transformation that fits the signature to the repetitions of the pattern along the candidate central line; and
    approximating a signature and a fitting sequence corresponding to the candidate central line.

21. A method for representation of an image, comprising:
    identifying at least one central line approximating a shape of a characteristic line;
    subdividing the central line into a plurality of subpieces, each having a predetermined length;
    identifying a plurality of pixels located within a characteristic strip corresponding to each of the plurality of subpieces, and defining each of the plurality of pixels at least according to a distance from the central line and a brightness parameter; and
    deriving a cross-section at each of the plurality of subpieces based on the defined pixels.

22. The method of claim 21 for representation of an image, further comprising:
    forming a quadratic difference between each derived cross-section and the cross-section derived from the next one of the plurality of subpieces;
    minimizing the quadratic differences with respect to the parameters of a fitting transformation;
    identifying a minimized fitting transformation of each derived cross-section and the cross-section derived from the next one of the plurality of subpieces;
    composing a plurality of fitting transformations from the plurality of minimized fitting transformations and interpolating each of the plurality of fitting transformations along the corresponding line segment;
    deriving a fitting path from the interpolated fitting transformations;
    redefining each of the plurality of pixels according to a distance from the central line corrected according to the fitting path and one of a brightness or a color parameter corrected according to the fitting path; and
    deriving a corrected cross-section at each of the plurality of subpieces based on the redefined pixels.

23. The image representation method of claim 22, further comprising:
    identifying a geometrically central point of the corrected cross-section; and
    applying the fitting path to the central point to derive a corrected central line.

24. A method for representation of an image, comprising:
    identifying an empirical cross-section of at least one point of a line on the image;
    determining whether the line approximates a shape of a uniform characteristic line; and
    if the line does approximate the shape of a uniform characteristic line, then identifying a fitting path, a corrected cross-section and a central line of the uniform characteristic line.

25. A computing apparatus for implementing representation of a digital image, comprising:
    a computing device for executing computer readable code;
    an input device for receiving the digital image and interfacing with a user, said input device being in communication with said computing device;
    at least one data storage device for storing computer data, said at least one data storage device being in communication with said computing device; and
    a programming code reading device that reads computer executable code, said programming code reading device being in communication with said computing device;
    wherein the computer executable code instructs the computing device to identify at least one characteristic line of the image based on a global image pattern, each characteristic line comprising a line along which a visual pattern repeats itself; to determine a central line corresponding to the characteristic line, the central line approximating a shape of the characteristic line and comprising a plurality of points; to determine a cross-section at each of the plurality of points along the central line, the cross-section comprising at least one geometric parameter and at least one brightness parameter; to determine a basis cross-section representative of the characteristic line; and to transform the basis cross-section to the cross-sections of the plurality of points along the central line; and
    wherein the computer executable code stores data representing the characteristic line, the central line, the cross-section and the transforms of the cross-section in said at least one data storage device.

26. The computing apparatus of claim 25, wherein at least one of the characteristic line of the image and the central line corresponding to the characteristic line is identified by the user via said input device.

27. A computing apparatus for implementing representation of an image, comprising:
    a computing device for executing computer readable code;
    an input device for receiving the image and interfacing with a user, said input device being in communication with said computing device;

at least one data storage device for storing computer data, said data storage device being in communication with said computing device; and a programming code reading device that reads computer executable code, said programming code reading device being in communication with said computing device;

wherein, the computer executable code instructs the computing device to identify at least one characteristic line of the image based on a global image pattern, each characteristic line comprising a line along which a visual pattern repeats itself; to determine a central line corresponding to the characteristic line, the central line approximating a shape of the characteristic line; identify a plurality of patterns along the central line; to determine a basis signature representative of the characteristic line; and to transform the basis signature to approximate a repetition of the visual pattern along the central line; and wherein the computer executable code stores data representing at least one of the characteristic line, the central line, the patterns, the basis signature, and the transforms of the cross-section in said at least one data storage device.

28. The computing apparatus of claim 27, wherein at least one of the characteristic line of the image, the central line corresponding to the characteristic line and the visual pattern is identified by the user via said input device.

29. A computing apparatus for implementing representation of an image, comprising:

an image reading device for reading and storing the image;

an interface device for enabling a user interface;

a program module that receives and executes computer readable code; and a model storage device that stores characteristic line model data representing the image;

wherein said program module detects at least one of a plurality of edges and a plurality of ridges on the image, based on a global image pattern, stored in said image reading device;

detects adjacencies among each of the plurality of edges and the plurality of ridges;

interprets common adjacencies as characteristic lines;

determines a central line corresponding to each of the characteristic lines, the central line approximating a shape of the characteristic line and comprising a plurality of points; and detects a plurality of cross-sections corresponding to the plurality of points along the central line, each of the plurality of cross-sections comprising at least one geometric parameter and at least one brightness parameter.

30. The apparatus of claim 29 for representation of an image, wherein said program module further subdivides each of the plurality of edges and the plurality of ridges into a corresponding plurality of spline segments;

evaluates each of the plurality of spline segments and identifies adjacent spline segments; and identifies at least one adjacency interval on each of a plurality of edge components corresponding to each of the plurality of edges.

31. A computing apparatus for implementing representation of an image, comprising:

an image reading device for reading and storing the image;

an interface device for enabling a user interface;

a program module that receives and executes computer readable code; and a model storage device that stores characteristic line model data representing the image;

wherein said program module detects a plurality of edges on the image;

subdivides each of the plurality of edges into a corresponding plurality of spline segments;

evaluates each of the plurality of spline segments and identifies adjacent spline segments;

connects, with an adjacency pointer, a midpoint of the evaluated spline segment with a midpoint of each of the corresponding adjacent spline segments, creating a plurality of adjacency couples;

identifies adjacency intervals as continuous chains of adjacent couples;

identifies a central point of each adjacency pointer within each adjacency couple;

joins the central points of each adjacency pointer within each adjacency interval, forming a central line corresponding to a characteristic line, the central line comprising a plurality of points;

detects a plurality of cross-sections corresponding to the plurality of points along the central line, each of the plurality of cross-sections comprising at least one geometric parameter and at least one brightness parameter;

determines a basis cross-section representative of the characteristic line;

determines a fitting path corresponding to the plurality of cross-sections, the fitting path comprising a transformation of the basis cross-section to the cross-sections of the plurality of points along the central line; and assembles a characteristic line model representing the characteristic line, the characteristic line model comprising data representing the central line, the basis cross-section and the fitting path; and wherein the program module stores data representing at least one of the characteristic line, the characteristic line model, the central line, the basis cross-section, and the fitting path in said at least one data storage device.

32. A computing apparatus for implementing representation of an image, comprising:

a computing device for executing computer readable code;

an input device for receiving the digital image and interfacing with a user, said input device being in communication with said computing device;

at least one data storage device for storing computer data, said data storage device being in communication with said computing device; and a programming code reading device that reads computer executable code, said programming code reading device being in communication with said computing device;

wherein the computer executable code causes the computing device to reduce the image from an original size; to identify at least one characteristic line of the reduced image, each characteristic line comprising a line along which a visual pattern repeats itself; to re-scale the reduced image to the original size; to determine for the re-scaled image a central line corresponding to the characteristic line, the central line approximating a shape of the characteristic line and comprising a plurality of points; to identify a plurality of patterns along the central line; to determine a basis signature representative of the characteristic line; and transform the basis signature to approximate a repetition of the visual pattern along the central line; and wherein the computer executable code stores data representing at least one of the characteristic line, the central line, the patterns, the basis signature, and the transforms of the cross-section in said at least one data storage device.

33. A computing apparatus for implementing representation of an image, comprising:

an image reading device for reading and storing the image;

an interface device for enabling a user interface;

a program module that receives and executes computer readable code; and a model storage device that stores characteristic line model data representing the image;

wherein said program module identifies an empirical cross-section of at least one point of a line on the image; determines whether the line approximates a shape of a uniform characteristic line; and, if the line does approximate the shape of a uniform characteristic line, then identifies a fitting path, a corrected cross-section and a central line of the uniform characteristic line; and wherein the program module stores data representing at least one of the uniform characteristic line, the central line, the fitting path, the empirical cross-section and the corrected cross-section in said at least one data storage device.

34. A computing apparatus for implementing representation of an image, comprising:

a computing device for executing computer readable code;

an input device for receiving the image and interfacing with a user, said input device being in communication with said computing device;

at least one data storage device for storing computer data, said data storage device being in communication with said computing device; and a programming code reading device that reads computer executable code, said programming code reading device being in communication with said computing device;

wherein the computer executable code causes the computing device to identify at least one central line approximating a shape of a characteristic line; to subdivide the central line into a plurality of subpieces, each having a predetermined length; to identify a plurality of pixels located within a characteristic strip corresponding to each of the plurality of subpieces and define each of the plurality of pixels at least according to a distance from the central line and a brightness parameter; to derive a cross-section at each of the plurality of subpieces based on the defined pixels; to form a quadratic difference between each derived cross-section and the cross-section derived from the next one of the plurality of subpieces; to minimize the quadratic differences with respect to the parameters of a fitting transformation; to identify a minimized fitting transformation of each derived cross-section and the cross-section derived from the next one of the plurality of subpieces; to compose a plurality of fitting transformations from the plurality of minimized fitting transformations and interpolate each of the plurality of fitting transformations along the corresponding line segment; to derive a fitting path from the interpolated fitting transformations; redefine each of the plurality of pixels according to a distance from the central line corrected according to the fitting path and one of a brightness and a color parameter corrected according to the fitting path; to derive a corrected cross-section at each of the plurality of subpieces based on the redefined pixels; to identify a geometrically central point of the corrected cross-section; and to apply the fitting path to the central point to derive a corrected central line; and wherein the computer executable code stores data representing at least one of the characteristic line, the central line, the plurality of fitting transformations, the fitting path, the derived cross-section and the corrected cross-section in said at least one data storage device.

* * * * *